(12) United States Patent
Ruggieri et al.

(10) Patent No.: US 7,735,325 B2
(45) Date of Patent: Jun. 15, 2010

(54) POWER GENERATION METHODS AND SYSTEMS

(75) Inventors: Frank Ruggieri, Merritt Island, FL (US); Rudolph N. J. Draaisma, A. Muang Siphanburi (TH); David Lackstrom, Cape Canaveral, FL (US); Napoleon P. Salvail, Titusville, FL (US); Clyde R. Zielke, Rockledge, FL (US)

(73) Assignee: Research Sciences, LLC, Merritt Island, FL (US)

( * ) Notice: Subject to any disclaimer, the term of this patent is extended or adjusted under 35 U.S.C. 154(b) by 599 days.

(21) Appl. No.: 11/503,658

(22) Filed: Aug. 14, 2006
(Under 37 CFR 1.47)

(65) Prior Publication Data
US 2007/0119175 A1 May 31, 2007

Related U.S. Application Data

(63) Continuation-in-part of application No. 11/333,754, filed on Jan. 17, 2006, now abandoned, which is a continuation of application No. 10/826,652, filed on Apr. 16, 2004, now Pat. No. 7,019,412, and a continuation-in-part of application No. 10/414,672, filed on Apr. 16, 2003, now abandoned.

(60) Provisional application No. 60/544,466, filed on Feb. 13, 2004, provisional application No. 60/372,869, filed on Apr. 16, 2002.

(51) Int. Cl.
*F01K 25/08* (2006.01)
(52) U.S. Cl. .............................. 60/651; 60/671; 60/673; 62/238.1
(58) Field of Classification Search .................... 290/2; 60/651, 671, 673; 62/238.1
See application file for complete search history.

(56) References Cited

U.S. PATENT DOCUMENTS 3,413,805 A * 12/1968 Heller et al. .................. 60/651
3,505,810 A * 4/1970 Mamiya ...................... 60/673
3,567,952 A 3/1971 Doland (Continued)

FOREIGN PATENT DOCUMENTS

BE 875277 A1 10/1979

(Continued)

*Primary Examiner*—Joseph Waks
(74) *Attorney, Agent, or Firm*—Gray Robinson, P.A.

(57) ABSTRACT

A closed loop system for generating mechanical energy at high efficiencies from hydrogen, fossil fuels, bio-fuels, solar or other renewable and recoverable energy sources. The system can have a heating source, a superheater, an expander, a receiver, a condenser, vacuum pump, or absorber, a desorber, and regenerator with pumps and controls. The heating source and superheater are used to heat a working fluid (including ammonia, other refrigerants, a combination of refrigerants, or steam). A positive displacement liquid/vapor expander expands the heated working fluid to the near saturated or saturated state utilizing a reduced pressure, low-pressure, or sub-atmospheric exhaust sink. A condenser, vacuum pump, or absorber is used to generate the reduced pressure, low pressure, or sub-atmospheric sink. The desorber is used to reconstitute inlet vapor (for reuse) and the regenerator recovers heat generated by the process. The system can generate mechanical energy (or power) which can be used to drive a wide range of mechanical systems (including pumps, compressors, vehicles, conveyances, or other similar mechanical devices); or used to drive an electrical generator to meet electrical power needs-for residences, businesses or office buildings, or commercial and industrial applications. The system can supply electrical energy to power grids, and can be an alternative to power generation plants.

55 Claims, 32 Drawing Sheets

U.S. PATENT DOCUMENTS

| | | | | |
|---|---|---|---|---|
| 3,724,212 | A | 4/1973 | Bell | |
| 3,830,063 | A | 8/1974 | Morgan | |
| 3,974,644 | A | 8/1976 | Martz et al. | |
| 4,009,575 | A * | 3/1977 | Hartman et al. | 60/648 |
| 4,031,404 | A | 6/1977 | Martz et al. | |
| 4,122,680 | A * | 10/1978 | Isshiki et al. | 60/649 |
| 4,288,989 | A * | 9/1981 | Cassidy | 60/685 |
| 4,307,572 | A * | 12/1981 | Brinkerhoff | 60/649 |
| 4,346,561 | A | 8/1982 | Kalina | |
| 4,479,354 | A | 10/1984 | Cosby | |
| 4,503,682 | A * | 3/1985 | Rosenblatt | 60/671 |
| 4,920,276 | A | 4/1990 | Tateishi et al. | |
| 5,497,624 | A | 3/1996 | Amir et al. | |
| 5,950,418 | A | 9/1999 | Lott et al. | |
| 6,209,307 | B1 * | 4/2001 | Hartman | 60/780 |
| 6,269,644 | B1 * | 8/2001 | Erickson et al. | 60/649 |
| 6,422,017 | B1 | 7/2002 | Bassily | |
| 6,598,397 | B2 * | 7/2003 | Hanna et al. | 60/651 |
| 6,694,740 | B2 * | 2/2004 | Nayar | 60/651 |
| 6,715,290 | B1 * | 4/2004 | Erickson | 60/671 |
| 6,895,740 | B2 * | 5/2005 | Erickson | 60/39.182 |
| 7,062,913 | B2 * | 6/2006 | Christensen et al. | 60/651 |
| 2002/0069665 | A1 * | 6/2002 | Erickson | 62/476 |
| 2007/0089449 | A1 * | 4/2007 | Gurin | 62/324.2 |

FOREIGN PATENT DOCUMENTS

| | | | |
|---|---|---|---|
| DE | 4104263 C | * | 4/1992 |
| EP | 04750244 | | 5/2008 |
| FR | 2481362 A | * | 10/1981 |
| GB | 1214499 A | | 12/1970 |
| GB | 2294294 A | * | 4/1996 |
| JP | 02218802 A | * | 8/1990 |

\* cited by examiner

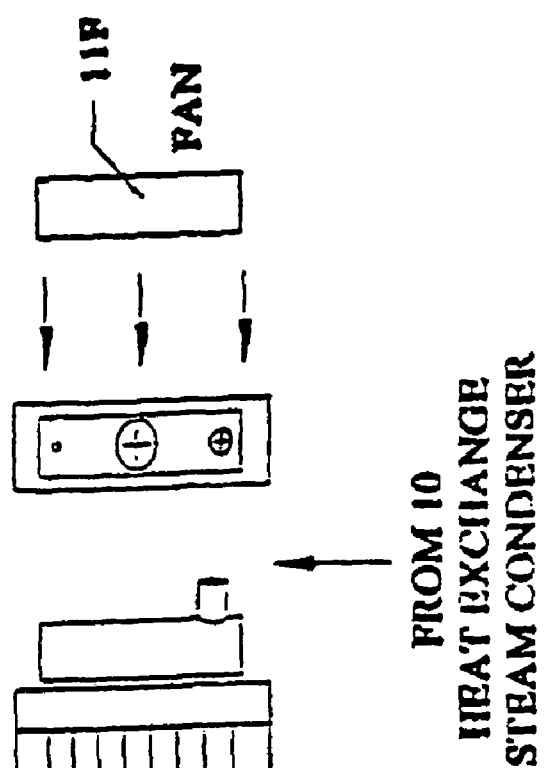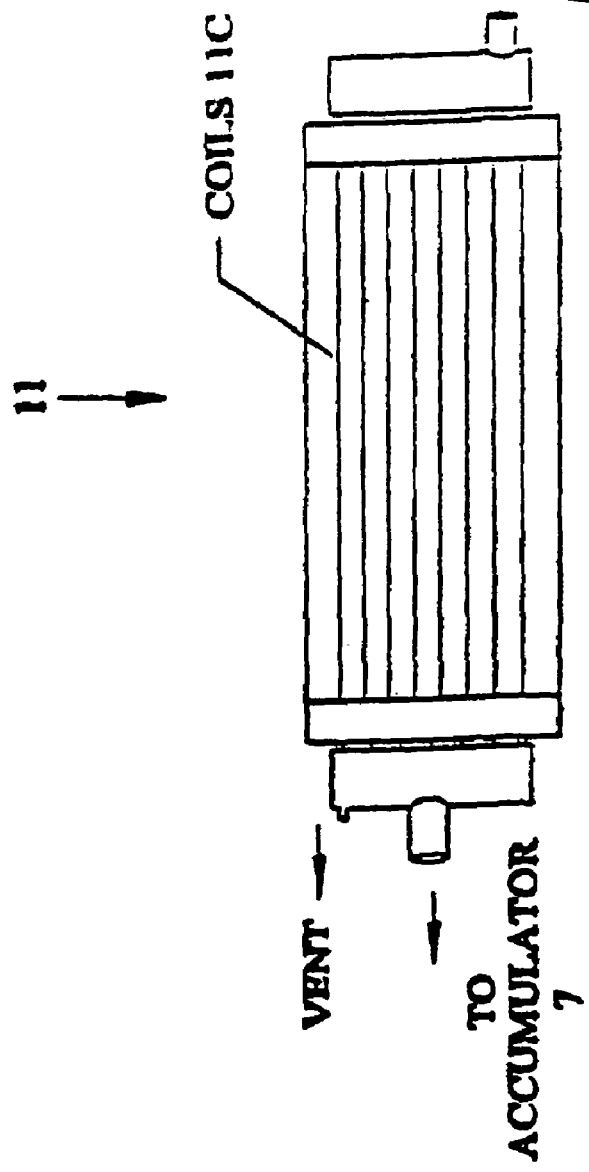

Watt's data on the Expansion of Steam

ENERGY BALANCE

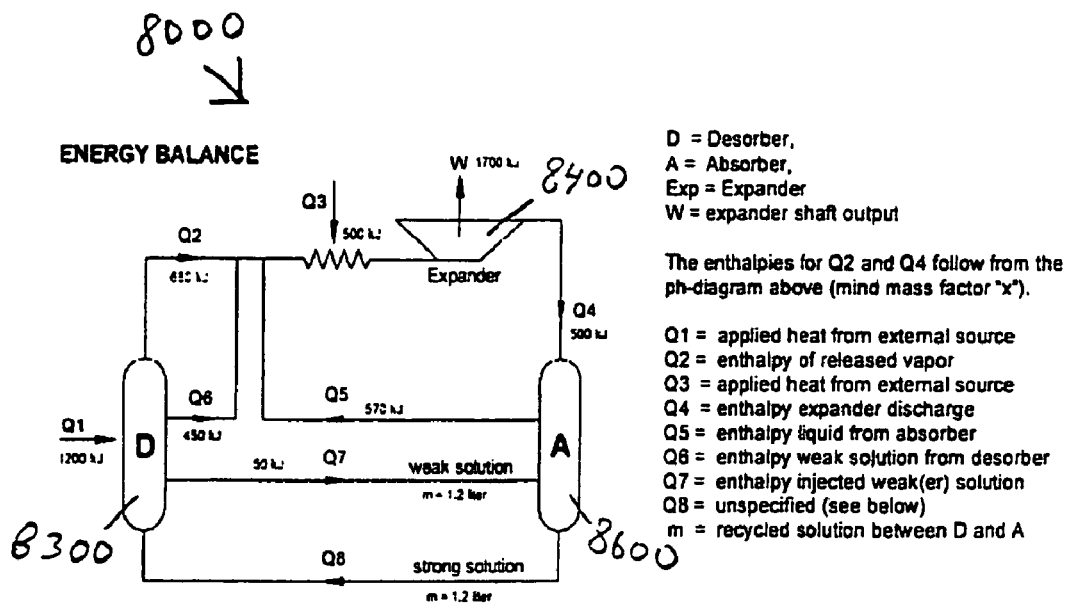

D = Desorber,
A = Absorber,
Exp = Expander
W = expander shaft output

The enthalpies for Q2 and Q4 follow from the ph-diagram above (mind mass factor "x").

Q1 = applied heat from external source
Q2 = enthalpy of released vapor
Q3 = applied heat from external source
Q4 = enthalpy expander discharge
Q5 = enthalpy liquid from absorber
Q6 = enthalpy weak solution from desorber
Q7 = enthalpy injected weak(er) solution
Q8 = unspecified (see below)
m = recycled solution between D and A

Balance Conditions:

$D_{in} = Q1 + Q8$    $D_{out} = Q2 + Q6 + Q7$    $EXP_{in} = Q2 + Q6 + Q5 + Q3$ $A_{in} = Q4 + Q7$    $A_{out} = Q5 + Q8$    $EXP_{out} = Q4$

////////////////////////////////////////////////////////////////////////////////

$W = Q1 + Q3$    (1)

$EXP_{in} - EXP_{out} = Q2 + Q6 + Q5 + Q3 - Q4 = W = Q1 + Q3$    (2)

$Q1 = Q2 + Q6 + Q5 - Q4$    (3)

$D_{in} - D_{out} = Q1 + Q8 - Q2 - Q6 - Q7$    (4)

(3 & 4 combined, eliminating Q1) → $D_{in} - D_{out} = Q5 - Q4 + Q8 - Q7$    (5)

$-(A_{in} - A_{out}) = Q5 - Q4 + Q8 - Q7$    (6)

Fig. 22

POWER GENERATION METHODS AND SYSTEMS

CROSS-REFERENCE TO RELATED APPLICATIONS

This application is a continuation-in-part application to U.S. patent application, Ser. No. 11/333,754, filed Jan. 17, 2006 now abandoned, which is a continuation of U.S. patent application, Ser. No. 10/826,652 filed Apr. 16, 2004, now U.S. Pat. No. 7,019,412 which claims the benefit of priority to U.S. Provisional Application No. 60/544,466 filed Feb. 13, 2004 and which is a continuation-in-part of U.S. patent application, Ser. No. 10/414,672 filed Apr. 16, 2003 now abandoned, which claims the benefit of priority to U.S. Provisional Application Ser. No. 60/372,869 filed Apr. 16, 2002, the disclosures of each of which are hereby incorporated by reference herein.

BACKGROUND OF THE INVENTION

1. Field of the Invention

This invention relates to high efficiency energy generation and power supply systems, and in particular to methods and systems that can meet the energy demands of a home or business or industrial use, and allows for excess electrical energy to be available to be sold over transmission grids and can be utilized as an alternative to power generating plants. The system can be used to drive vehicles (cars, trucks, boats, ships, trains, airplanes, and the like); other conveyance systems or devices (moving sidewalks, conveyers, cranes, elevators and the like); or a wide array of other mechanical devices (pumps, compressors, grinders, and the like). The system can also be used to drive an electrical generator, or alternator, to provide electrical power to a local electrical grid, or for use at a local residence, a commercial facility, or groups of residences and facilities. The system provides the opportunity to extract heat and cooling, from the system, using heat exchangers, which can be used for a primary or as a supplemental heating and cooling source for space heating or cooling, hot water or process heating, process cooling and the like.

2. Description of the Background Art

Endpoint Power Production

Many problems currently exist for traditional power generation methods and systems. Approximately 95% of the current world's supply of electrical energy is produced from non-renewable sources. Global energy demand is increasing at approximately 2% per year. The U.S. Department of Energy has forecast by year 2020 that United States electrical demand will increase by an additional 403 gigawatts (403 billion watts) and the world electrical demand will increase by an additional 3,500 gigawatts (3.5 trillion watts of power). Still, there are more than two billion people in the world who do not have access to electricity, cooling, or dependable heating at low cost.

Demand for electricity is outrunning capacity, and the price mechanism is the essential way to restrain demand and encourage supply. Therefore, the cost of electricity will keep going up. Current electric utility companies are limited by production capacity to increase their electricity generation. To increase generation, these companies must build additional plants which require substantial capital investments, political issues of where to locate the plants, lengthy permit procedures lasting several years, cost overruns, which make the traditional method of building additional plants undesirable. Using nuclear power, oil burning plants, and coal burning plants, adds further environmental problems for those seeking to build electricity generating power plants. Thus, building more and more plants is not a practical solution.

Current energy conversion efficiency of any of these power plants is generally no higher than 30% (thirty percent) efficiency of the electricity produced from the energy source of the fuel (oil, coal, nuclear, natural gas). For example, the efficiency of turbines that generate the electricity from the fuel source at the power plants is, at best only 30%. Next, the electricity being transmitted loses efficiency while it is being transmitted over transmission lines (i.e. wires, substations, transformers) so that by the time the electricity reaches the end user, an additional 28% (twenty eight percent) energy (efficiency) is lost. By the time the electricity reaches an end user such as a home residence, the true energy efficiency is no more than approximately 18% (eighteen percent) from the actual energy source.

Approximately 70% of the energy (fuel) used in the production of electricity is lost as heat (which is rejected to the environment) because heat energy cannot be efficiently transmitted over long distances. A co-generation combined system does exist where some of the co-generated heat produced from a gas fired plant is used to produce additional steam which then makes additional electricity in addition to the primary electrical generation system. This combined system can achieve up to approximately 45% (forty five percent) energy conversion efficiency. But there still are transmission losses of some 28% (twenty eight percent) so that by the time electricity reaches the end user only some 22% (twenty two percent) of the actual energy source is converted to electrical power. The current electricity rate structure for consumers penalizes the consumers who must pay for the fuel being used to generate either 18 percent or 22 percent energy conversion efficiency. In essence, the consumer is paying for some 500% (five hundred percent) of the actual cost of electricity by inherent transmission losses that are generated by the current power generation systems.

The inventors are aware of several patents used for steam power generation. See for example, U.S. Pat. No. 3,567,952 to Doland; U.S. Pat. No. 3,724,212 to Bell; U.S. Pat. No. 3,830,063 to Morgan; U.S. Pat. No. 3,974,644 to Martz et al.; U.S. Pat. No. 4,031,404 to Martz et al.; U.S. Pat. No. 4,479,354 to Cosby; U.S. Pat. No. 4,920,276 to Tateishi et al.; U.S. Pat. No. 5,497,624 to Amir et al.; U.S. Pat. No. 5,950,418 to Lott et al.; and U.S. Pat. No. 6,422,017 to Basily. However, none of these patents solves all the problems of the wasteful energy conversion methods and systems currently being used.

Nonexistence of Supertropic Expansion Applications

At present, known thermodynamic changes of conditions of a system do not include Supertropic Expansion, which is defined as extracting more energy from an expanding gas, than what isentropic expansion gives for a given expansion volume ratio. In this way a vapor can be expanded far into the wet area of its Pressure-Enthalpy (ph)-diagram, so a considerable amount of the vapor working fluid used in the system is condensed by doing work, instead of being cooled to ambient conditions as a loss.

Currently, it is not possible to economically recover moderate amounts of heat from external sources into mechanical energy. Steam turbines work on high rotational speeds that increase to impractical values when the machine is scaled down in size. Thus typical steam turbine applications usually range in the megawatts.

Smaller displacement steam expanders would have a too low efficiency. The only alternative external combustion engine in the range of up to a few hundred kilowatts would be the Sterling engine, but it cannot be produced at a compatible cost in relation to internal combustion engines. Besides, as it only works on the specific heat of an inert gas over varying temperatures, the size of a Sterling engine potentially is much larger than for an according steam, or internal combustion engine and so it must work on very high pressure levels to increase the mass of gas contained in the cycle and thus to keep the machine size down. Again, leakage sets the technological limits, though likely economic ones do sooner.

At present, known thermodynamic changes of conditions of a system require high quality heat to produce moderate amounts of mechanical energy. Currently, it is not typically cost effective to convert moderate amounts of heat from external sources into usable quantities of mechanical energy. The invention involves a method of making a systems' working fluid expand using a low temperature source to a much greater extent than is possible in current energy conversion devices and systems. The inventors have termed this method, which is described in the subsequent paragraphs, as Supertropic Expansion.

Supertropic Background

Supertropic expansion involves the expansion of a gas (or vapor) far into the wet area of its gas energy state so that a considerable amount of the gas is condensed, from a vapor state to a liquid state, by producing work as opposed to being cooled to, or near, ambient temperature conditions as a loss. Supertropic expansion involves the extraction of more energy per unit of volume from the expanding gas for the same volume ratio, by expanding the gas into the wet (the mixed vapor and liquid state) area of the traditional pressure enthalpy diagram, (of the working fluid being used).

Through the use of Supertropic Expansion the inventors have found a way to expand the working fluid to a much greater extent, for a given volume, and to extract more energy, up to three times more than achievable by traditional isentropic expansion, from the expansion process. The benefits of using Supertropic Expansion, which are in addition to the ability to extract more energy and produce more power for a given volume ratio, including the ability to operate the gas expansion process at much lower operating temperatures and pressures. The use of these reduced operating temperatures often resulting in the ability to extract cooling, from the cold exhaust stream leaving the expansion process, and to use this recovered cooling capacity as an alternative, or supplemental cooling source.

In order to implement systems using the Supertropic Expansion Process, several significant design challenges had to be overcome. The first challenge was the requirement to provide a low pressure or sub atmospheric sink, or environment, at the exhaust of the expansion device being used to further expand the gas, or working fluid. The second was a need to provide a positive displacement expansion device which was capable of accommodating the liquid produced within the expander as a result of using Supertropic Expansion.

Testing, as performed by the inventors, indicates that existing absorber technologies, which use the chemosorption of gases and liquids, could be used to produce and maintain the low expander discharge pressures needed, and were capable of producing and maintaining sink pressures as low as 3 psia (0.2 Bar). Further investigation disclose that several other low pressure/low temperature condensing systems, (including low temperature condensers, vacuum pumps, and the like) could be used as viable alternatives to the absorber technologies, and that combinations of these technologies, or using several of these technologies in combination with each other, could also provide the needed low pressures/low temperature sink.

Recent developments in expanders, and associated technology improvements, that significantly improved expander operating efficiencies, have resulted in several alternatives which can be used in the expansion device in a Supertropic Expansion System. Specifically, the requirement to provide a positive displacement expander that is liquid tolerant can be satisfied using currently available scroll, rotary vane (or Wankel), piston type expander, and free-piston type expander technologies: or the use of a tailored or specifically engineered device for the application.

The existence of viable, reliable, affordable technologies, of the type previously discussed for providing the low pressure sub atmospheric sink and satisfying the need for a liquid tolerant positive displacement expander were key to being able to go forward with the development and implementation of systems addressed herein.

It should be noted that the existence and benefits of achieving or implementing Supertropic Expansion, or the capability to extract additional power from an expanding gas by expanding the gas into the wet (or mixed liquid and vapor) area of the traditional Pressure Enthalpy diagram, may have been experienced in early steam research conducted over 200 years ago by James Watt. Specifically, a review of Watt's steam engine research indicates that Watt may have actually measured work produced, in his early steam systems, that exceeded the work output that would have been normally attributed to traditional isentropic expansion methods. This, in turn, indicates that Watt may have actually measured power output levels that were the result of the combination of traditional Isentropic Expansion and Supertropic Expansion. It appears that this accomplishment was not recognized because the properties of steam and the physics of thermodynamics were not known to the present extent, and that Watt's atmospheric engines, and his research on these machines were soon replaced by the development and focus on non-condensing steam engines. The true benefits of using Supertropic Expansion was also largely overlooked by later researchers, who were responsible for the development of the early steam tables, pressure-entropy diagrams, etc., because they did not recall or failed to fully consider the findings and potential impacts of Watt's early research.

Also the value of using the Supertropic Expansion process was not fully realized until recent improvements in measurement accuracies. The value of the benefits of using Supertropic Expansion were largely masked by machine friction losses, machine conduction and radiation losses, and by the effects of liquid condensation and re-evaporation in the expansion device (or on the cylinders of a steam engine). Modern manufacturing and measurement accuracies allowed the construction of carefully crafted, highly refined test hardware and the acquisition of high accuracy test measurement data that allowed the inventors to accurately measure the benefits of using Supertropic Expansion.

SUMMARY OF THE INVENTION

For the purpose of summarizing the invention, the invention comprises a closed loop system for generating mechanical energy at high efficiencies from hydrogen, fossil fuels, bio-fuels, solar or other renewable and recoverable energy sources. The system can have a heating source, a superheater, an expander, a receiver, a condenser, vacuum pump, or absorber, a desorber, and regenerator with pumps and controls. The heating source and superheater are used to heat a working fluid (including ammonia, other refrigerants, a combination of refrigerants, or steam). A positive displacement liquid/vapor expander expands the heated working fluid to the near saturated or saturated state utilizing a reduced pressure, low-pressure, or sub-atmospheric exhaust sink. A condenser, vacuum pump, or absorber is used to generate the reduced pressure, low pressure, or sub-atmospheric sink. The desorber is used to reconstitute inlet vapor (for reuse) and the regenerator recovers heat generated by the process. The system can generate mechanical energy (or power) which can be used to drive a wide range of mechanical systems (including pumps, compressors, vehicles, conveyances, or other similar mechanical devices); or used to drive an electrical generator to meet electrical power needs-for residences, businesses or office buildings, or commercial and industrial applications. The system can supply electrical energy to power grids, and can be an alternative to power generation plants.

More particularly, one embodiment, an object of the apparatus and method of the invention is to generate energy at high efficiencies from an energy source by using a thermal generator for heating a pressurized working fluid, using a positive displacement expander, having a fixed expansion ratio, for receiving and expanding the heated and pressurized working fluid, as received from the thermal generator, against a reduced pressure sink in order to produce mechanical work, using a receiver for receiving and separating a liquid part and a vapor part of the working fluid discharge which exits from the positive displacement expander, using an absorber, and a chemosorption process, to absorb the vapor working fluid received from the receiver and to generate a reduced pressure sink at the exit of the expander, using a desorber for heating and reconstituting the vapor working fluid from the absorbent liquid produced in the absorber, and provide a resultant vapor working fluid to the thermal generator for reuse, using a pump for pressurizing and moving the absorbent liquid produced in the absorber, as the result of chemosorption, to the desorber, using a regenerator to recover heat energy contained in a liquid stream received from the desorber, to heat and vaporize the liquid part of the working fluid received from the receiver and provide a resultant vapor working fluid to the thermal generator for reuse, and using a pump to transfer the liquid working fluid from the receiver to the regenerator.

In another embodiment, another object of the apparatus and method of the invention is to generate mechanical energy at high efficiencies from an energy source by using a thermal generator for heating a pressurized working fluid, using a positive displacement expander, having a fixed expansion ratio, for receiving and expanding the heated and pressurized working fluid received from the thermal generator, against a reduced pressure sink in order to produce mechanical work, using a receiver for receiving and separating a liquid part and a vapor part of the working fluid discharge which exits from the positive displacement expander, using an absorber, and a chemosorption process, to absorb the vapor working fluid received from the receiver and to generate a reduced pressure sink at the exit of the expander, using a desorber for heating and reconstituting the vapor working fluid from the absorbent liquid produced in the absorber, and provide a resultant vapor working fluid to the thermal generator for reuse, using a pump for pressurizing and moving absorbent liquid produced in the absorber, as the result of the chemosorption process, to the desorber, using a regenerator to recover heat energy contained in a liquid stream received from the desorber, to heat and vaporize the liquid part of the working fluid received from the receiver and provide a resultant vapor working fluid to the heat generator for reuse, and using a pump to pressurize and transfer the liquid working fluid from the receiver to the regenerator.

In another embodiment, another object of the apparatus and method of the invention is to generate mechanical energy at high efficiencies from an energy source by using a thermal generator for heating a pressurized working fluid, using a positive displacement expander, having a fixed expansion ratio, for receiving and expanding the heated and pressurized working fluid received from the thermal generator, against a reduced pressure sink in order to produce mechanical work, using a receiver for receiving and separating a liquid part and a vapor part of the working fluid discharge which exits from the positive displacement expander, using a condensing device to condense the vapor working fluid, as received from the receiver, and to generate a reduced pressure sink, at the exit of the expander, using a vaporizer for heating and reconstituting the vapor working fluid from the condensed working fluid produced in the condensing device and providing a resultant vapor working fluid to the thermal generator for reuse, using a pump for pressurizing and moving the condensed working fluid produced in the condensing device to the vaporizer, using a regenerator to recover heat energy from the thermal generator exhaust gases to heat and vaporize the liquid part of the working fluid received from the receiver in order to provide a resultant vapor working fluid to the thermal generator for reuse, and using a pump to pressurize and transfer the liquid working fluid from the receiver to the regenerator.

In another embodiment, another object of the apparatus and method of the invention is to regenerate mechanical energy at high efficiencies from an energy source by using a thermal generator for heating a pressurized working fluid, using a positive displacement expander, having a fixed expansion ratio, for receiving and expanding the heated and pressurized working fluid received from the thermal generator, against a reduced pressure sink in order to produce mechanical work, using a receiver for receiving and separating a liquid part and a vapor part of the working fluid discharge which exits from the positive displacement expander, using a condensing device to condense the vapor working fluid, as received from the receiver, and to generate a reduced pressure sink at the exit of the expander, using a pump for moving the condensed working fluid produced by the compressor to the receiver, using a regenerator to recover heat energy from the thermal generator exhaust gases to heat and vaporize the liquid part of the working fluid received from the receiver in order to provide a resultant vapor to the thermal generator for reuse, and using a pump to pressurize and transfer the liquid working fluid from the receiver to the regenerator.

In another embodiment, another object of the apparatus and method of the invention is to generate mechanical energy at high efficiencies from an energy source by using a thermal generator for heating a pressurized working fluid, using a positive displacement expander, having a fixed expansion ratio, for receiving and expanding the heated and pressurized working fluid received from the thermal generator, against a reduced pressure sink in order to produce mechanical work, using a receiver for receiving and separating a liquid part and a vapor part of the working fluid discharge which exits from the positive displacement expander, using a compressor to compress the vapor working fluid, as received from the receiver, and to generate a reduced pressure sink at the exit of the expander, using a vaporizer for heating and reconstituting the vapor working fluid from the compressed working fluid and providing a resultant vapor working fluid to the thermal generator for reuse, using a pump for pressurizing and moving the condensed working fluid produced in the condensing device to the vaporizer, using a regenerator to recover heat energy from the thermal generator exhaust gases to heat and vaporize the liquid part of the working fluid received from the receiver in order to provide a resultant vapor working fluid to the thermal generator for reuse, and using a pump to pressurize and transfer the liquid working fluid from the receiver to the regenerator.

In another embodiment, another object of the apparatus and method of the invention is to regenerate mechanical energy at high efficiencies from an energy source by using a thermal generator for heating a pressurized working fluid, using a positive displacement expander, having a fixed expansion ratio, for receiving and expanding the heated and pressurized working fluid received from the thermal generator, against a reduced pressure sink in order to produce mechanical work, using a receiver for receiving and separating a liquid part and a vapor part of the working fluid discharge which exits from the positive displacement expander, using a compressor to compress the vapor working fluid, as received from the receiver, and to generate a reduced pressure sink at the exit of the expander, using a pump for moving the compressed working fluid produced by the compressor to the receiver, using a regenerator to recover heat energy from the thermal generator exhaust gases to heat and vaporize the liquid part of the working fluid received from the receiver in order to provide a resultant vapor to the thermal generator for reuse, and using a pump to pressurize and transfer the liquid working fluid from the receiver to the regenerator.

The foregoing has outlined rather broadly the more pertinent and important objects and features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE FIGURES

For a fuller understanding of the nature and objects of the invention, reference should be had to the following detailed description taken in connection with the accompanying drawings in which:

Endpoint Power Production

FIG. 8A shows the steam dissipation coil (heat dump steam condenser) for the embodiment of FIG. 1;

FIG. 8B is an end view of the coil and fan assembly of FIG. 8A;

Supertropic Power Production

Figure 18:
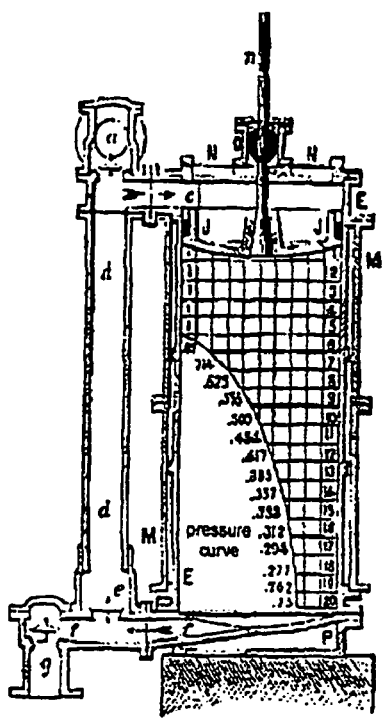
Figure 19A:
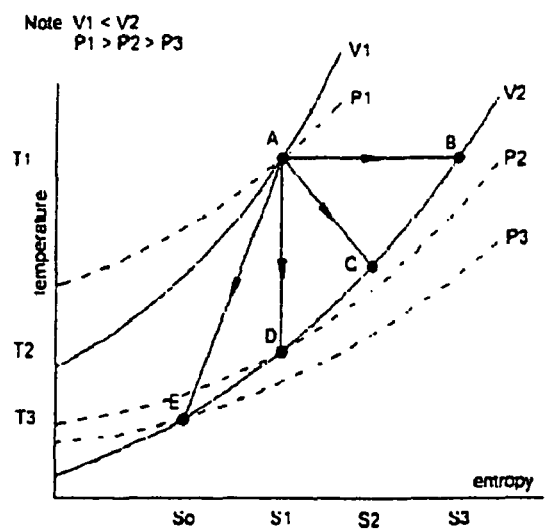
Figure 19B:
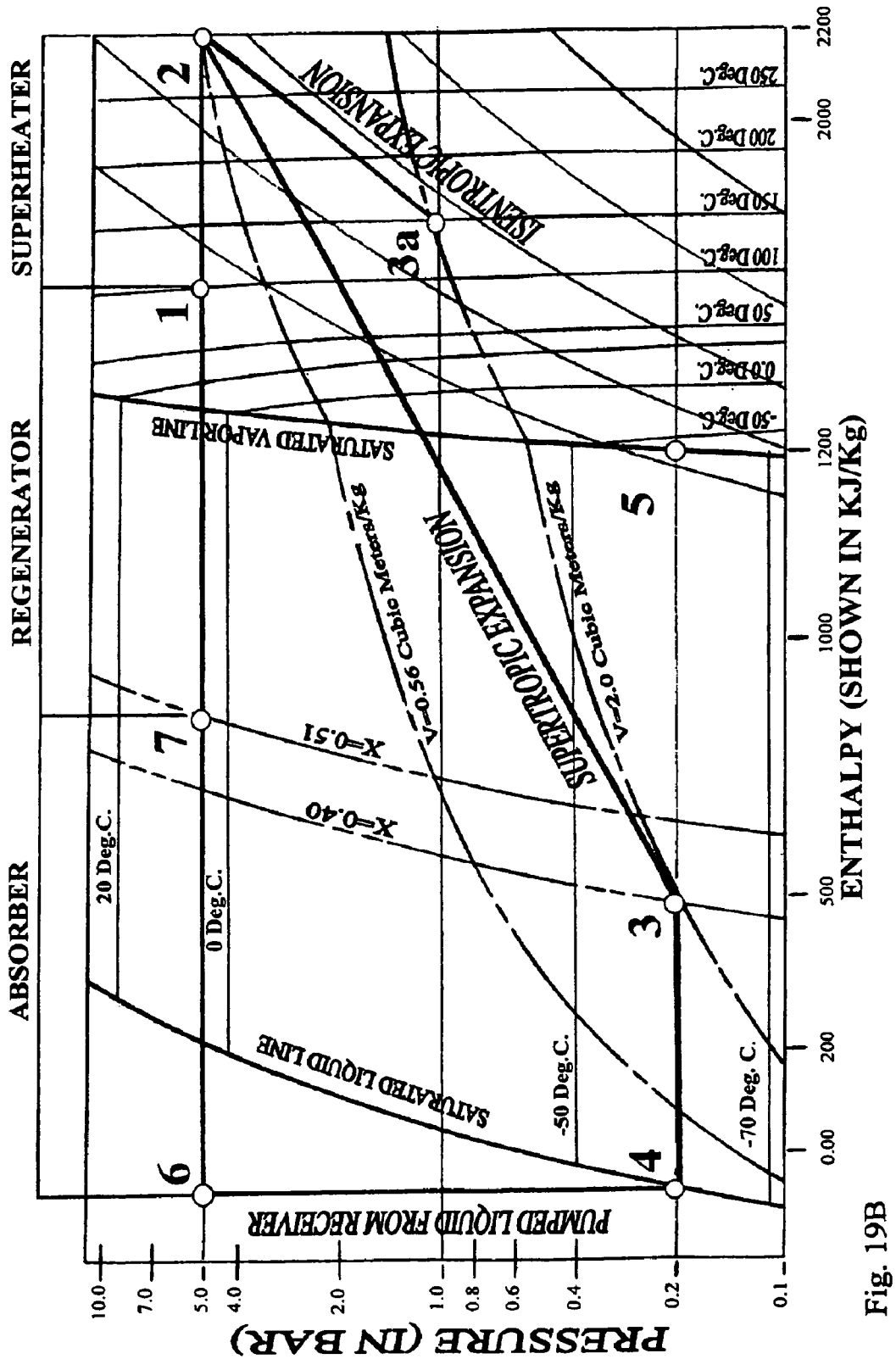
Figure 20:
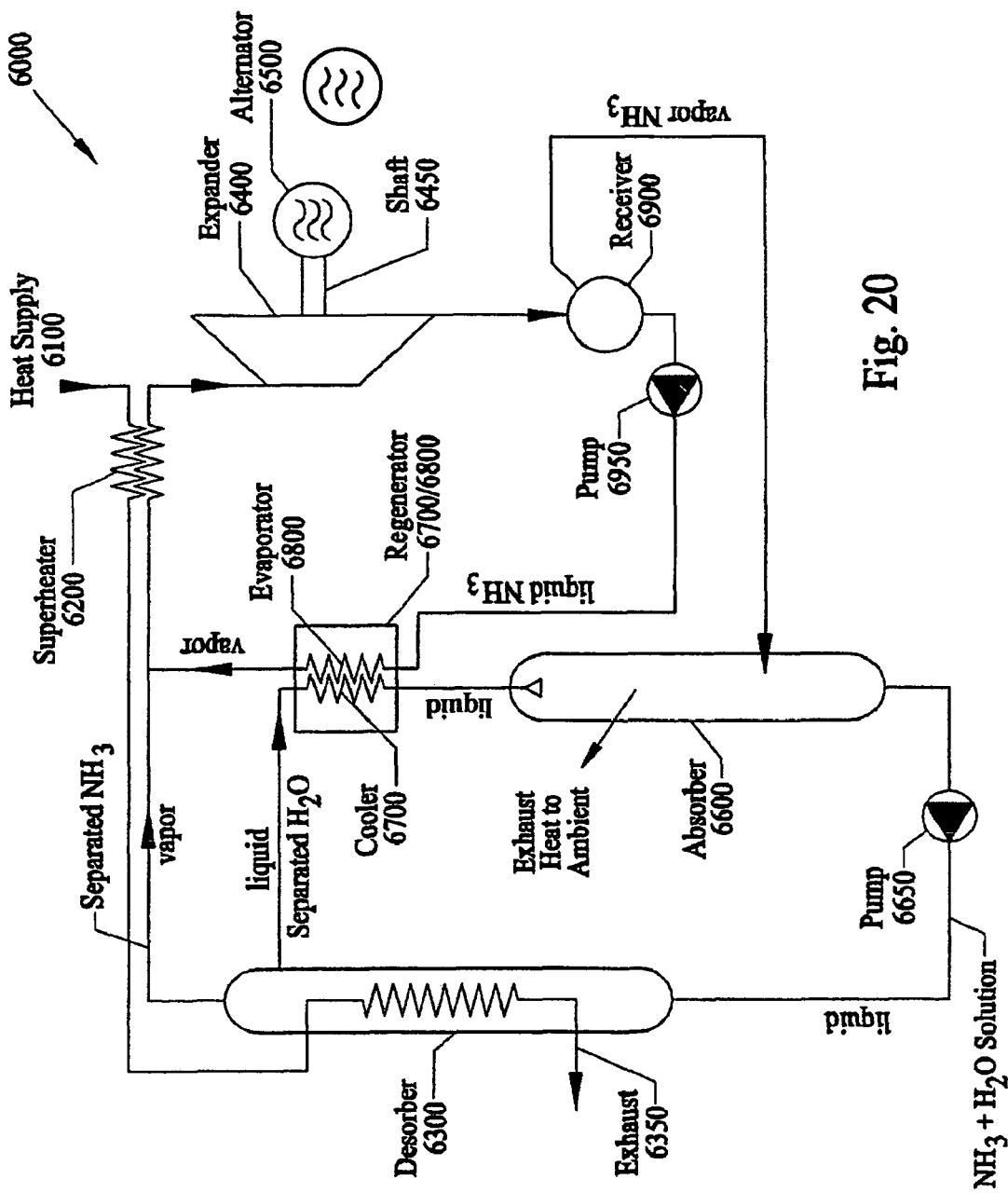
Figure 21:
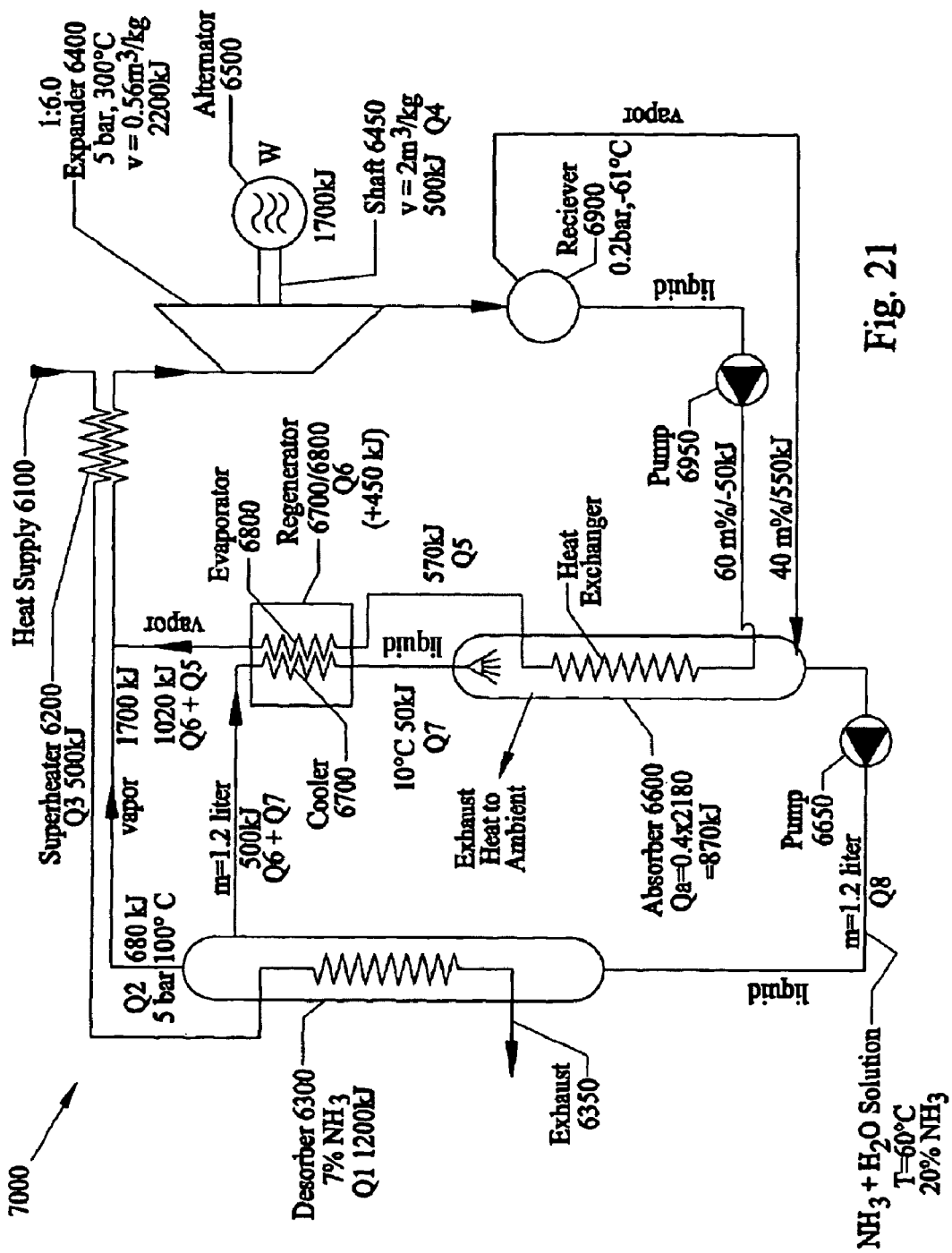
Figure 23:
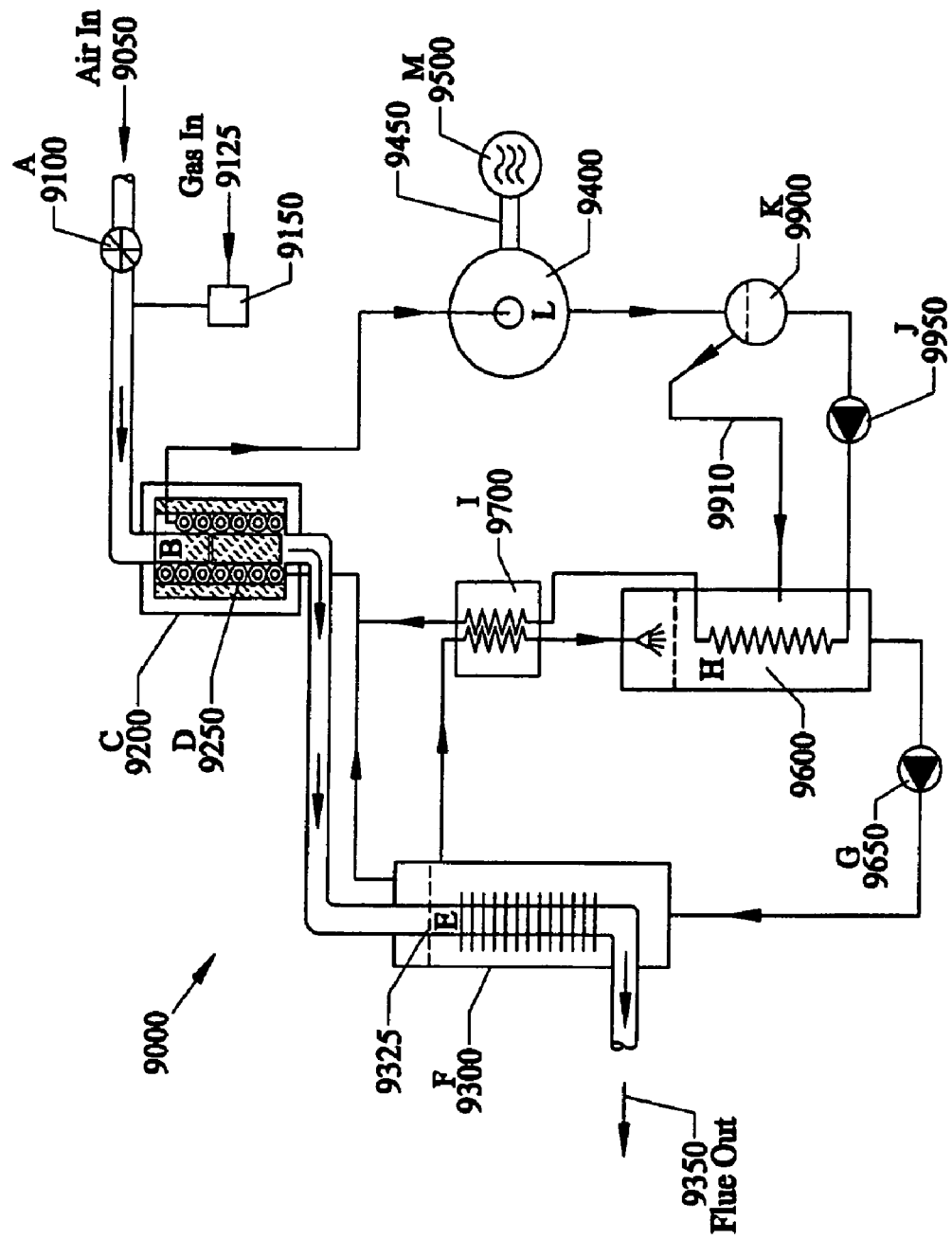
Figure 24:
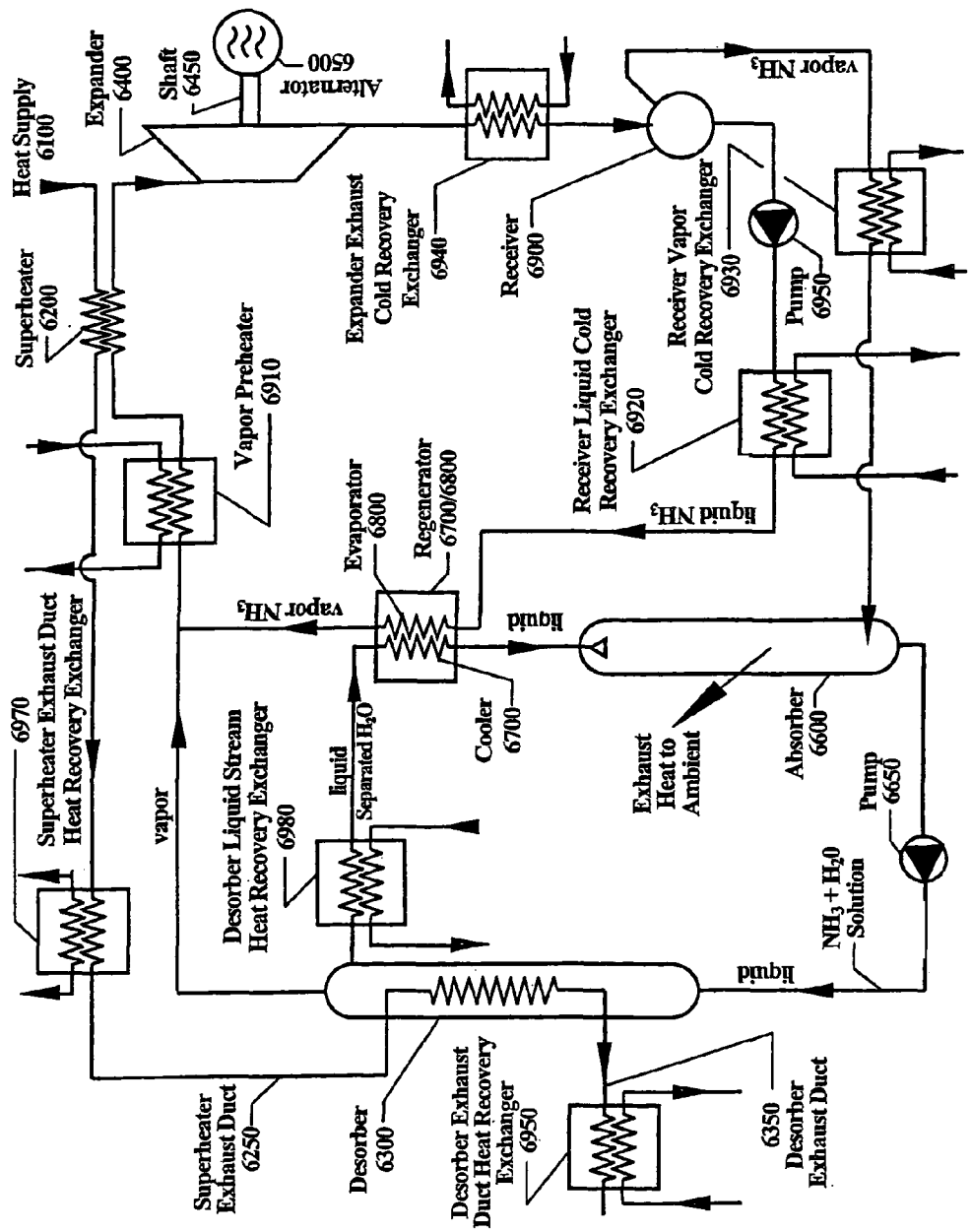
Figure 25:
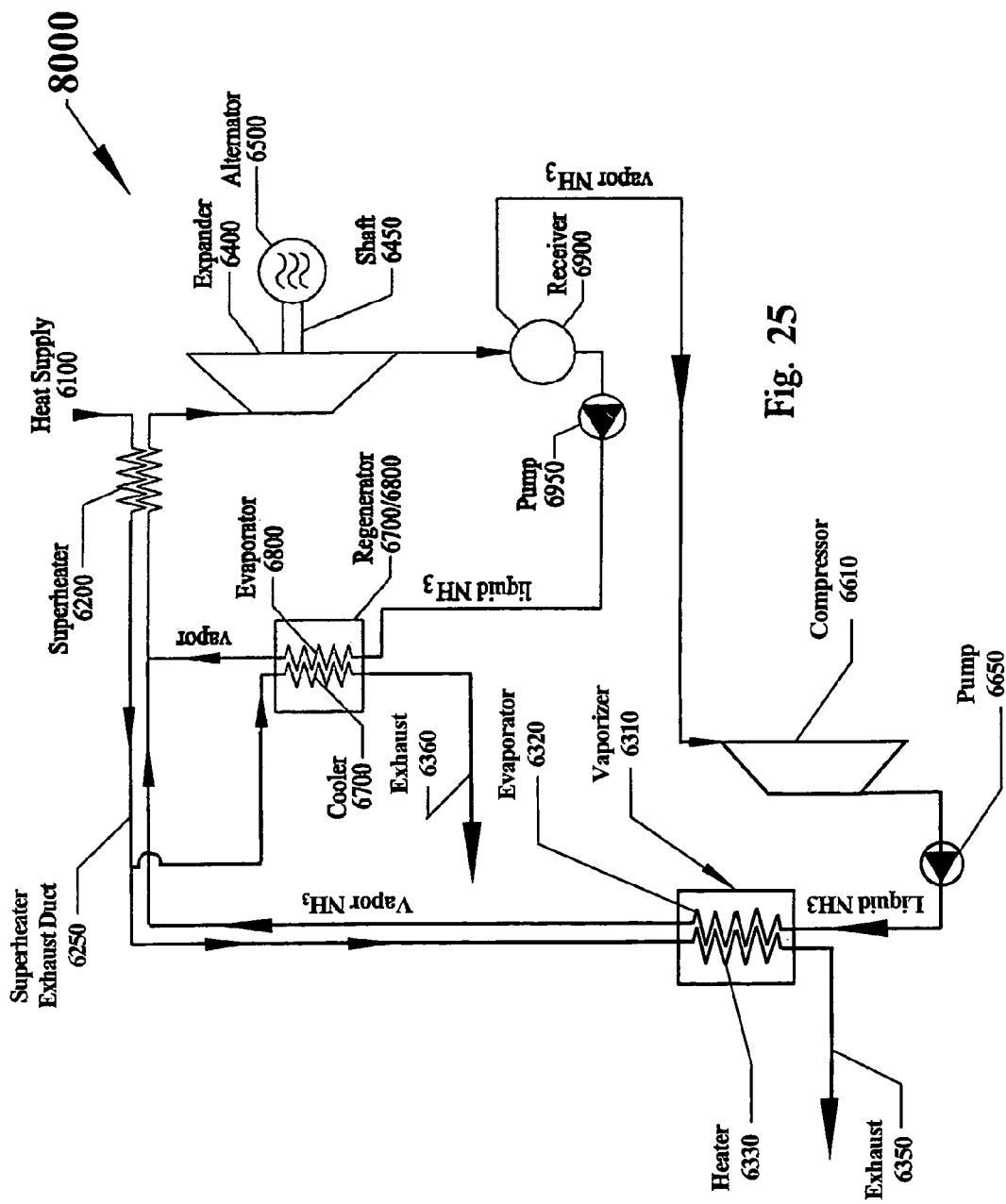
Figure 26:
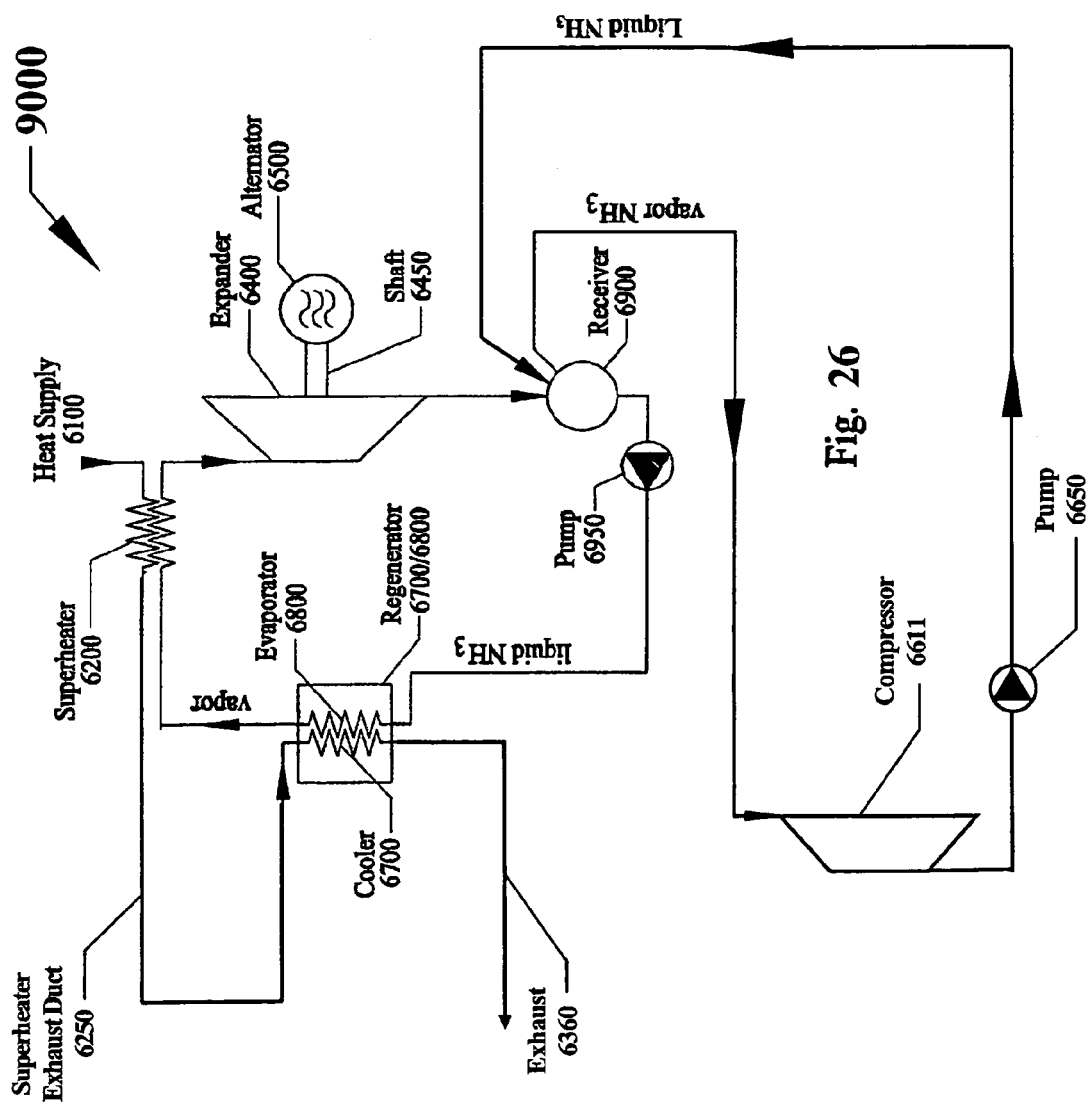
Figure 27:
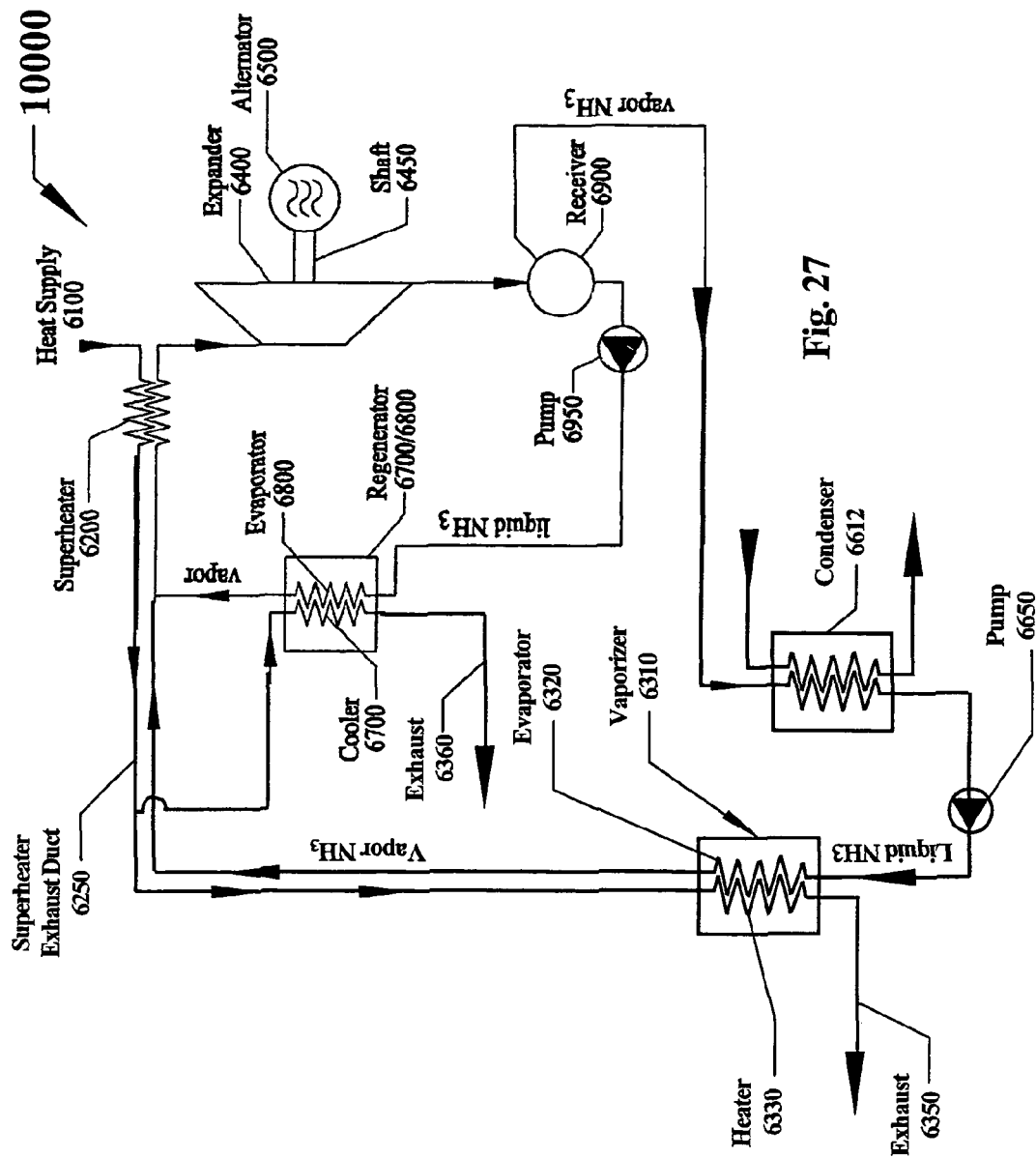
Figure 28:
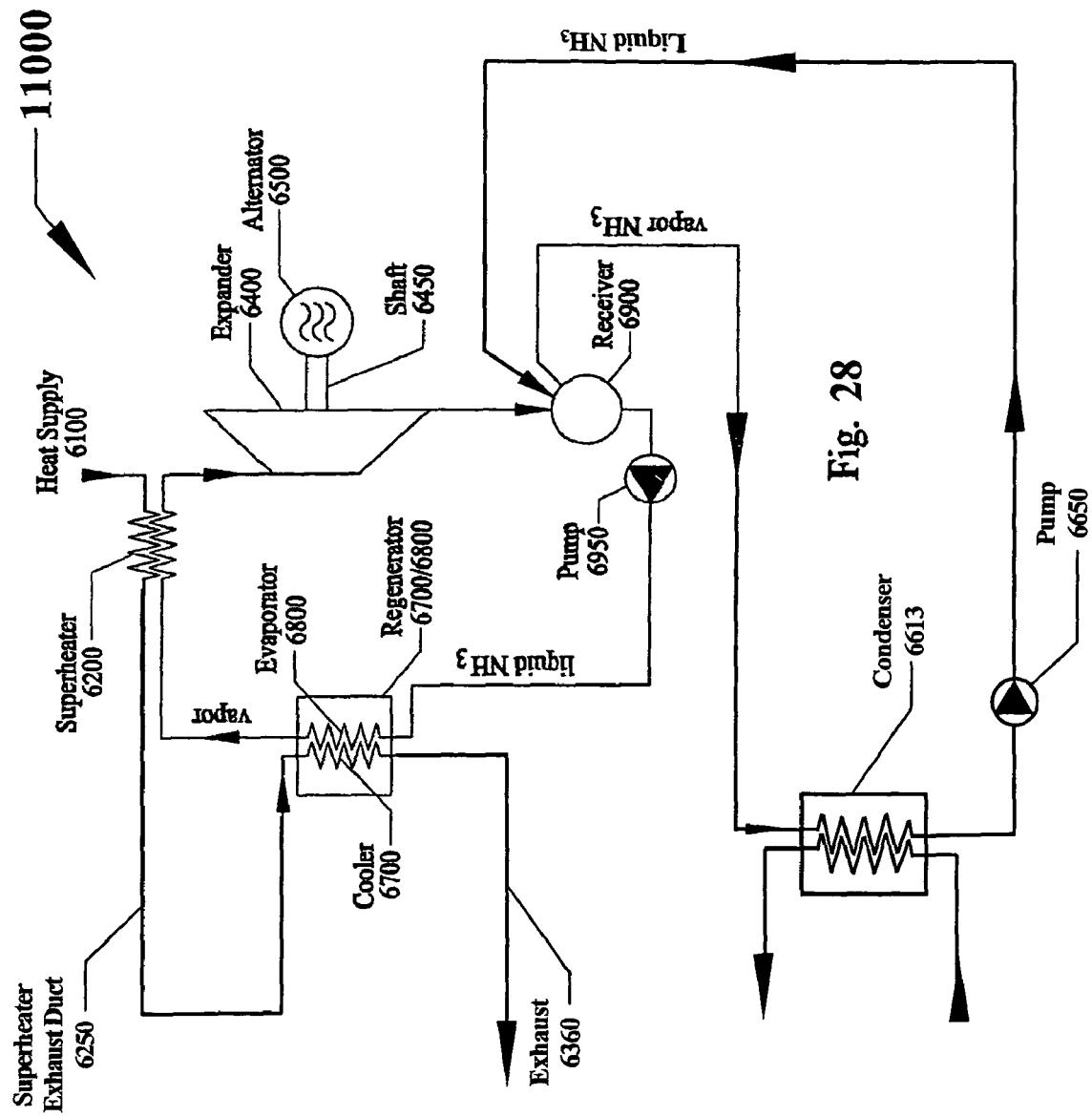
Figure 29:
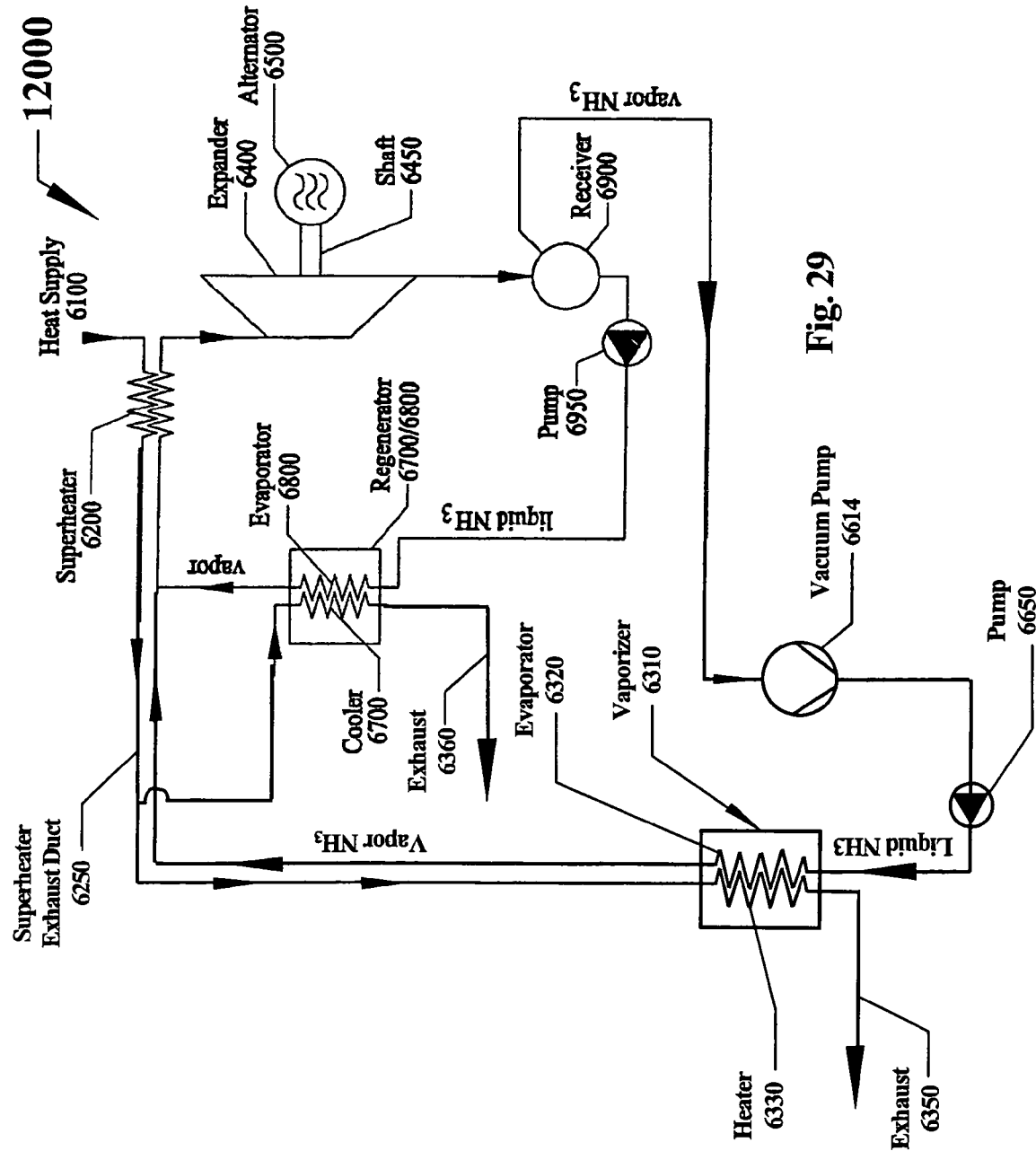
Figure 30:
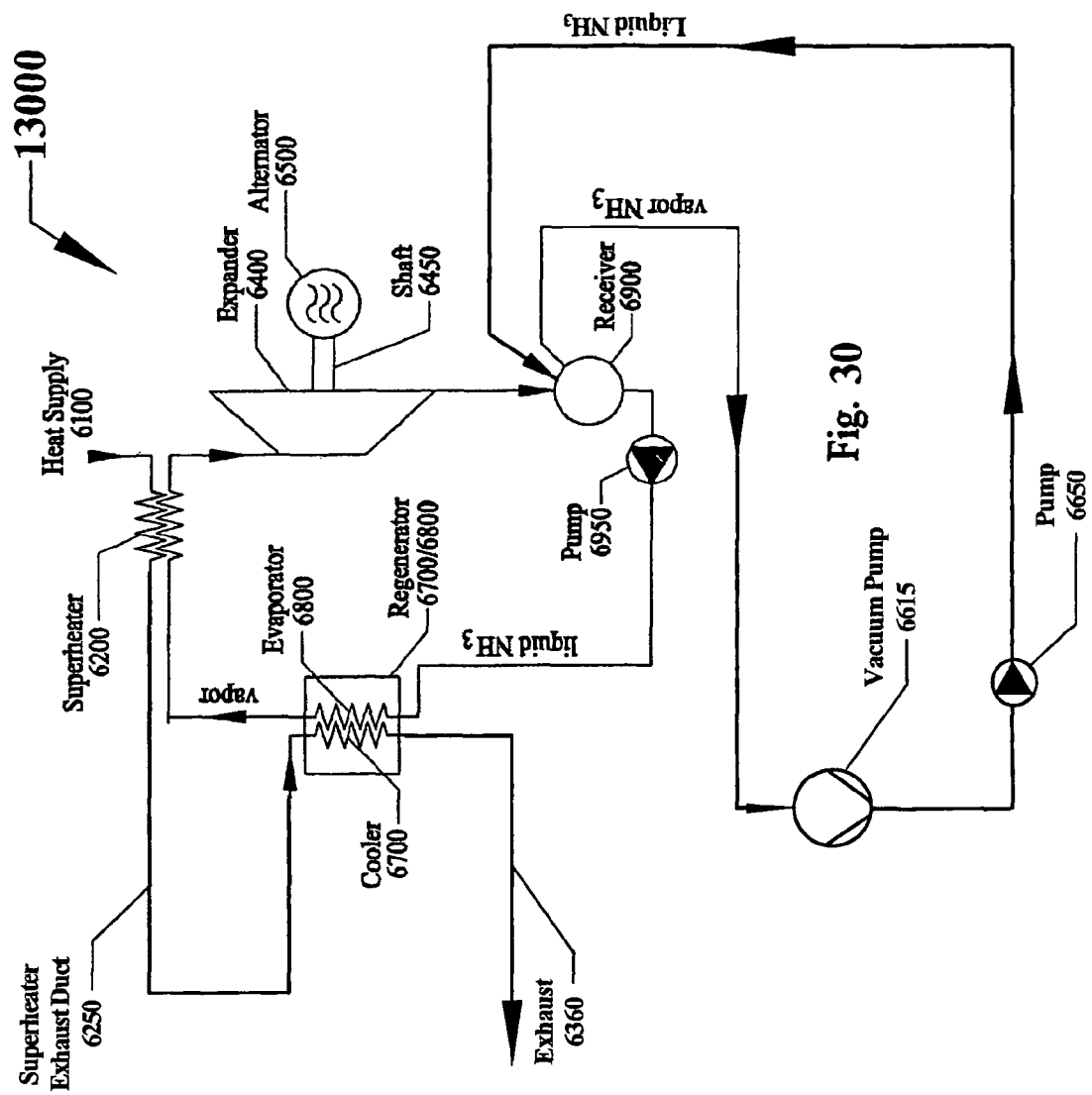

FIG. 18 shows a prior art view of the progressive variation of pressure (of the volume) above a piston in a steam engine;

FIG. 19A is a pressure volume graph of Temperature versus Entropy for supertropic expansion;

FIG. 19B shows a Pressure versus Enthalpy graph for the invention;

FIG. 20 shows an operational arrangement configuration for a Supertrope Power System;

FIG. 21 shows an operational arrangement configuration for a Supertrope Power System with an additional heat exchanger within an absorber for additional cooling of the chemosorption process;

FIG. 22 shows an energy balance diagram for the Supertrope Power System of the invention;

FIG. 23 shows another version of the Supertropic Power System of FIGS. 20, 21 with a gas/air mixture heat source and superheater based on forced gas/air combustion;

FIG. 24 shows an operational arrangement configuration for a Supertrope Power System with additional heat exchangers used for the extraction of heat and cool for space heating, cooling and the like;

FIG. 25 shows the ninth preferred embodiment of a Supertrope Power System (Supertropic Power System 8000) utilizing a compressor and vaporizer (in place of the absorber/desorber configuration shown in FIG. 20);

FIG. 26 shows the tenth preferred embodiment of a Supertrope Power System (Supertropic Power System 9000) utilizing a compressor (in place of the absorber/desorber configuration shown in FIG. 20);

FIG. 27 shows the eleventh preferred embodiment of a Supertrope Power System (Supertropic power System 10000) utilizing a condenser and vaporizer (in place of the absorber/desorber configuration shown in FIG. 20);

FIG. 28 shows the twelfth preferred embodiment of a Supertrope Power System (Supertropic Power System 11000) utilizing a condenser (in place of the absorber/desorber configuration shown in FIG. 20);

FIG. 29 shows the thirteenth preferred embodiment of a Supertrope Power System (Supertropic Power System 12000) utilizing a vacuum pump and vaporizer (in place of the absorber/desorber configuration shown in FIG. 20); and FIG. 30 shows the fourteenth preferred embodiment of a Supertrope Power System (Supertropic power system 13000) utilizing a vacuum pump (in place of the absorber/desorber configuration shown in FIG. 20).

Similar reference characters refer to similar parts throughout the several views of the drawings.

DESCRIPTION OF THE PREFERRED EMBODIMENTS

Before explaining the disclosed embodiments of the present invention in detail it is to be understood that the invention is not limited in its application to the details of the particular arrangements shown since the invention is capable of other embodiments. Also the terminology used herein is for the purpose of description and not of limitation.

Within the following text and figures it should be noted that specific values for pressures, temperatures, and enthalpies are provided for illustrative purposes only, as actual values can vary widely dependant upon the specific configuration selected, the specific working fluid (or combination of fluids) used, and the specific operational set points implemented.

Steam System Embodiments

Figure 1:
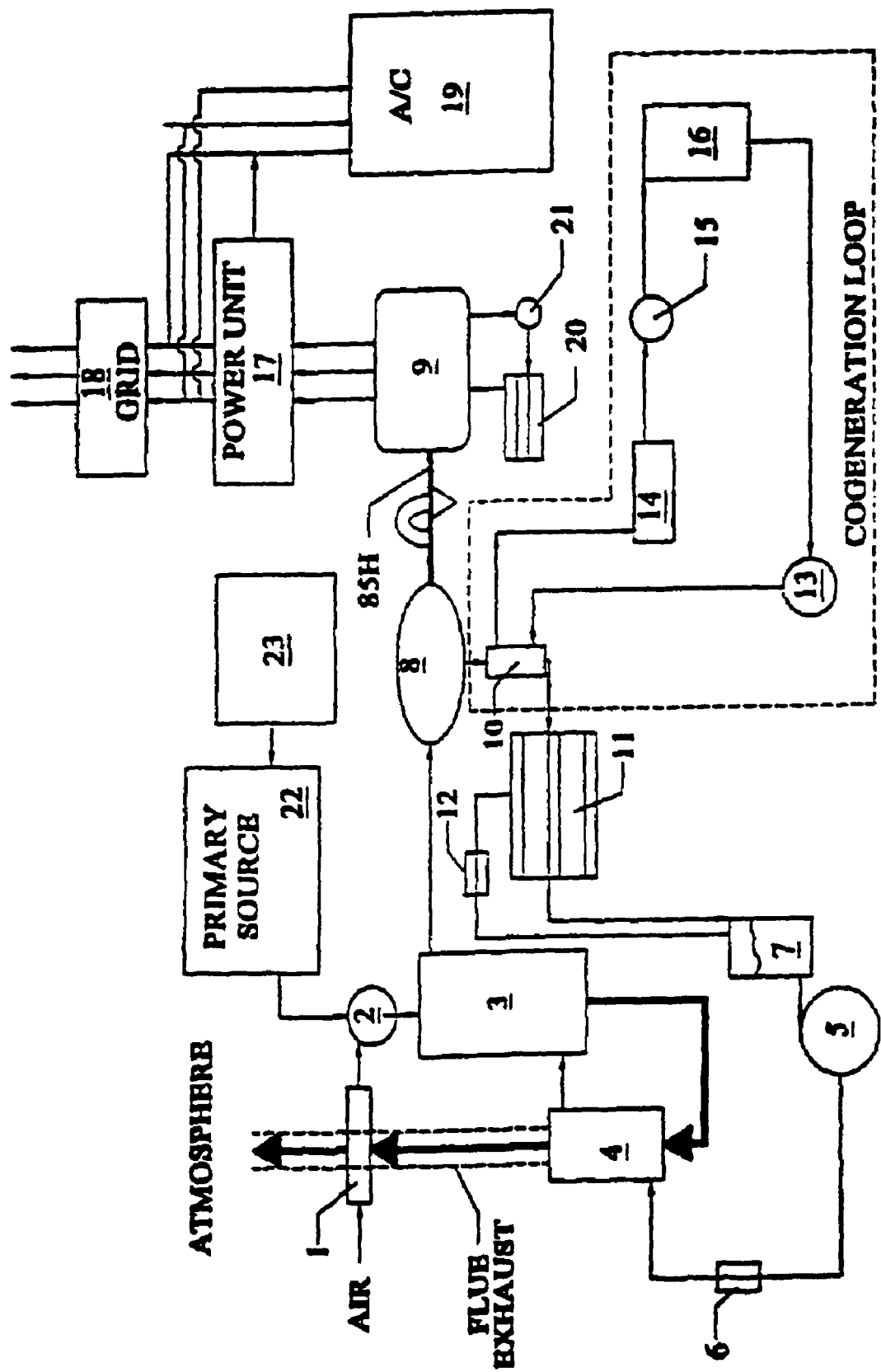
FIG. 1 is an overview diagram of a first preferred embodiment of the invention.

FIG. 1 shows a preferred embodiment of a steam system configuration which can be used to drive an electrical generator or alternator to provide electrical power to a local electrical grid or for use at a local, residential, commercial, or industrial facility or facilities. This steam system can also be used to generate mechanical energy (or power) which in turn can be used to rotate the shaft of a mechanical device or machine to drive vehicles (cars, trucks, boats, ships, trains, airplanes and the like); to drive conveyance systems or devices (moving sidewalks, conveyers, cranes, elevators and the like); or to drive a wide array of other mechanical devices (pumps, compressors, grinders, and the like). The system provides the opportunity to extract heating from the system, using heat exchangers, which can be used as a primary or as a supplemental heating source for space heating, water heating, process heating and the like.

This closed loop system includes: a thermal generator 3 FIG. 1 which is used to combust the air fuel mixture provided by the forced air blower/valve assembly 2 FIG. 1 and heat the steam working fluid to its operating temperature; a steam expander 8 FIG. 1, which produces power at the expander output shaft (8 FIG. 1) by expanding the steam charge provided at inlet; and a steam dissipation coil 11 FIG. 1. A high pressure condenser pump 5 FIG. 1 is used to transfer the condensate from the accumulator 7 FIG. 1 to the thermal generator 3 FIG. 1. A heat recovery device 4 FIG. 1 and an ambient air pre-heater 1 FIG. 1 are used to recover heat energy from the flue exhaust leaving the thermal generator 3 FIG. 1. The heat energy recovered by the heat recovery device 4 FIG. 1 is used to pre-heat the condensate, leaving the accumulator 7 FIG. 1, prior to its delivery to the thermal generator 3 FIG. 1 for reuse. The heat energy recovered by the ambient air pre-heater 1 FIG. 1 is used to heat the incoming ambient air charge prior to use in the combustion process.

The system also includes a primary fuel source 22 FIG. 1 and a backup fuel source 23 FIG. 1; a cogeneration loop, which uses heat recovered from the expander 8 FIG. 1 exhaust stream by the steam to water exchanger 10 FIG. 1, to provide hot water heating, space heating, or low to moderate temperature process heating. A generator 9 FIG. 1 and a power conditioning unit 17 FIG. 1 are used to generate AC or DC power and condition this power for use. Conditioned power, from the conditioning unit 19 FIG. 1 is supplied to the local electrical grid, or a combination of local electrical systems and the local electrical grid.

The specific configuration and purpose of the components of the steam system, as shown in FIG. 1, will now be described.

Figure 4:
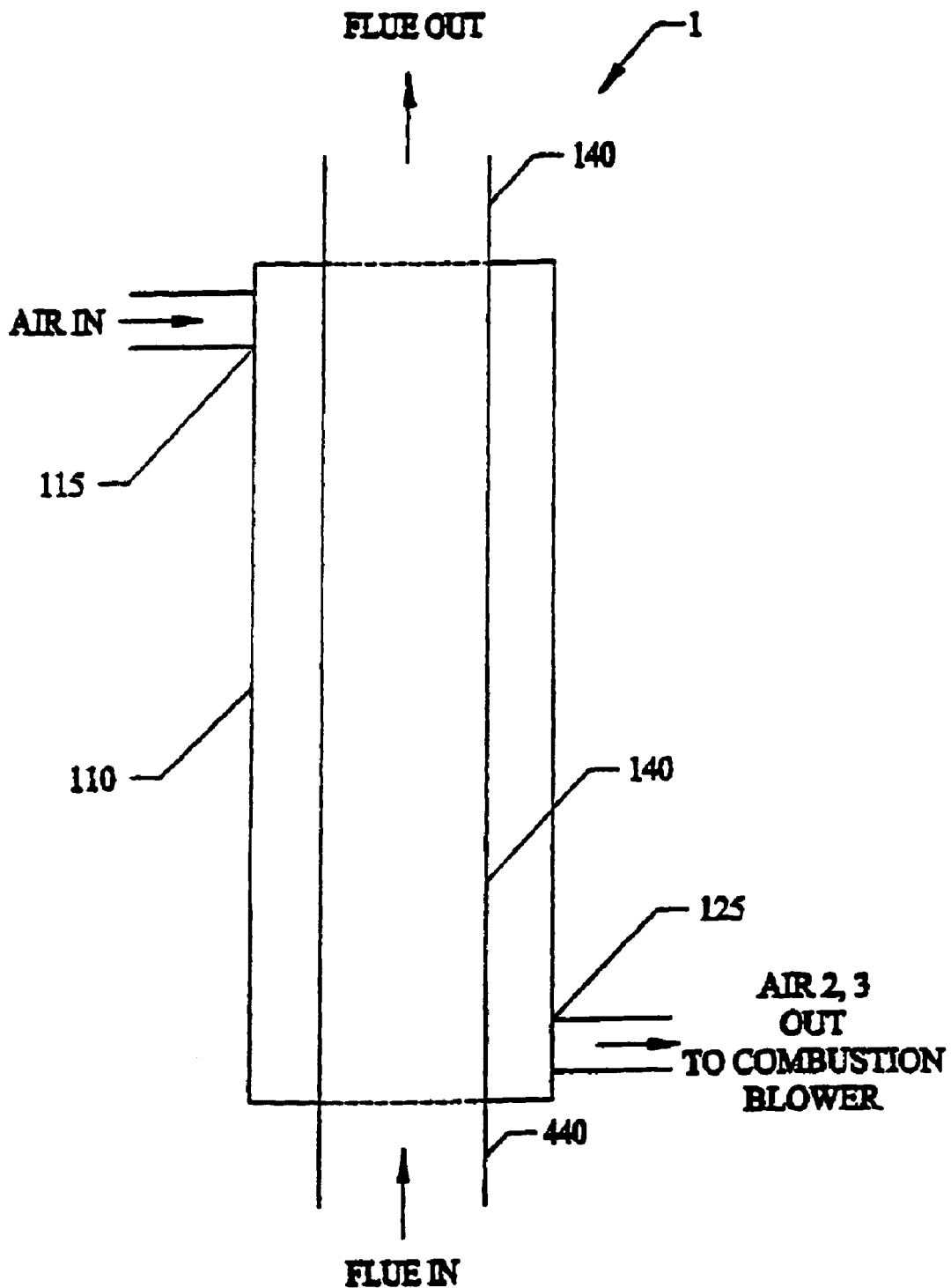
FIG. 4 shows air preheater component for the embodiment of FIG. 1.
Figure 5A:
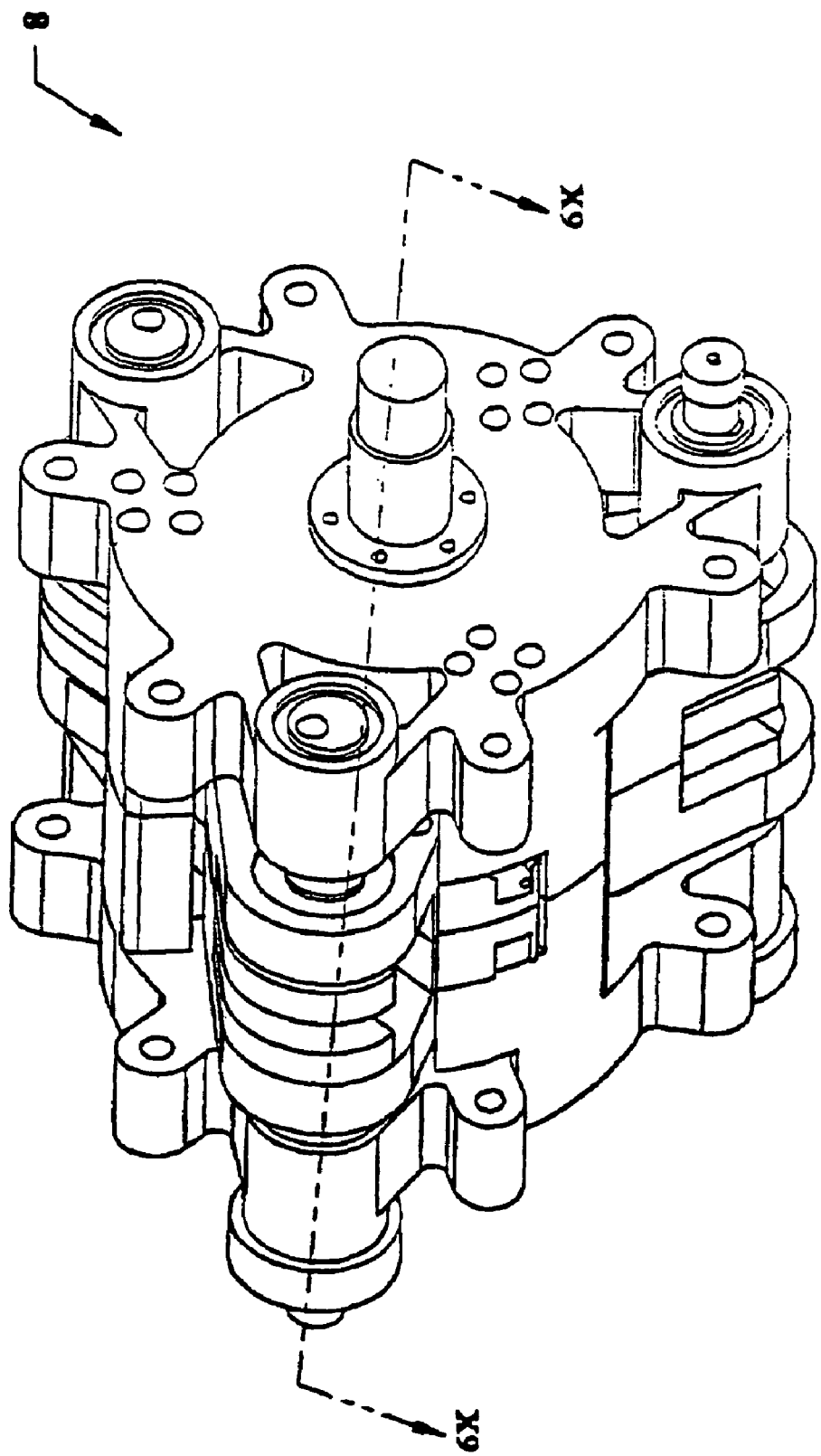
FIG. 5A is a perspective view of an expander driver for the embodiment of FIG. 1.
Figure 5B:
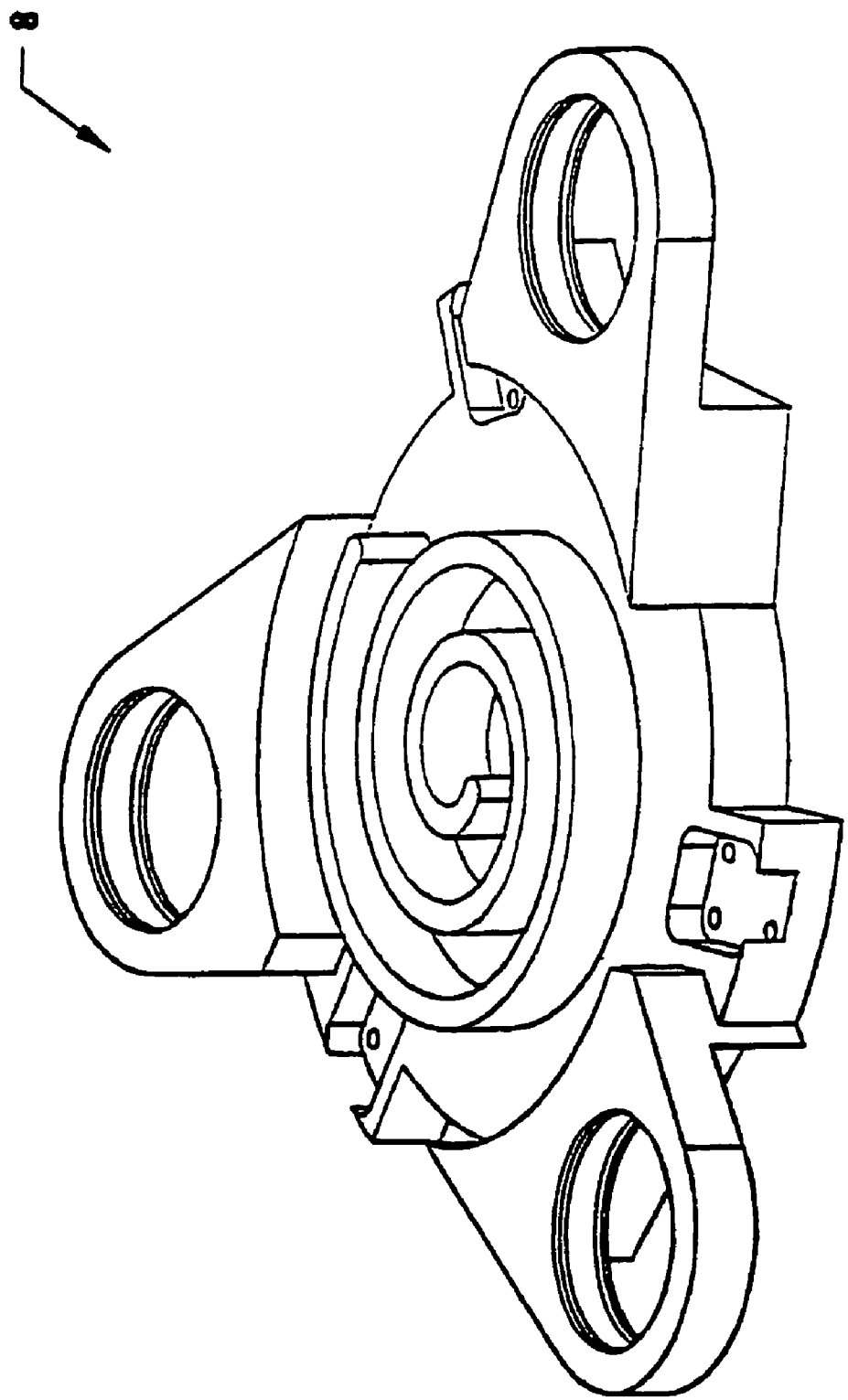
FIG. 5B is an exploded view of the expander driver of FIG. 5A.
Figure 6:
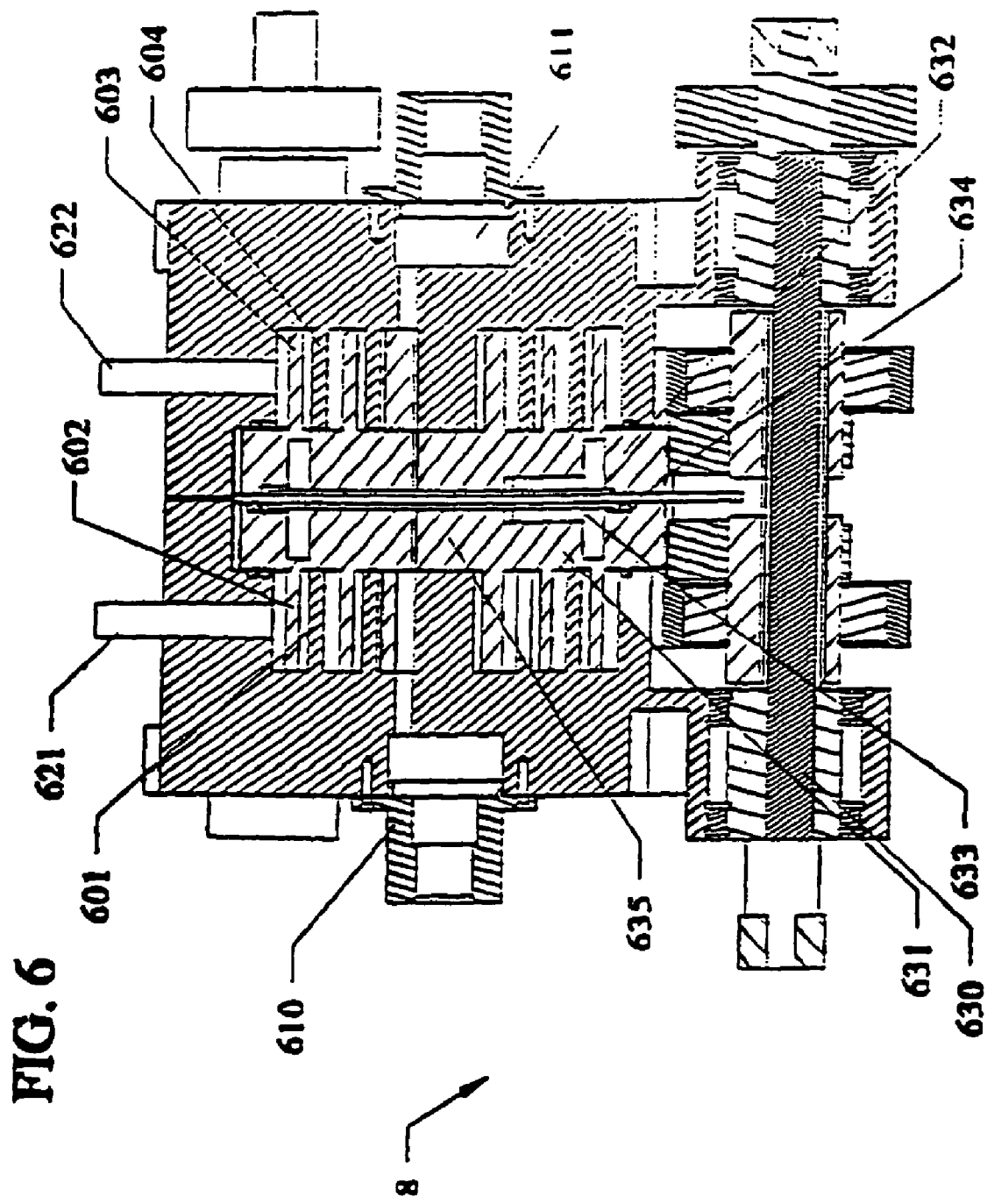
FIG. 6 is a cross-sectional view of the expander driver of FIG. 5A along arrows 6X.

Initially, ambient air is preheated by passing the ambient air coming through an air pre-heater 1 FIG. 1, (as detailed in FIG. 4). The heated air from the air pre-heater is then mixed with a renewable or non-renewable fuel source in the forced air blower/valve assembly 2 FIG. 1. The forced air blower/valve assembly 2 FIG. 1 supplies the air and fuel mixture required for the combustion process using fuel supplied from a primary fuel source 22 FIG. 1, or a backup fuel source 23 FIG. 1. The forced air blower can be sized based on the application and/or requirements of the thermal generator 3 FIG. 1. The fuel metering portion of the forced air blower/valve assembly 2 FIG. 1 controls the rate that the gaseous fuel (natural gas, propane, hydrogen and the like) is supplied to the combustion process in order to provide the optimum stoicometric air to fuel ratio (e.g. for natural gas, that ratio is approximately 10 to 1). Alternative fuels can be used as a backup fuel source 23 FIG. 1, if the primary fuel supply is disrupted. The device can automatically shift to the backup source 23 FIG. 1, such as but not limited to propane tanks, by switching to a different orifice and other adjustments, which can automatically occur, needed for utilization of the backup fuel source 23 FIG. 1.

The proper delivery rate for the air/gas mixture is determined by a feedback signal which can be derived from the load placed on the electric generator 9 FIG. 1 or the load placed on the expander 8 FIG. 1, (which can be sensed at the expander output shaft 8SH FIG. 1). The proper gas air mixture is injected by the forced air blower/valve assembly 2 FIG. 1 into a burner which is located inside the thermal generator (boiler) 3 FIG. 1—(as detailed in FIGS. 2A and 2B). The hot combustion gases are used to heat the incoming water provided from the accumulator 7 FIG. 1 by the high pressure condensate pump 5 FIG. 1. Gases, from the thermal generator 3 FIG. 1, pass through heat recovery device 4 FIG. 1—shown in FIG. 3, then through the air pre-heater 1 FIG. 1 before being exhausted into the atmosphere.

Steam is generated in the thermal generator 3 FIG. 1 (as detailed in FIG. 2A or 2B) (e.g., at a temperature of approximately 1000° F. to 1500° F., and approximately 600 PSI to 1000 PSI). The hot pressurized steam is then expanded, increased in volume, and supplied to expander 8 and the energy produced causes a shaft 8SH FIG. 1 in the expander to turn. The shaft 8SH FIG. 1 is connected to electric generator 9 FIG. 1 or to an alternator which is used to generate AC or DC electrical power.

Referring to FIG. 1, electricity produced, by the generator or alternator, goes to a power conditioning unit 17 FIG. 1 to be conditioned, put in proper phase and frequency, for supply into the local electrical power grid 18 FIG. 1. The electric power grid 18 FIG. 1 can be an existing grid that supplies electrical power to commercial, industrial and residential user applications. Also, electricity from the power conditioning unit 17 FIG. 1, can be used to power local electrical devices or to power a local air conditioner 19 FIG. 1.

A heat dissipating unit can be used to provide cooling, or temperature control, of the generator 9 FIG. 1, or alternator. This heat dissipating unit can include a liquid pump and cooling fan assembly 21 FIG. 1 and standard heat exchanger (for example, a radiator, tubes with fins, and the like) 20 FIG. 1. The liquid pump cooling fan assembly 21 FIG. 1 is used to circulate a coolant through the generator 8 FIG. 1, or alternator cooling coils and provide air flow over the heat exchanger. A heat sensitive speed controller (thermostat) can be used to operate the liquid pump and cooling fan assembly and maintain the required temperature in the generator 8 FIG. 1, or alternator. A cogeneration loop is provided in order to recover waste heat from the hot exhaust stream leaving the expander 8 FIG. 1. This recovered waste heat is then used as an alternative heating source for a domestic water heater 15 FIG. 1, a hot water air heating coil 16 FIG. 1 for room/house hot water space heating or other local user heating loads 13 FIG. 1 such as, but not limited to a swimming pool, a spa, underground pipes for ice and snow removal and the like.

This cogeneration loop 13 FIG. 1 utilizes a steam to water heat exchanger 10 FIG. 1 to extract heat from the expander exhaust stream. A closed loop hot water circulating system is used to circulate the hot water, using pump 14 FIG. 1, between the steam to water heat exchanger 10 FIG. 1, the water heater 15 FIG. 1, the air heating coil 16 FIG. 1, and (or) the other hot water heating applications 13 FIG. 1.

Figure 3:
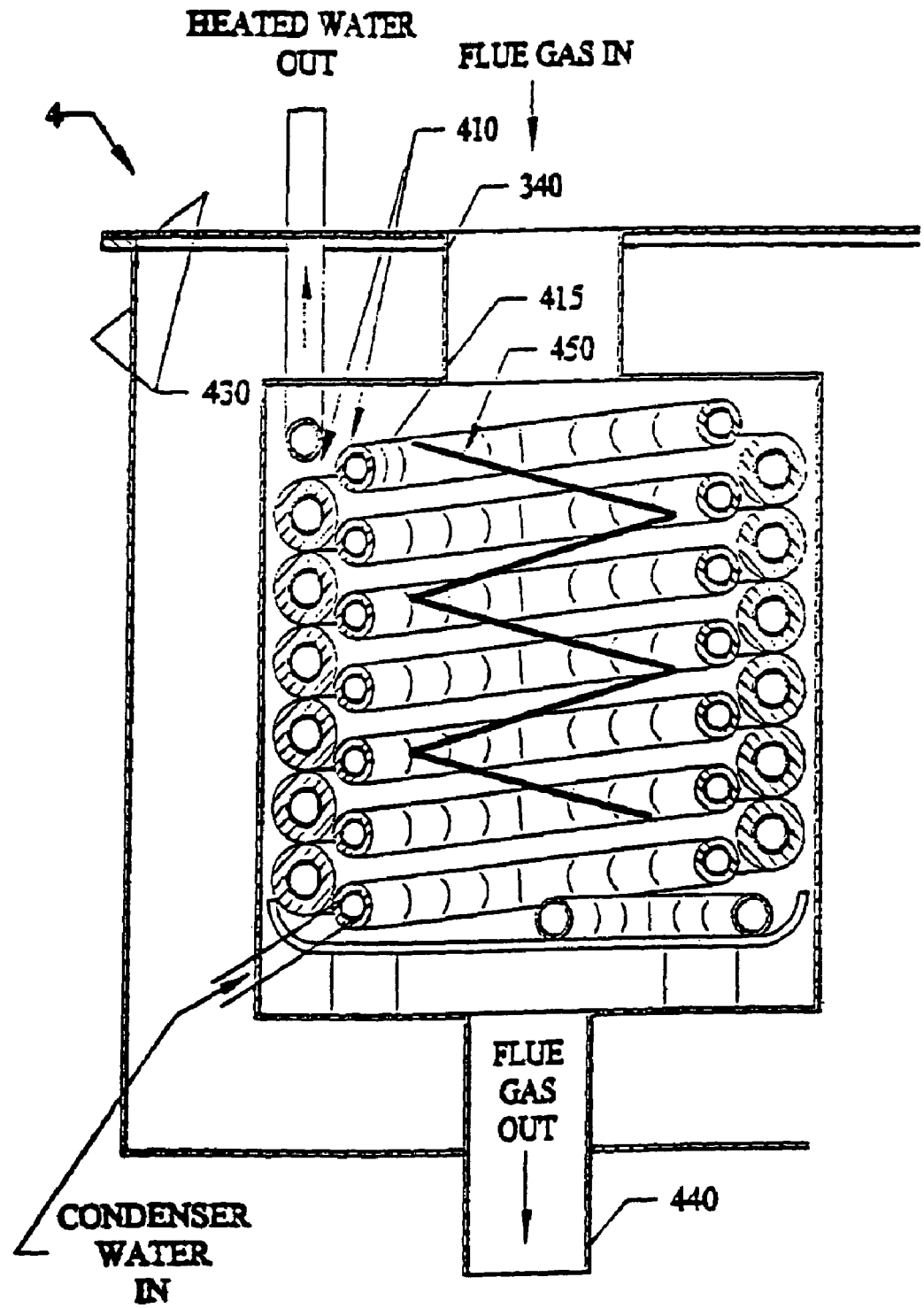
FIG. 3 shows the heat recovery unit for the embodiment of FIG. 1.

The steam, or steam and condensed water mixture, exiting the steam to water heat exchanger 10 FIG. 1 is routed to the steam dissipating coil (or condenser) where any remaining steam is condensed to water. The condensed water leaving the steam dissipating coil 11 FIG. 1 is placed into an accumulator 7 FIG. 1. A dissipation coil vent check valve 12 FIG. 1 is provided in order to relieve any built up vapor pressure. The high pressure condensate return pump (5 FIG. 1) (FIG. 9) pumps the condensate, which is drawn from the accumulator 7 FIG. 1, up to the thermal generator working pressure (e.g., approximately 600 PSI to 1000 PSI). A check valve 6 FIG. 1 is provided downstream of the high pressure condensate return pump to prevent any possibility of backflow of the high pressure condensate. The pressurized condensate then goes to the heat recovery unit (reclaimer) (4 FIG. 1) (FIG. 3). Water can be heated in the heat recovery device (reclaimer) 4 FIG. 1, where it is heated using heat energy recovered from the hot flue exhaust gasses; and then to the thermal generator (boiler) 3 FIG. 1 where it is heated back into steam to complete the cycle.

Figure 2A:
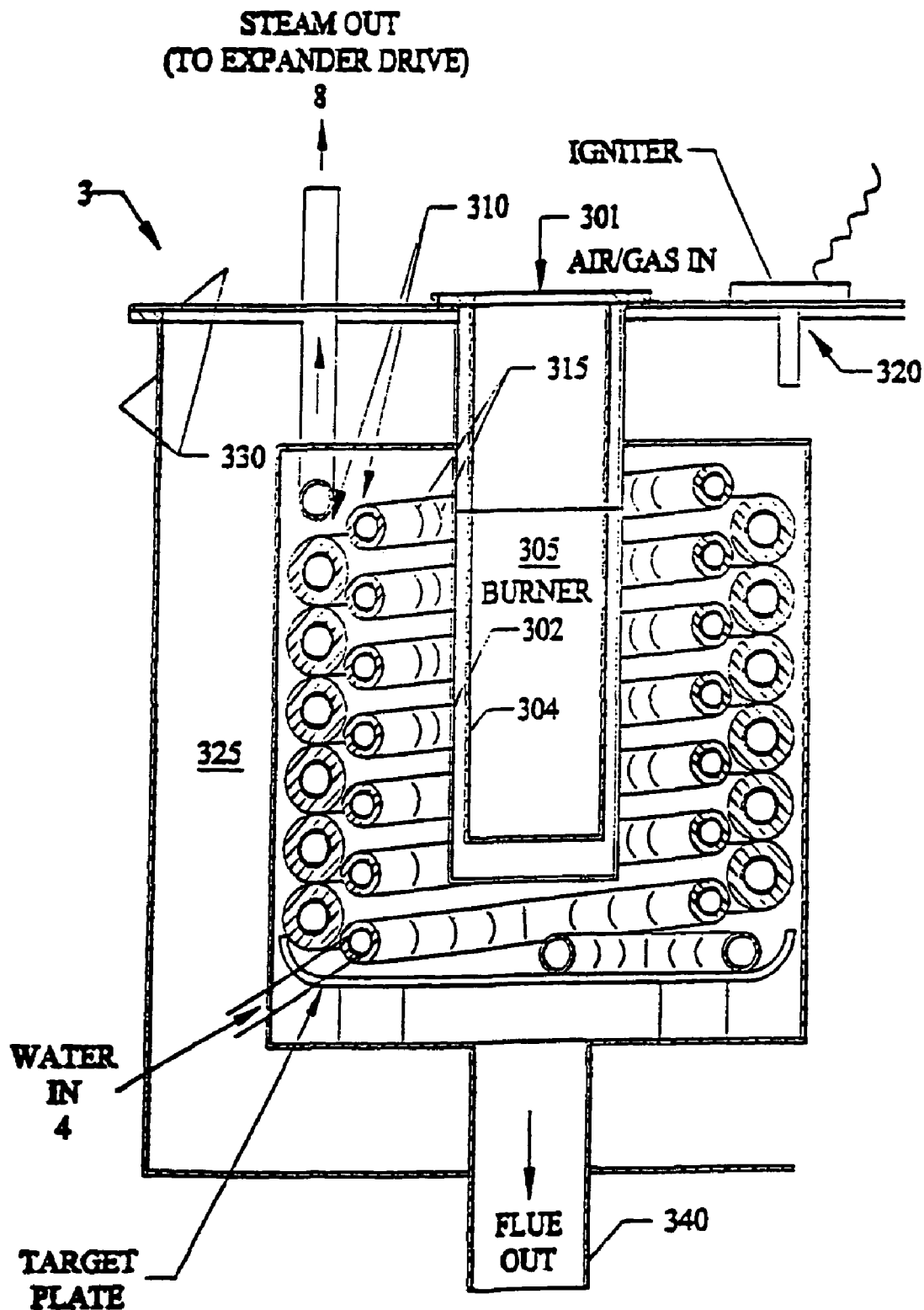
FIG. 2A is a cross-sectional view of a first version heat generator (boiler) for the embodiment of FIG. 1, and can be used for compact spaces when space restricts height dimensions of a boiler of a double coil embodiment.
Figure 2B:
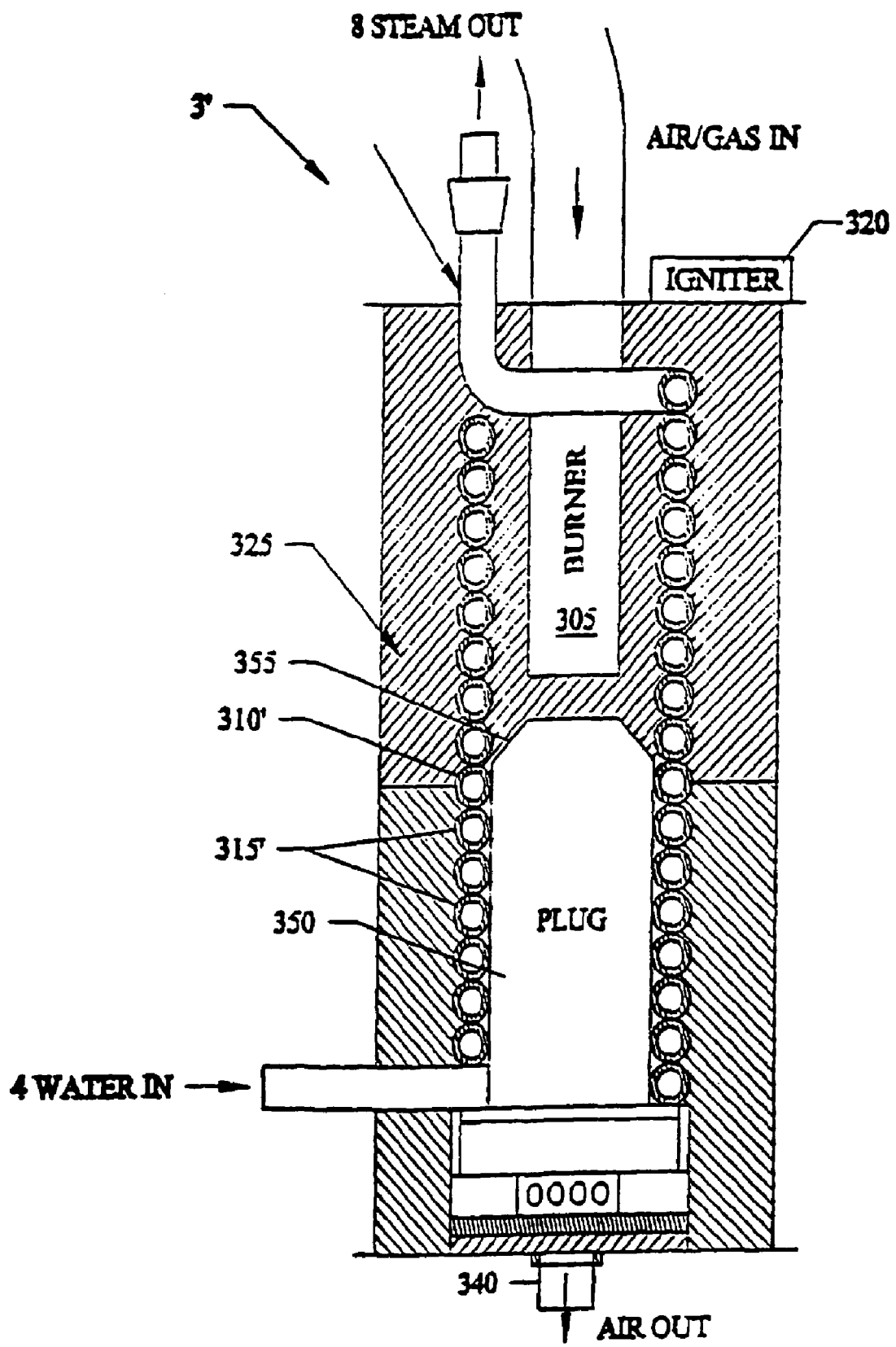
FIG. 2B shows a cross-sectional view of a single wrap fin coil heat exchanger (boiler) for the embodiment of FIG. 1 that can be used where height restrictions are not a problem.

FIG. 2A is a cross-sectional view of a reduced height thermal generator (boiler) for the embodiment of FIG. 1. This reduced height configuration can be used for compact spaces when space restricts height dimensions and precludes the use of a standard height thermal generator. The forced air blower valve assembly 2 FIG. 1, which delivers a mixture of fuel gas and air to the burners 305 FIG. 2B within the thermal generator (boiler) 3, 3' of FIGS. 2A and 2B, is controlled by the ignition module 320 in FIG. 2A and 2B. The combustion process that occurs in the thermal generator 3 FIG. 1 takes place on the burner surface 302, 304 and is used to heat the water to steam in the heat generator tubes 310, 310'.

Referring to FIG. 2A, the burner screens 302 FIG. 2A, 304 FIG. 2A located inside the body of the thermal generator 3 FIG. 1, is where the fuel and air mixture is ignited and burned. The burner 305 FIG. 2A consists of two cylindrical (inner and outer) screens 302 FIG. 2A, and 304 FIG. 2A. The purpose of the dual screens 302 and 304 is to prevent flashbacks from the combustion of the fuel and air mixture. The screens 302 and 304 can be made of Iconel or other high temperature materials, and the like. The heat exchanger (the double wrapped tubes 310 FIG. 2A) are wrapped around the burner 305 FIG. 2A which can be constructed of stainless steel tubing with external, outwardly protruding fins 315 FIG. 2A. The working fluid (water) is pumped to the heat exchanger by pump 5 FIG. 1 (e.g., at approximately 600 to 1000 PSI, where it is heated from an entering temperature of approximately 100° F. to 150° F. to steam at a leaving temperature of approximately 1000° F. to 1500° F.). Once the working fluid is heated to steam it will be delivered to the inlet of the expander drive 8 FIG. 1.

Referring to FIG. 2A, an electrically powered igniter module 320, which is attached to the thermal generator 3 FIG. 1 adjacent to air/gas inlet line 301, can provide the necessary energy (spark) to start the combustion process. The insulation 325 within thermal generator housing 330 retains the heat that is generated during the combustion of the fuel and air mixture within the thermal generator heating cavity to maximize the heat transfer to the internal heat exchanger (wrapped tubes 310). The insulation 325 can be composed of aluminum and silica or other high performance insulation, and the like. The exterior housing 330 of the thermal generator can be constructed of stainless steel, aluminum, high temperature plastic, and the like, and houses the insulation 325, heat exchanger 310, and burner screens 302 and 304.

A downwardly extending flue 340 exhausts the products of combustion (flue gases). The flue gases, which are very friendly to the environment, are primarily carbon dioxide and water vapor with trace amounts (ppm) of CO. A minimal amount of heat (.ltoreq.approximately 2% of total heat generated) is also lost through the flue. The flue gases can be harmlessly exhausted to the atmosphere.

The condensate (or water) entering the thermal generator (boiler) 3 FIG. 1 (as detailed in FIG. 2A), from heat recovery device (reclaimer) 4 FIG. 1 is pumped through the double wrapped finned coiled heat exchanger tubes 310, and exits the boiler as steam, at a temperature (e.g., approximately 1000° F. to 1500° F.) and is then delivered to the inlet of the expander drive 8 FIG. 1.

FIG. 2B shows a cross-sectional view of a standard height single wrap fin coil heat exchanger (boiler) 3' for the embodiment of FIG. 1. This thermal generator configuration can be used where height restrictions are not a problem. In FIG. 2B, a plug 350 FIG. 2B, which can be fabricated from a high temperature insulation material as previously described, is positioned below the burner, and is used for directing the forced air combustion products against the exterior fins on the single layer of wrapped fin covered coil tubes 310'. The upper end 355 FIG. 2B of the plug 350 FIG. 2B can be shaped (chamfered, tapered or conical) in order to provide an optimum flame pattern in the burner. The fins 315' FIG. 2B, which are about the coil tubes 310' FIG. 2B, are used to maximize heat transfer from the burner gases to the condensate (or to the water) circulating through the coils 310' FIG. 2B. The other components in FIG. 2B function similarly to those previously described in reference to FIG. 2A.

The thermal generators 3 and 3' of FIGS. 2A and 2B are used to produce hot high pressure steam to power the expander 8 FIG. 1. The thermal generator shown in FIG. 2A uses a mono-tube 310 FIG. 2A wrapped about it itself, and the thermal generator shown in FIG. 2B uses a single wrap mono-tube 310' FIG. 2B. The mono-tube 310/310', has a very small fluid capacity so that any leakage from the mono-tube would release the steam within the thermal generator without any explosive power.

The condensate (or water) contained in the heating coils 310, 310' can be heated through the saturated steam range into the superheated steam realm all in one heat generating pass as opposed to standard methods which typically use a two-stage (or two pass) stage steam system with separate heating and super heat sections.

FIG. 3 shows the heat recovery device (a liquid condensate heat exchanger or reclaimer) 4 for the embodiment of FIG. 1 which is used to increase the overall efficiency of the system. The recovery device 4 in FIG. 3 is used to capture heat energy from the flue gas exhaust stream exiting the thermal generator 8 FIG. 1 in order to raise the temperature of the condensate (or water) leaving the accumulator 7 FIG. 1 before it is pumped, by the high pressure condensate pump 5 FIG. 1, into the thermal generator 3 FIG. 1.

FIG. 4 shows the air preheater 1 for the embodiment of FIG. 1. The air pre-heater is used to increase the efficiency of the system by recovering heat energy which is usually lost in the flue 440 FIG. 4, 140 FIG. 4 exhaust gases. The heat energy recovered in the air preheater is used to increase the temperature of the incoming ambient air, prior to its delivery to the forced air blower/valve assembly 2 FIG. 1, thereby reducing the overall energy needed and increasing the overall efficiency of the system. The air preheater 110 FIG. 4 consists of a simple air to air heat exchanger and can be made of stainless steel materials for long life. Ambient air can be pulled from the opening 115 FIG. 4 into the annular chamber 110 FIG. 4 surrounding the flue 440 FIG. 4, 140 FIG. 4, by the forced air blower/valve assembly which is located downstream of outlet 125 FIG. 4 of the air preheater 1 FIG. 1.

The expander 8 FIG. 1 is used to expand the hot pressurized steam, as received from the thermal generator FIG. 1, and produce work needed to turn shaft 8 FIG. 1 and drive the generator 9 FIG. 1. Work is produced in the expander by expanding the steam to produce a low pressure/low temperature steam and condensate (water) mixture at the expander exhaust, using the Supertropic Expansion Process previously described. The exhaust from the expander can consist of a low pressure/low temperature steam, or a mix of low pressure/low temperature steam and condensed steam (condensate), depending on the specific conditions (the specific temperatures and pressures) existing at the expander exhaust port(s).

The expander 8 FIG. 1 must be a positive displacement expansion device having a fixed expansion ratio and must be capable of handling both the liquid and vapor products that occur as the result of the Supertropic Expansion Process. Based on this requirement the expander 8 FIG. 1 may be a scroll, rotary vane, Wankel, piston, free piston or other positive displacement device so long as the device used is saturated vapor tolerant, including any combination of liquid part to vapor part ratios from 100% liquid to 100% vapor.

Rotary vane or Wankel expanders are saturated vapor tolerant, including any combination of liquid part to vapor part ratios from near 100% liquid to 100% vapor, in much the same manner as previously described for a scroll expansion device.

Reciprocating piston or free piston type devices, or other types of positive displacement expansion devices can also be used as the expander 8 in FIG. 1. In order to use a reciprocating piston device, the configuration of the device must be such that it can accommodate the quantities of liquids that can occur in the expander during the expansion process. This can be accomplished by providing sufficient volume between the piston and the top of the cylinder, to accommodate the liquid volume, or by using valves, or ports, which facilitate the removal of the liquid generated during the expansion process.

Figure 7:
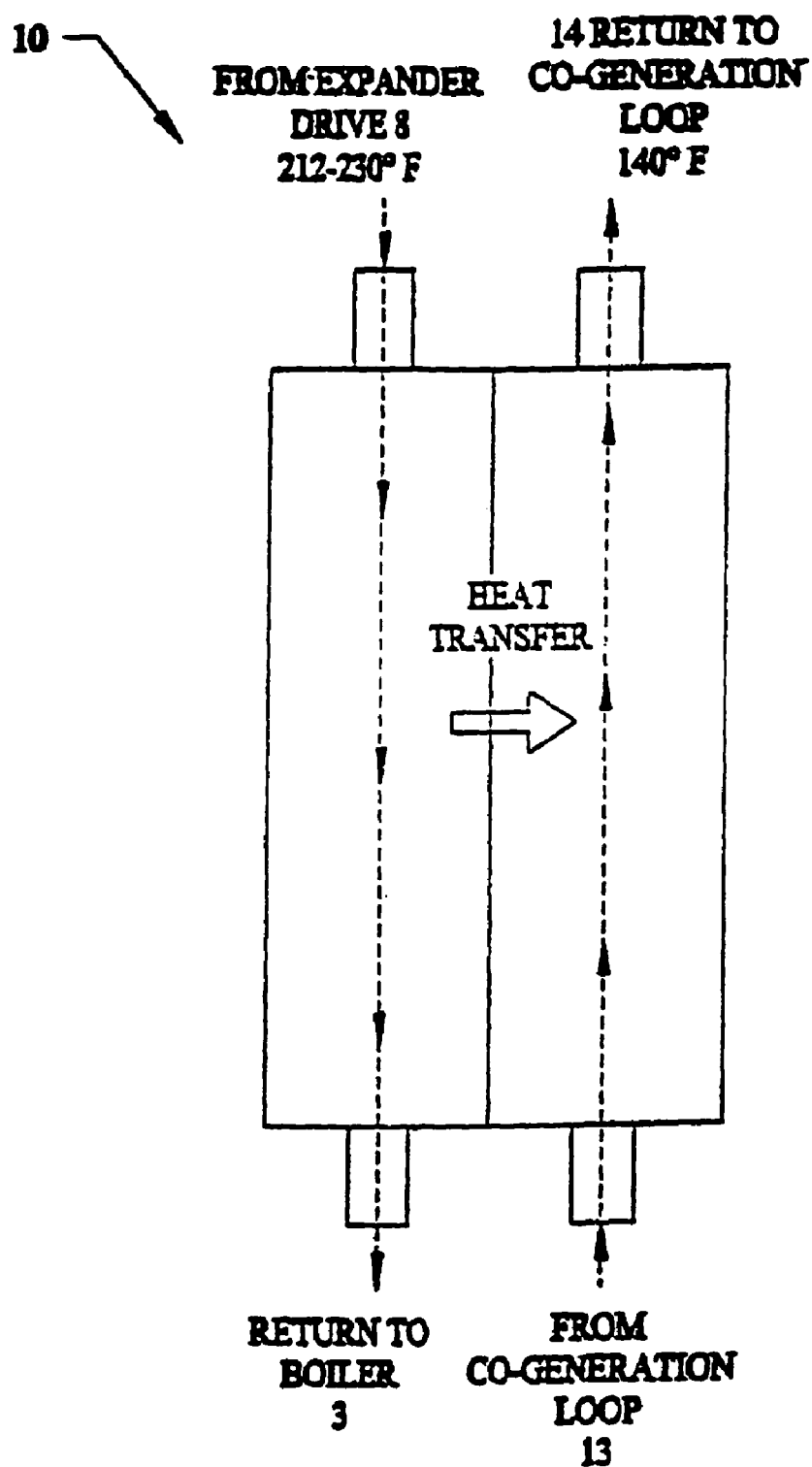
FIG. 7 shows the steam to water exchanger (Co Generation Steam condenser) for the embodiment of FIG. 1.

FIG. 7 shows the steam to water exchanger (a cogenerator steam condenser) 10 FIG. 7 for the embodiment of FIG. 1. This device consists of a heat exchanger, which can be a simple flat plate or tube in tube type heat exchanger, which is used to extract heat energy from the expander 8 FIG. 1 exhaust stream as a heating source to heat water for cogeneration usages including: domestic hot water heating, space heating, and other end user related hot water heating applications. The steam to water exchanger 10 FIG. 7 extracts heat energy from the expander exhaust gases flowing on one side of the exchanger and then transfers this recovered heat energy to the fluid (water) which is circulating from cogeneration loop 13 FIG. 1.

FIG. 8A shows a side view of the steam dissipation coil (or condenser) 11 FIG. 8A for the embodiment of FIG. 1, and includes a coil and fan assembly as shown in FIG. 8A and FIG. 8B. The steam dissipation coil is used to condense the steam exhaust exiting from the expander 8 FIG. 1 when all co generated heating requirements have been satisfied. The condensate coil 11 FIG. 1 can be an off-the-shelf unit made of stainless steel tubes with stainless steel or aluminum fins. The heat rejection fan assembly 11 FIG. 11, as used in the air cooled condenser application, can be a modulating speed motor blower assembly which is controlled based upon the temperature of the steam dissipation coil. This fan assembly can be an off-the-shelf fan speed controller.

Figure 9:
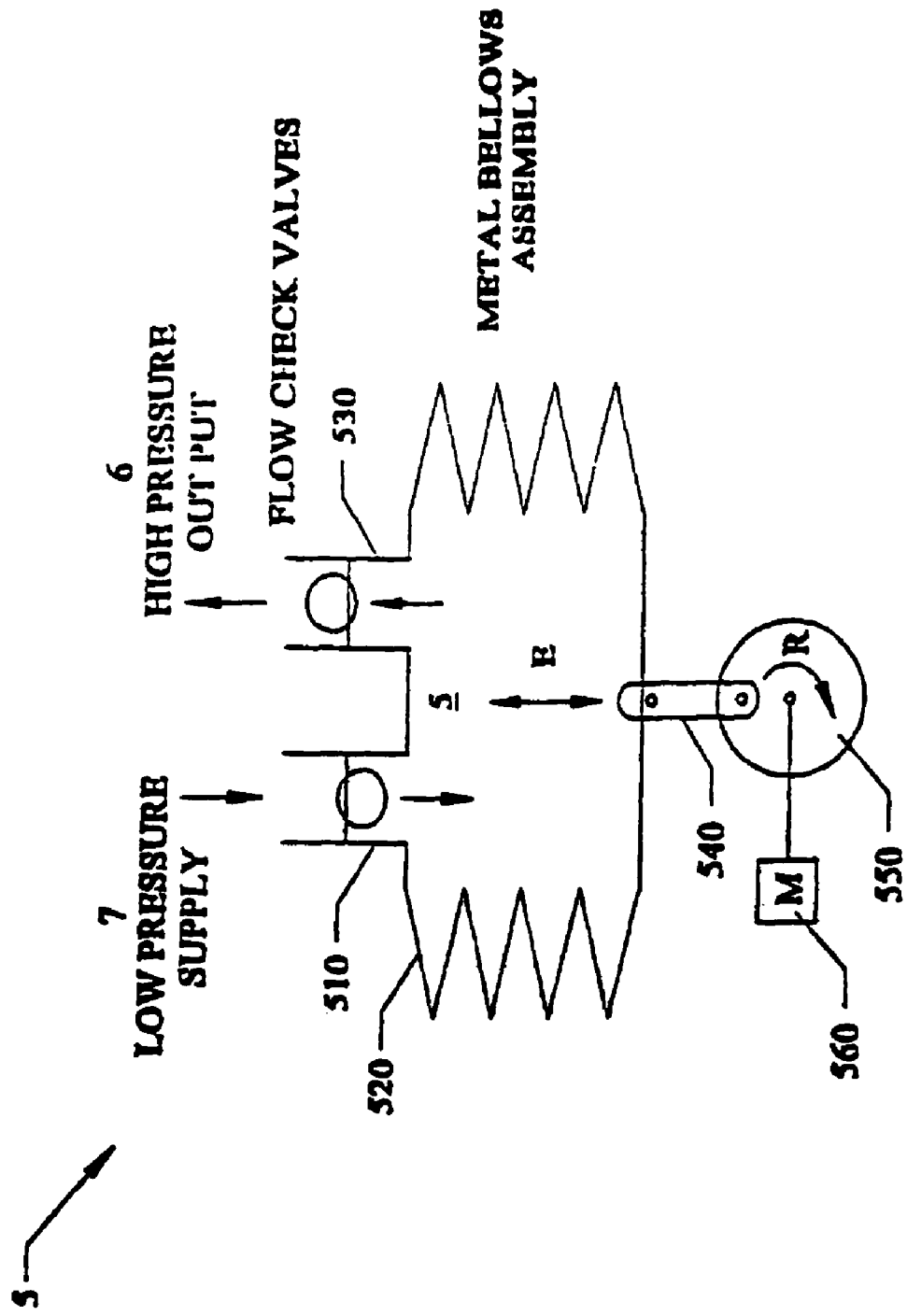
FIG. 9 shows the condensate return pump (high pressure return pump) for the embodiment of FIG. 1.
Figure 10:
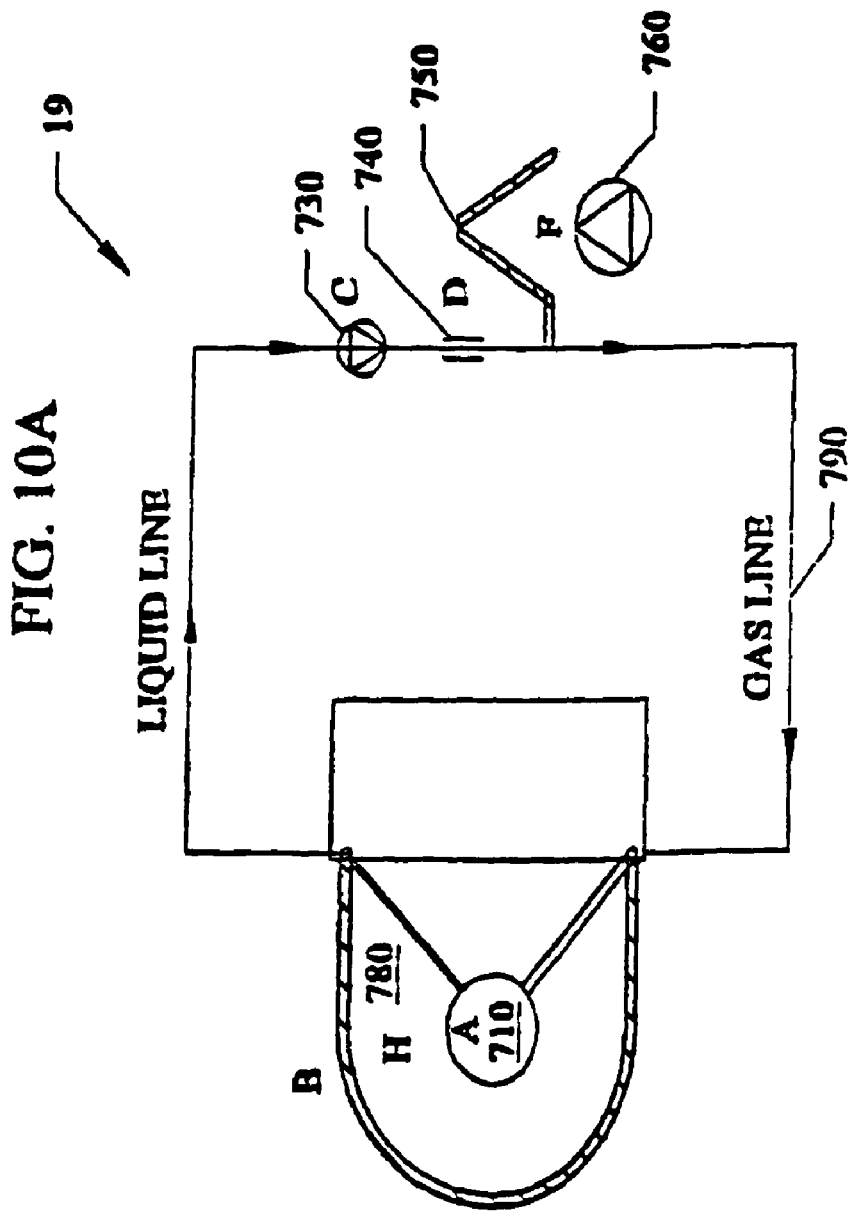
FIG. 10A shows a top view of the air conditioner unit and system of FIG. 1.
FIG. 10B is a cross-section of the novel rifled and turbulator tubing used in the A/C unit 19 of FIG. 1.

The high pressure condensate return pump 5 in FIG. 1 is used to transfer the low pressure condensed working fluid (water) from the accumulator 7 in FIG. 1 to the high pressure inlet side of the thermal generator 3 in FIG. 1 via the heat recovery device 4 in FIG. 1. The high pressure condensate pump 5 in FIG. 1 can be a conventional high pressure water pump or a metal bellows pump as shown in FIG. 9. The high pressure condensate pump provides discharge pressures of (e.g., 600 PSIA to 1000 PSIA) as required for the operation of the thermal generator 3 in FIG. 1 and the expander 8 in FIG. 1.

The power conditioning unit 17 FIG. 1 provides the capability to control the operation of the generator, or alternator, and is used to condition the AC or DC output from the generator, or alternator, as required for delivery to the local electrical grid or to power local electrical end users. The power conditioning unit 17 FIG. 1 can be an off the shelf power controller (of the type manufactured by Honeywell, Vemsys, Vazidigm or others) or as typically provided as a part of an integrated generator/power controller and conditioner package. This unit can also include those capabilities necessary to monitor and record local user electrical use, from the local electrical grid; monitor and record power provided to the local electrical grid, from the power conditioning unit; and can provide those interfaces needed to integrate the operation of the system with the local utility. A separate steam systems control module can be used to operate, control, and monitor the performance of the components of the steam and co-generation system.

Figure 11:
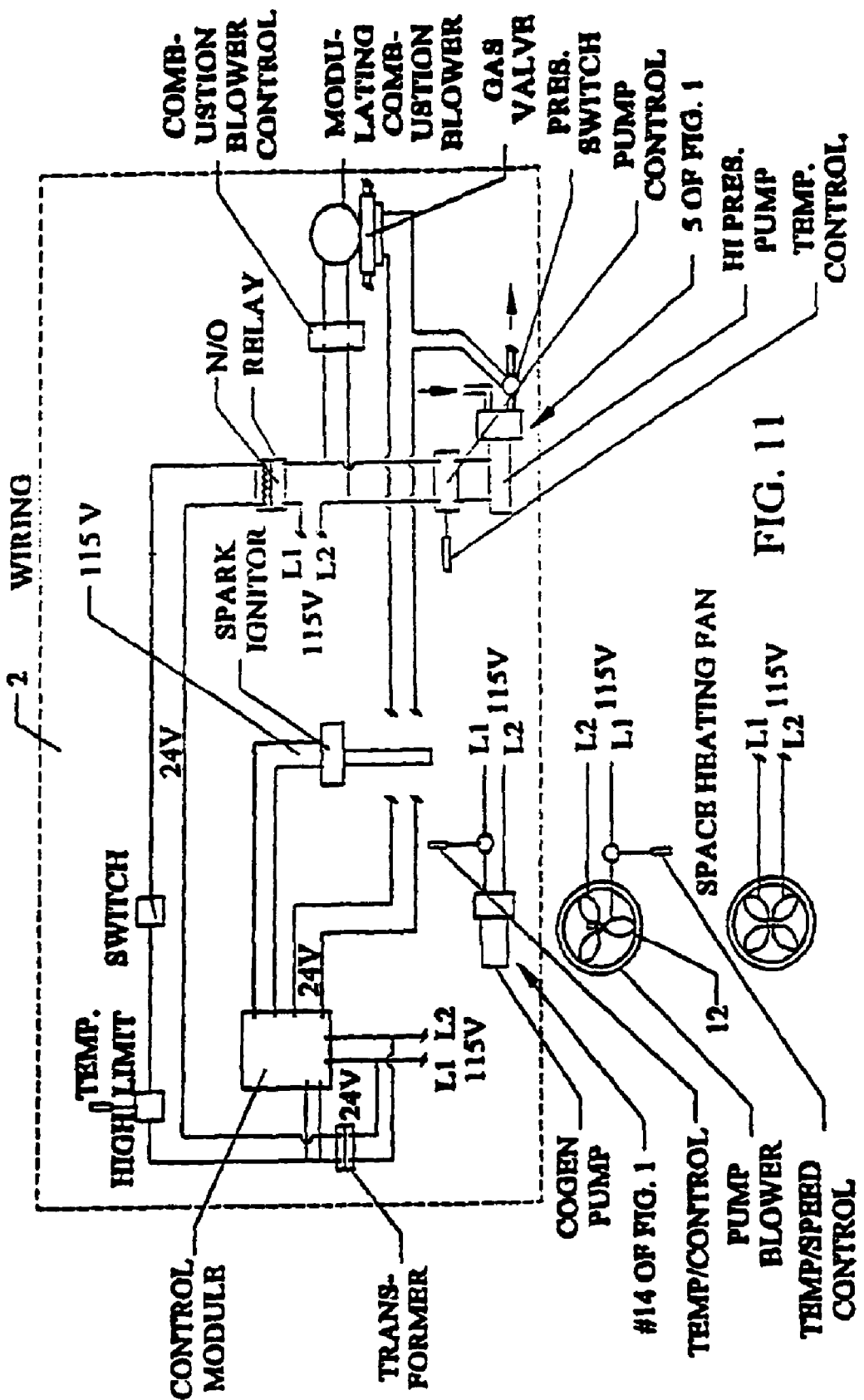
FIG. 11 shows a wiring diagram for various components for FIG. 1.

FIG. 11 shows, at a top level the various components that can be operated/controlled/monitored by the steam systems control module. This stand alone control module would be used to process the inputs received from the many pressure, temperature, and flow rate sensors located in the various components of the steam system, and provide the outputs needed for stable operation of the steam system. The steam system control module would also provide the capability to sense, or identify, and respond to any out of the limit conditions and issue the necessary control commands to assure safe operation of the system or to safely secure the system. If the out of limit conditions warrant, the steam systems control module can monitor systems performance and maintain/update/record that data and information, as needed for the maintenance and repair.

The steam systems control module can provide the capacity to operate, control and monitor steam systems components including: the gas ignition device, which can be either a hot surface igniter or spark igniter of 115 volts, the modulating combustion blower and modulating gas valve, the high pressure condensate pump, the electric generator cooling circulating pump, the cogeneration pump, the heat dissipation coil blower fan, and the space heating fan (which would be located in the air conditioning unit evaporator cabinet). The air conditioning unit system 19 can use a separate stand alone control (which would be an integral part of the air conditioning unit package) circuit or utilize the capabilities provided by the steam system control module for operation, control, and monitoring of the air conditioning system components.

A combined, or integrated, power conditioning unit/steam systems control module can be used to control the generator, or alternator; to condition the generator or alternator AC or DC output; and operate, control, monitor the components of the system and cogeneration system. This single integrated power conditioning unit/steam systems control module, would provide the capability to perform the total range of functions previously addressed for both the power conditioning unit and the steam systems control module.

Figure 12:
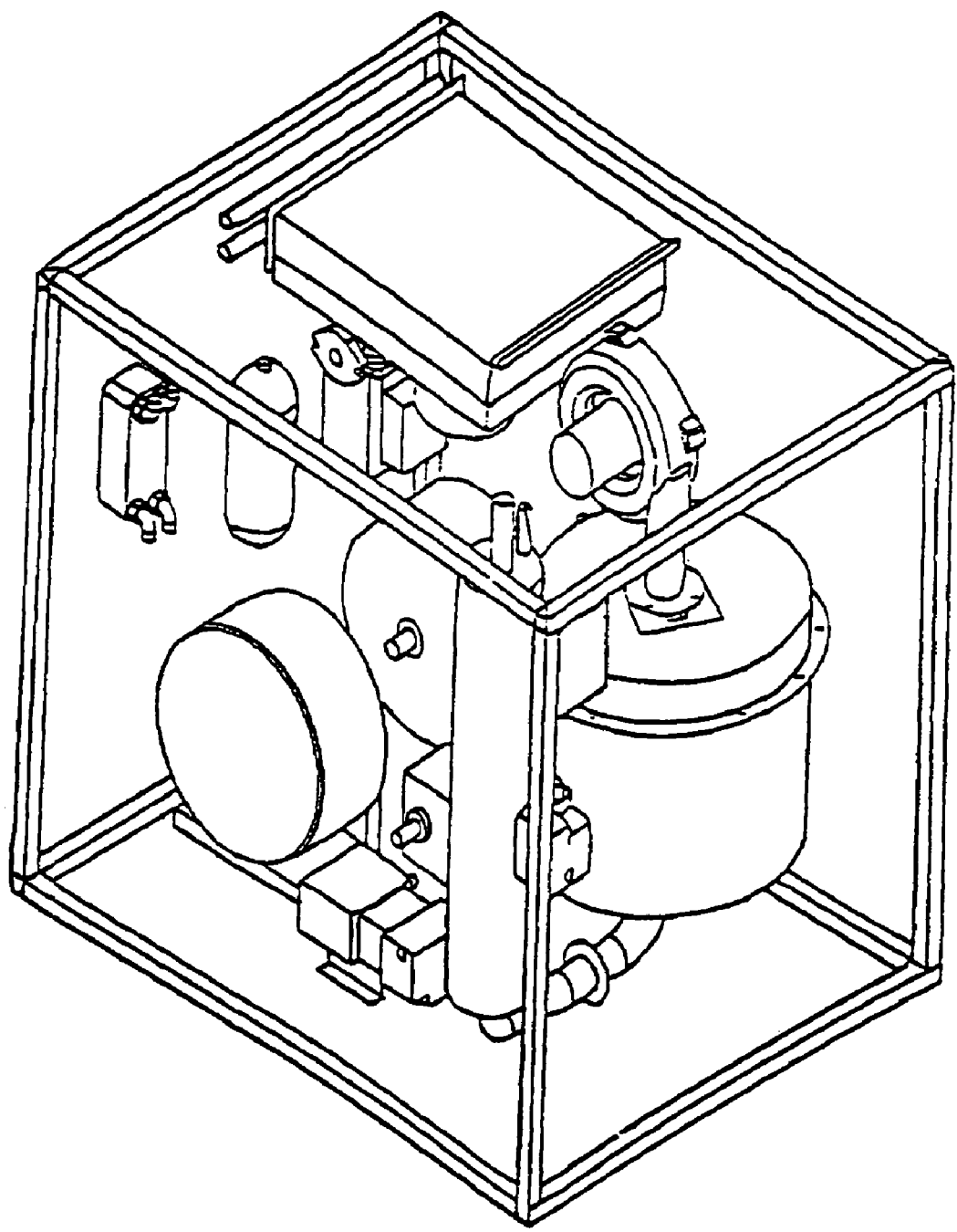
FIG. 12 shows a preferred layout of all the components of the invention in a 3' by 4' by 5' box for use by the end user of the invention.
Figure 13:
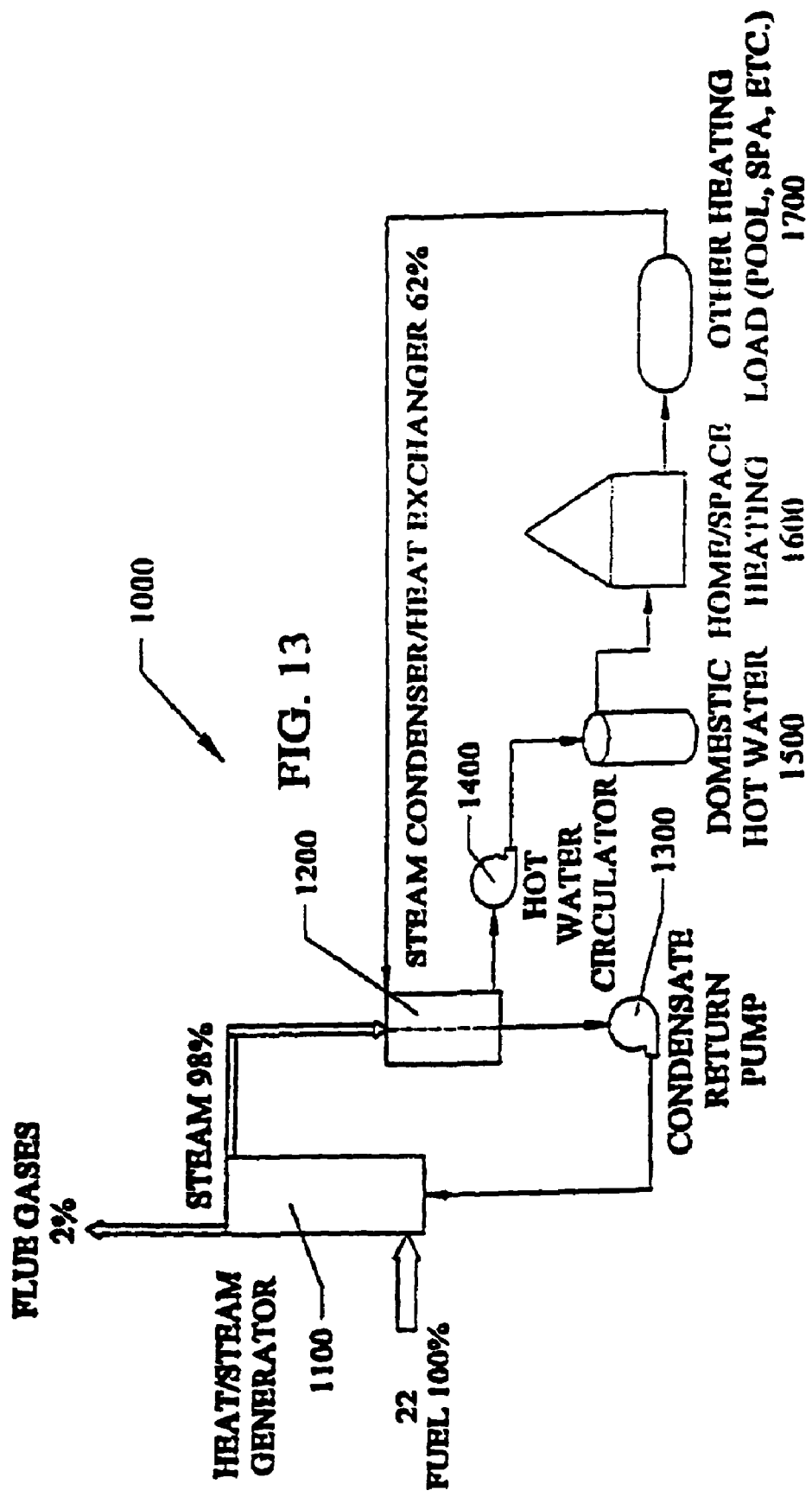
FIG. 13 shows a second preferred embodiment for heat generation using a closed loop steam generator system.

FIG. 12 shows a perspective view of a preferred layout of all the components for the system configuration depicted in FIG. 1. It is anticipated that the system can be packaged in an enclosure measuring approximately 3'×4'×5'.

The air conditioner unit/system (19 FIG. 1) can be a conventional off-the-shelf high efficiency unit (approximately 20 SEER or better). The compressor can either be a straight electrically-driven compressor (using an electric motor) or can be mechanically driven (from the expander drive shaft 8SH.

Figure 14:
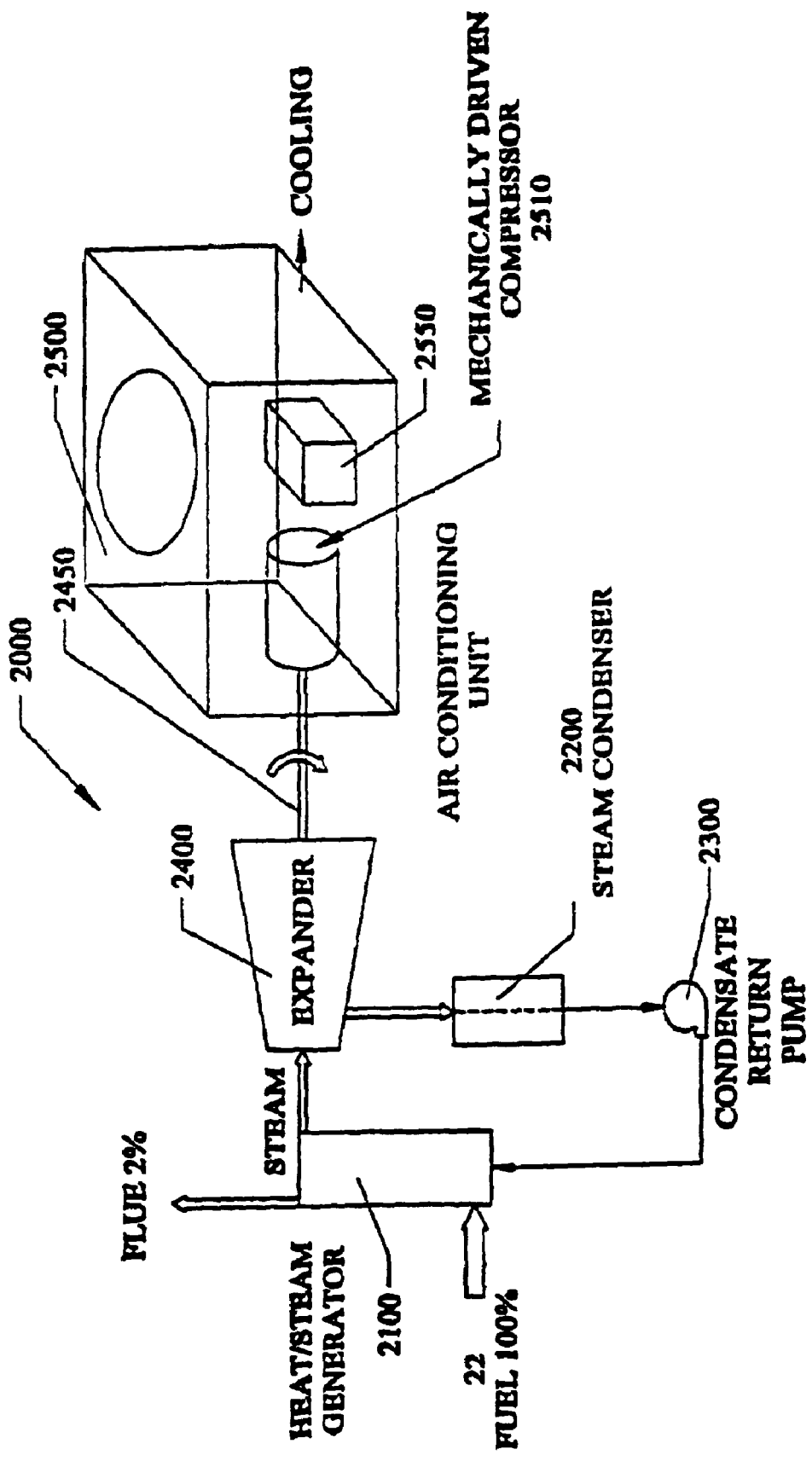
FIG. 14 shows a third preferred embodiment for powering a drive shaft driven air-conditioner unit using the novel steam generator, expander and steam condenser of the invention, which is a vaporous fuel supplied air conditioner.

FIG. 14 shows a third preferred embodiment 2000 for powering a mechanically driven air conditioning compressor 2510 using the novel steam generator 2100, expander drive 2400 and steam condenser 2200 of the invention. The steam generator 2100 referenced above in FIGS. 2A and 2B turns water into steam by burning a renewable or non-renewable fuel source such as natural gas, propane, or hydrogen or any other vaporous or liquid fuel. The hot pressurized steam enters expander 2400 where it is expanded (reduced in pressure and temperature and increased in volume) producing the work used to rotate output driveshaft 2450. The output drive shaft is mechanically connected to a direct drive air conditioning compressor 2510 and used to compress the refrigerant used in the cooling process. The remaining air conditioning system components would be identical to those used in a standard off-the-shelf high efficiency air conditioning unit 2550 (fan, condenser and motor for supplying cooled air), such as but not limited to those manufactured by Trane, York, Carrier, and the like. The low pressure/low temperature exhaust stream exiting the expander 2400 passes to a steam to water/air condenser exchanger 2200 (10 FIG. 7) where any remaining steam is condensed (changed back into water) before being returned, as a high pressure low temperature liquid, to the thermal (steam) generator 2100 (boiler 8 FIGS. 2A and 2B), by high pressure condensate return pump 2300 (5 FIG. 9) for re-heating (to steam) for reuse.

Figure 15:
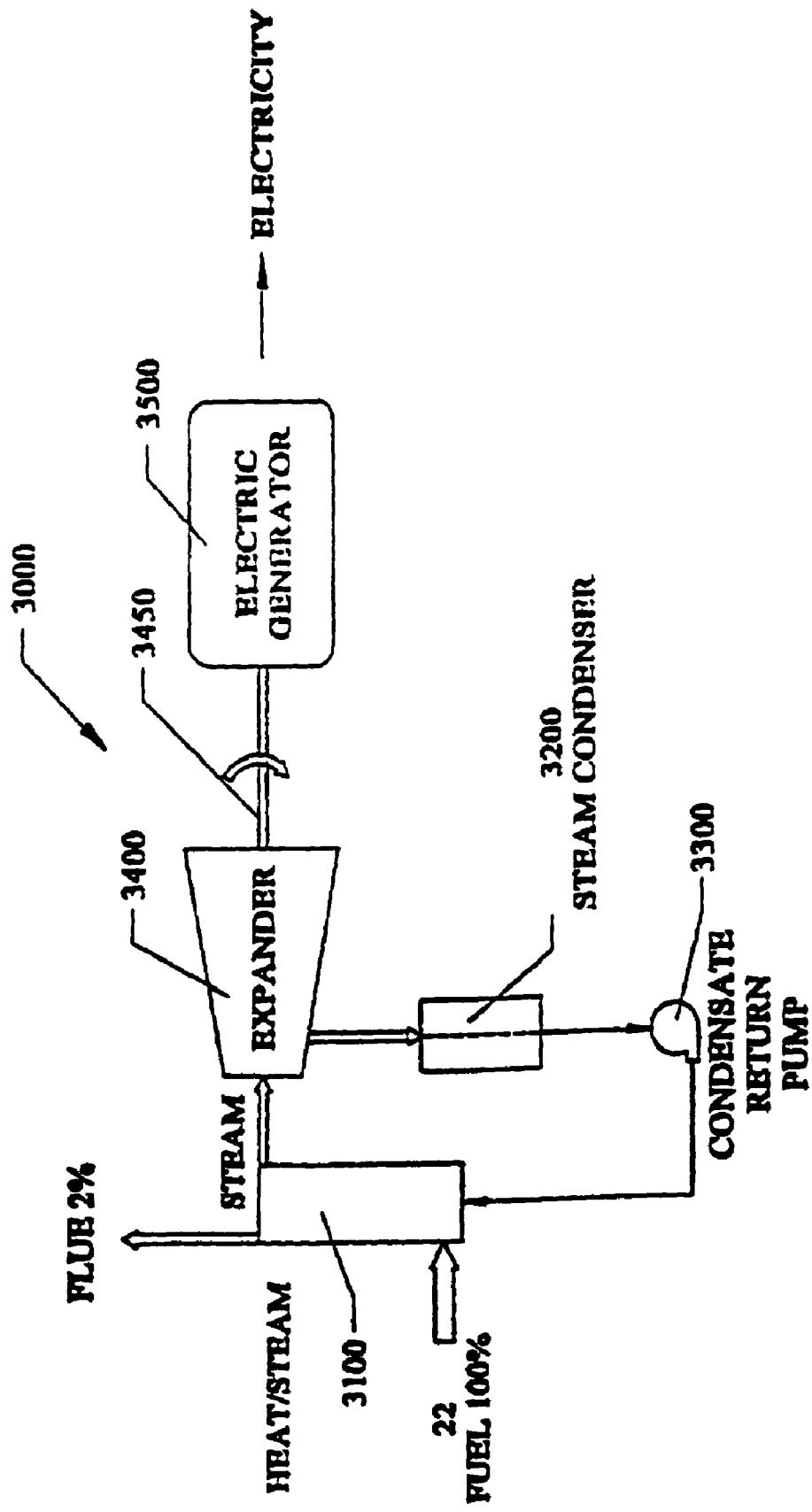
FIG. 15 shows a fourth preferred embodiment for supplying electricity to any electrically powered device or system using the novel steam generator, expander and steam condenser of the invention.

FIG. 15 shows a fourth preferred embodiment 3000 for driving an electric generator 3500, or alternator, supplying electricity to any electrically powered device or stand alone end use system using the novel steam generator 3100 (boiler 8 FIGS. 2A and 2B), expander drive 3400 and steam condenser 3200 of the invention. The steam generator 3100 referenced above in FIGS. 2A and 2B turns water into steam by burning a renewable or non-renewable fuel source 22 such as natural gas, propane or hydrogen, or any other vaporous or liquid fuel. The hot high pressure steam enters the expander 3400 where it is expanded (reduced in pressure and temperature and increased in volume) producing the work used to rotate output driveshaft 3450. The output driveshaft is mechanically connected to an electrical generator 3500 or alternator which is used to produce the electrical power. The low pressure/low temperature exhaust stream exiting the expander 3400 passes to a steam to water/air condenser exchanger 3200 (10 FIG. 7) where any remaining steam is condensed (changed back into water) before being returned as a high pressure low temperature liquid, to the thermal (steam) generator 3100, by high pressure condensate return pump 3300 (5 FIG. 9) for reheating (to steam) for reuse.

It should be noted that the term "vehicle", as used in the subsequent sections refers to conventional prime movers and includes, but is not limited to, automobiles, trucks, trains, boats, ships, airplanes and the like. Also, the term "conveyance" as used in the subsequent sections refers to those movers used to move materials, goods, or products. These other means of conveyance can include, but are not limited to, cranes, conveyors, elevators, moving sidewalks and the like.

In addition, it should also be noted that the embodiment's described in the subsequent, and prior, sections are readily scalable to produce larger or smaller systems to meet the requirements of a wide range of user applications. Specifically, larger systems, with power levels in the 20 to 30 kW range or larger and smaller systems, with power levels as small as a horsepower or less can be built using the novel steam generator, expander, and condenser system of the invention.

Figure 16:
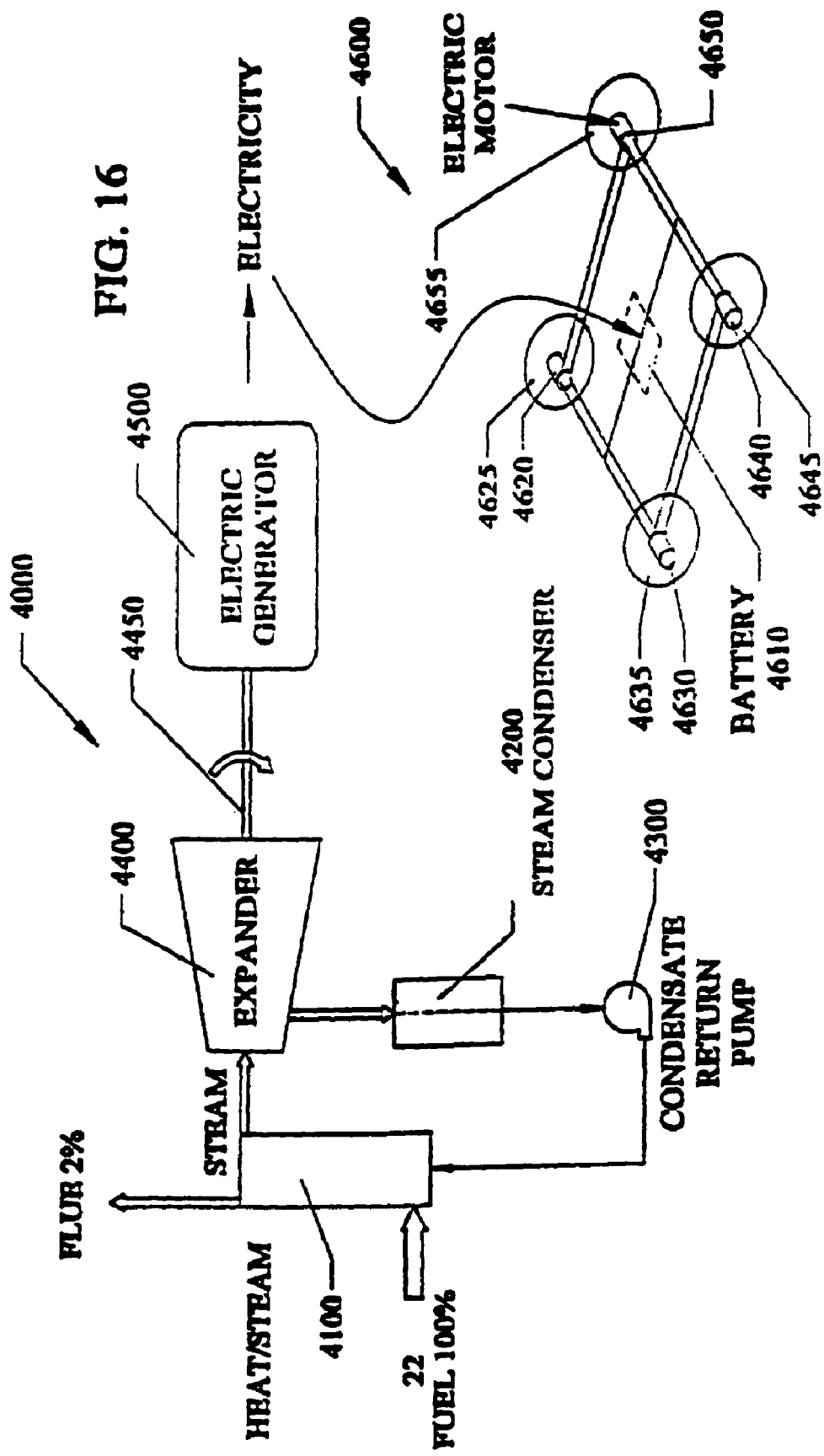
FIG. 16 shows a fifth preferred embodiment for supplying electrical power to an electric vehicle, such as an electric car using the novel steam generator, expander and steam condenser of the invention.

FIG. 16 shows a fifth preferred embodiment 4000 for supplying electrical power to an electrical vehicle 4600 using the novel thermal generator 4100, expander drive 4400, and steam condenser 4200 components of the invention. The thermal generator 4100 referenced above in FIGS. 2A and 2B turns water into steam by burning a renewable or non-renewable fuel source 22 such as natural gas, propane or hydrogen, or any other vaporous or liquid fuel. The hot pressurized steam enters the expander 4400 and is expanded (reduced in pressure and temperature and increased in volume) causing work which is used to rotate driveshaft 4450. The driveshaft is mechanically connected to an electrical generator 4500 or alternator. The electric generator 4500 or alternator supplies electricity to the vehicle battery, or batteries 4610 which are used to store the electrical energy for future use or to electric motors 4620, 4630, 4640, 4650 that are used to drive the vehicle, by rotating axles connected to wheels 4625, 4635, 4645, 4655 of a vehicle 4600. The vehicle can be a car, truck or any other type of conveyance.

Steam exiting the expander 4400 passes to a steam to water/air condenser exchanger 4200 (10 FIG. 7) where any remaining steam is condensed (changed back into water) before being returned as a high pressure low temperature liquid, to the thermal (steam) generator, by high pressure condensate return pump 4300 (5 FIG. 9), for reheating to steam for reuse.

Figure 17:
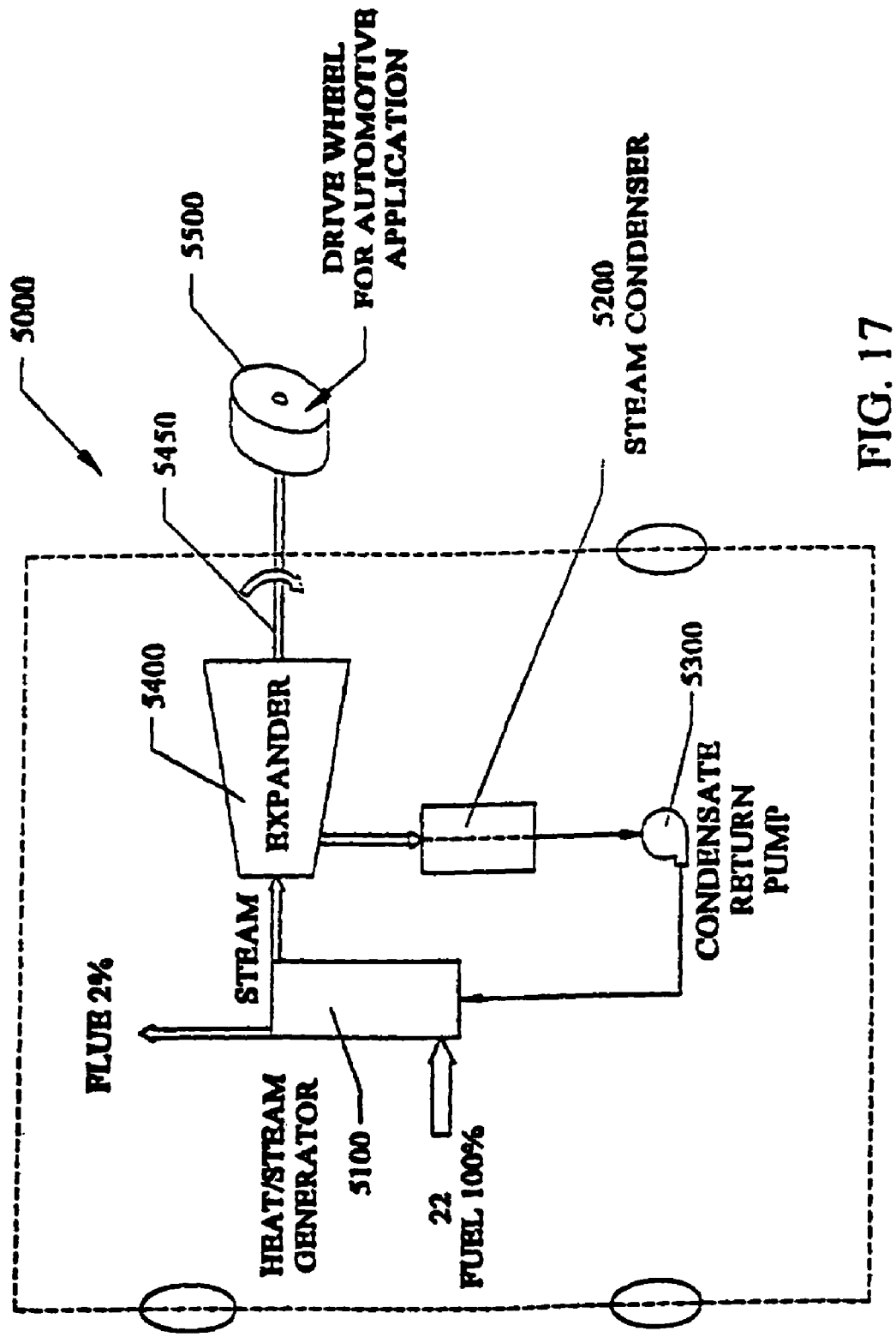
FIG. 17 shows a sixth preferred embodiment for powering a drive shaft driven vehicle using the novel steam generator, expander and steam condenser of the invention.

FIG. 17 shows a sixth preferred embodiment 5000 for powering a drive shaft driven vehicle using the novel thermal generator 5100, expander 5400 and steam condenser 5200 components of the invention. The thermal generator 5100 referenced above in FIGS. 2A and 2B turns water into steam by burning a renewable or non-renewable fuel source 22 such as natural gas, propane or hydrogen or any other vaporous or liquid fuel. The hot pressurized steam enters the expander where it is expanded (reduced in pressure and temperature and increased in volume) producing the work used to rotate output driveshaft 5450. This output driveshaft is mechanically connected to a vehicle drive train which is used to rotate the axle (or axles) and a wheel (or wheels) 5500 of a vehicle 5000. The vehicle can be a car, truck, train, or other type of conveyance device.

The low pressure/low temperature exhaust stream exiting the expander 5200 passes to a steam to water/air condenser exchanger 5200 (5 FIG. 7) where any remaining steam is condensed (changed back to water) before being returned, as a high pressure/low temperature liquid, to the thermal (steam) generator 5100, by high pressure condensate return pump 5300 (7 FIG. 9), for reheating to steam and re-use.

The invention can also use other heat recovery techniques and methods to maximize overall energy efficiency. For example, Thermal Photo Voltaic (TPV) devices can also be used with the invention to enhance energy efficiency. The TPV's generate electrical power from heat. TPV's can be installed on the exterior surface of an appropriate temperature surface of devices such as the thermal generator, system pumps, blowers (fans), and the like, and the electrical power generated (approximately 0.5 watts per square centimeter output) will help satisfy parasitic electrical losses in the invention further increasing efficiency.

Refrigerant System Embodiments

As previously mentioned in the steam system embodiment section of this invention, steam techniques, such as those previously described, do not solve all the problems of the wasteful energy conversion methods and systems currently being used. However, the inventors have discovered alternatives utilizing refrigerants which are capable of achieving higher efficiencies and able to use renewable energy sources, such as solar and geothermal; as well as heat energy recovered from exhaust streams, including process exhaust gases, combustion engine exhaust gases, and the like. The processes needed for implementation of these refrigerant working fluid based alternatives will now be described.

A prime condition for a refrigerant (or any gas) to deliver mechanical energy is a change in volume. If the volume remains constant (the case for isochore process), only temperature and pressure can change, but no work is done on the boundaries of the system. In thermodynamics, three other basic modes of change of condition of a gas are considered, which are illustrated in the TS-diagram (temperature-entropy) shown in FIG. 19A. Different modes are shown for expansion of a trapped gas from volume V1 to V2 as indicated in FIG. 19A. In FIG. 19A temperature is shown on the vertical axis and entropy is shown on horizontal axis, and units can be arbitrary (any measure of temperature and entropy). Three pressure lines are shown depicting: an above atmospheric pressure—$P^1$ line (which would be representative of an above atmospheric pressure process charge pressure), an atmospheric pressure line $P^2$ (which would be typical of the discharge from an atmospheric discharge process or engine), and a sub-atmospheric discharge pressure line $P^3$ (which would be typical of the discharge from a Supertropic Expansion Process where the discharge is at less than atmospheric pressure). A description of each of the expansion processes shown in FIG. 19A is provided below.

1) Isothermic expansion involves the expansion of a gas at constant temperature, as shown from Point A to Point B in FIG. 19A: During isothermic expansion, work is done on the boundaries of the system, which at any moment in time is the same amount of heat energy being applied. Thus, during isothermic expansion the internal energy remains constant and so does the temperature. The amount of applied (heat) energy for isothermic expansion is represented by the rectangular area bounded by points A-B-S3-S1.

2) Isentropic expansion (called "adiabatic expansion" in a pressure volume (PV) diagram) involves the expansion of a gas at constant entropy, as shown from Point A to Point D in FIG. 19A. During isentropic expansion, work is done on the boundaries of the system, but no heat is exchanged with the environment. This means that all the work will be taken from the internal energy of the gas; and as a result the gas temperature and pressure goes down. The according amount of energy is the area under the V2-curve bounded by points D-B-S3-S1. If T1 is at ambient temperature, this amount of energy will be absorbed as latent heat from the environment, by which the system's condition changes to D, to restore its original internal energy. This is why an air motor gets cold when it runs on a compressed gas.

3) Polytropic expansion, which is shown as occurring between Points A and C in FIG. 19A, occurs when the expansion process occurs with a reduced amount of heat (less than the isotherm amount) is applied and the internal energy is not decreased as much as in the isentrope case (because part of the work done comes from this applied heat). This heat is represented by the area A-C-S2-S1 and the total work produced, for the polytropic expansion case is represented by the sum of that area and the area C-B-S3-S2 (latent heat). Polytropically shifted change of condition is the practical case in all applications. Typically, polytropic expansion is why a compressor gets hot when used for compressing a gas.

If during polytropic expansion the heat could be cooled off instead, and because the end volume of expansion, V2, remains unchanged, the end of expansion would then be on a lower temperature, T3 (less internal energy) and lower pressure P3 which would be below the counter pressure P2. Hence, in the end part of expansion, the environment (P2) will do (negative) work on the system boundaries instead and so the total work done by the system will decrease, with the amount of cooled-off heat, represented by the area bounded by points A-S1-So-E in FIG. 19A.

However, instead of cooling off heat during expansion, the same change of condition can be achieved by lowering the counter pressure on the working boundaries (below P3—not shown), thus increasing the working force over these boundaries and thus increasing the work that the system does on them. If the end condition of the expanded gas is the same as would have been by cooling off a certain amount of heat, then the according amount of heat energy must have appeared as mechanical work, represented by the area shown in FIG. 19A bounded by points A-S1-So-E. The total mechanical work done by the system then is the sum of this and the isentropic work represented by the area shown in FIG. 19A bounded by points D-B-S3-S1.

FIG. 19B shows a typical Pressure versus Enthalpy graph for the invention. State point 1 represents the condition of the ammonia vapor leaving the desorber and regenerator (at approximately 100° C. and 5 bar). This vapor is then heated, in the superheater to state point 2 (to approximately 300° C. and 5 Bar) before being delivered to the expander inlet. In the expander the vapor expands supertropically from state point 2 to state point 3 (leaving the expander at approximately −61° C. and 0.2 Bar). Upon exiting the expander the expansion products, which contain both liquid and vapor ammonia, are received in a receiver tank and separated into a liquid part, ideally at state point 4 and a vapor part, ideally at state point 5.

The lines of constant volumity (labeled as V=0.56 Cubic Meters/Kg and V=2.0 Cubic Meters/Kg) are directly related to the maximum and minimum volumes of the expander's displacement. The expansion likely will not follow the straight line between state point 2 and state point 3, but whatever path it will follow in practice is totally indifferent, as long as the expansion starts at state point 2 and ends at state point 3.

If the lowest, end-expansion pressure in the expander is not the same as the counter pressure produced by the absorber, it naturally will be somewhat higher due to the line losses (pressure drop) between the absorber and the expander, the expansion will end somewhere on the lower volumity line labeled as (v=2.0 Cubic Meters/Kg) to the right of state point 3. It cannot be anywhere else, because the expander is a displacement machine and thus the end volumity is given per design. It should be noted that the further the end point of expansion shifts to the right of state point 3, the lower the expander shaft output will be; but, in most cases it would still be to the right of the state point 3a, which would represent the end point of the expansion process if only isentropic expansion were to occur.

At state point 3 we see that the volumity line intersects the horizontal 0.2 bar pressure line at x=0.4, meaning that approximately 40% of the ammonia mass is in gaseous state and hence, approximately 60% of the ammonia mass is in the liquid state. The enthalpy of the liquid is shown at state point 4 (approximately −80 kJ/kg,) and enthalpy of the vapor is shown at state point 5 (approximately 1375 kJ/kg). These enthalpies, and the enthalpies shown in diagram 19B, are per kilogram of mass, so the actual enthalpies must be corrected for the respective masses (approximately 550 kJ for vapor and approximately −50 kJ for liquid). The cold vapor portion of the supertropic expansion process is provided to the vapor inlet of the absorber at state point 5.

The cold ammonia vapor portion of the Supertropic Expansion Process is provided from the receiver to the vapor inlet of the desorber where the ammonia vapor is absorbed (by chemosorption of ammonia and water). The resulting aqua-ammonia solution is then pressurized, using a liquid pump, and then transferred to the desorber where it is desorbed (by reheating the aqua-ammonia solution to temperatures sufficient to separate the ammonia vapor from the aqua-ammonia solution produced in the absorber). In FIG. 19B this process is shown, in simplistic terms, by the following steps. The vapor portion from state point 3 is provided to the absorber where it is absorbed, at the conditions shown at state point 5. At the exit from the desorber, where the aqua-ammonia solution produced in the absorber is heated to separate the ammonia vapor from the solution, a pressurized heated vapor, at approximately state point 1, is provided (at approximately 100° C. and 5 Bar) which is then combined with the ammonia vapor stream leaving the regenerator.

The liquid portion of the supertropic expansion process is provided to the inlet of the heat exchanger located in the absorber at state point 4. A liquid ammonia pump is used to pressurize the liquid ammonia, to the approximately 5 bar-state point 6.

The liquid ammonia portion resulting from the Supertropic Expansion Process, from state point 3, is previous to a liquid ammonia pump which pressurizes the liquid ammonia from state point 4 (at approximately 0.2 Bar) to state point 6 (at approximately 5 Bar). Once pressurized, the liquid ammonia, at state point 6, is delivered to the inlet of the liquid ammonia heat exchanger located in the absorber where the liquid ammonia is used to help cool the absorption process that occurs in the absorber. In the absorber heat exchanger the liquid ammonia is heated, as the result of cooling the absorption process, and then exits the heat exchanger at state point 7 (at approximately 6° C. and 5 Bar). It should be noted that the pump energy, small as it is, is neglected here (an ideal case is assumed) from state point 5. At state point 7 it can be seen that x is approximately 0.51, so around half of the liquid ammonia delivered to the absorber heat exchanger, at state point 6, has evaporated and the whole mixture leaving the heat exchanger at state point 7, (at approximately 6° C.) Upon leaving the absorber heat exchanger the saturated ammonia mixture, comprised of approximately 50% vapor and 50% liquid ammonia is delivered to the regenerator for further heating.

In the regenerator additional heating of the ammonia mixture is accomplished, using the hot weak aqua-ammonia solution from the desorber as the heating source, and the remaining ammonia liquid is vaporized. The resulting ammonia vapor stream leaves the regenerator at approximately state point 1 (at approximately 100° C. and 5 Bar) where it is combined with the ammonia vapor stream leaving the desorber, which is also at approximately state point 1, and returned to the superheater for reuse and the cycle is closed.

If the expanding gas is a saturated vapor, it will then becomes wetter (condenses more) during Supertropic Expansion, to deliver the extra work. Water vapor (steam) is less suitable for this than a refrigerant, because its vaporization enthalpy is very high and less of its mass will condense. Ammonia vapor has about half of the enthalpy of steam and one could achieve a much more favorable mass ratio between saturated liquid and vapor (60 mass % liquid is possible to achieve). The resultant energy then would appear as torque on the shaft of the positive displacement device, (expander). A preferred goal is to have the end state of Supertropic Expansion reach as far as possible in the wet area of the pressure-enthalpy (ph) diagram.

FIG. 20 shows a seventh preferred embodiment for a Supertropic Power System 6000 that utilizes an ammonia refrigerant working fluid system which can be used to drive an electrical generator, or alternator, to provide electrical power to a local electrical grid or for use at a local residential, commercial, or industrial facility or facilities. This ammonia refrigerant working fluid system can also be used to generate mechanical energy (or power) which in turn can be used to rotate the shaft of a mechanical device or machine to drive vehicles (cars, trucks, boats, ships, trains, airplanes and the like); to drive conveyance systems or devices (moving sidewalks, conveyers, cranes, elevators and the like); or to drive a wide array of other mechanical devices (pumps, compressors, grinders, and the like). The system provides the opportunity to extract heating and cooling from the system, using heat exchangers, which can be used as a primary or as a supplemental heating and cooling source for space heating or cooling, water heating or cooling, process heating and cooling and the like.

In order to provide a better understanding of the absorption, chemosorption, and desorption processes (as used and discussed in the following ammonia refrigerant working fluid embodiments), the following definitions are provided:

Absorption: Absorption is the process by which the molecules of a covalent pair combine, by means of a chemical or physical bond, to form either a solution or a compound. The absorption process is exothermic; it produces or gives off heat, and results in a solution or compound that occupies a smaller space than originally occupied by the covalent pair prior to absorption. This reduction in volume results in a reduced pressure if the volume occupied, before and after absorption of the covalent pair, remains constant (or unchanged).

Chemosorption: Chemosorption is absorption using only a chemical bond of a covalent pair to form either a solution or compound. In the ammonia refrigerant embodiments described herein, chemosorption of ammonia vapor and water is used in an absorber to produce the reduced pressure or sub atmospheric pressure environment, or sink, which is used at the expander exhaust. The heat produced in the absorber, as the result of the exothermic chemosorption process, is cooled by the cool ammonia vapor supplied to the absorber, for absorption, and the water (or weak ammonia solution) supplied to the absorber, for use in the absorption process; and by additional cooling which can be provided by using a heat exchanger located within the absorber (FIG. 21). The product of the chemosorption process, using ammonia vapor and water, is a strong aqua-ammonia solution, which contains the absorbed ammonia. This strong ammonia solution is supplied to a desorber for heating and desorption, in order to reconstitute the ammonia vapor stream and provide a weak aqua ammonia (or water) stream for reuse.

Desorption: Desorption is a process that is the inverse of absorption whereby some, or all, of an absorbed substance is released. Specifically, desorption is the process by which the molecules of the covalent pair are separated from each other in order to form, or reconstitute the original, prior to absorption, covalent pair. In the ammonia refrigerant embodiments described in the following sections desorption of the aqua-ammonia solution, as produced by chemosorption in the absorber, is used to reconstitute the ammonia vapor stream and provide a weak aqua ammonia (or water stream) for reuse. This is accomplished by heating the strong aqua-ammonia solution in the desorber to temperatures sufficient to break the bond between the covalent pair and desorb the ammonia vapor from the strong aqua-ammonia solution provided in the absorber.

The configuration and function of each of the individual components of the system shown in FIG. 20, will now be described. The heat supply 6100 comprises a thermal generator, which includes both a combustion blower, which is used to mix combustion air with a gaseous or vaporized fuel, and a combustion burner, which is used to burn the mixture in order to provide a high temperature heat source. The high temperature gases exiting the heat supply 6100 are used for heating the ammonia refrigerant working fluid to its working temperature, which is accomplished in the finned tubes of the superheater 6200.

The heated and pressurized ammonia working fluid produced in the superheater 6200 (e.g., temperature may be as high as 850° F. (454.44° C.) and at a pressure as high as 150 PSIA) is delivered to the inlet of the expander 6400. Once in the expander 6400, the heated and pressurized ammonia refrigerant working fluid is expanded (increased in volume), wherein the pressure of the ammonia refrigerant working fluid drops, to the reduced or sub atmospheric pressures produced by the absorber 6600, and work is produced using the Supertropic Expansion Process previously described. The exhaust from the expander can comprise low pressure/low temperature ammonia vapor, or a mix of low pressure/low temperature ammonia vapor and condensed ammonia liquid (condensate), depending on the specific temperatures and pressures (existing at the expander exhaust port(s)).

The work produced in the expander 6400, as a result of the ammonia refrigerant working fluid expansion process, is used to turn shaft 6450 which can be used to drive an electrical generator or alternator or can be used to drive an array of other mechanical devices. The shaft 6450 can be sealed using conventional seal techniques or can be hermetically sealed from ambient air conditions, by using a fully encased housing (to fully enclose the expander), and a conventional magnetic coupling (which eliminates the need for an active seal on the rotating shaft).

The expander 6400 must be a positive displacement expansion device having a fixed expansion ratio and must be capable of handling both the liquid and vapor products that occur as the result of the Supertropic Expansion Process. Based on this requirement, the expander 6400 may be a scroll, rotary vane, Wankel, piston, free piston or other positive displacement device so long as the device used is saturated vapor tolerant, including any combination of liquid part to vapor part ratios from 100% liquid to 100% vapor.

Rotary vane and Wankel expanders are saturated vapor tolerant, including any combination of liquid part to vapor part ratios from near 100% liquid to 100% vapor, in much the same manner as a scroll expansion device.

Reciprocating piston and free piston devices, and other types of positive displacement expansion device configurations can also be used as the expander 6400. In order to use a reciprocating piston device the configuration of the device must be such that it can accommodate the quantities of liquids that can occur in the expander during the expansion process. This can be accomplished by providing sufficient volume between the piston and the top of the cylinder, to accommodate the liquid volume, or by using valves, or ports, which facilitate the removal of the liquid generated during the expansion process.

The exhaust from the expander 6400 can comprise ammonia vapor or a combination (a mixture) of ammonia liquid and ammonia vapor at reduced or sub-atmospheric pressures (e.g., exit pressures from the expander may be as low as 0.2 Bar (3 PSIA), and at very low temperatures, as low as −70° F.). The exhaust from the expander is delivered to the receiver 6900 where the ammonia liquid part is separated from the ammonia vapor part.

The ammonia vapor exiting the expander 6400, and collected in the receiver 6900, is fed to the absorber 6600 where it is reacted, with the cooled reduced concentration aqua-ammonia solution (or water) which is injected into the absorber, utilizing an ammonia-water chemosorption process. The resulting hot, high concentration, aqua-ammonia solution, which is produced as the result of the chemosorption process, and additionally may contain ammonia concentrations (which may exceed 20%), is pumped from the absorber, using pump 6650, to the desorber. The heat produced in the absorber, by the ammonia-water chemosorption process, is cooled by the low temperature ammonia vapor received from the receiver 6900 and the cooled reduced concentration aqua-ammonia solution (or water) which is received from the desorber 6300 via the regenerator 6700/6800.

The cold liquid ammonia exiting the expander 6400 and collected in the receiver 6900, is pumped, using pump 6950, to the regenerator 6700/6800. In the regenerator this cold liquid ammonia is used to cool the hot reduced concentration aqua-ammonia solution received from the desorber, (e.g., to temperatures in the 80° F. to 130° F. (26.66° C. to 54.44° C.) range). This cooled reduced concentration aqua-ammonia solution is then re-supplied to the absorber for reuse in the on-going chemosorption process. The heat energy recovered by cooling the hot, reduced concentration aqua-ammonia solution in the regenerator 6700/6800 is used to heat the liquid ammonia stream, as supplied to the regenerator 6700/6800 from the receiver 6900, to temperatures that are sufficient to assure that all the liquid ammonia supplied to the regenerator is vaporized, at the working pressure of the superheater.

The desorber 6300 is used to heat the high concentration aqua-ammonia solution that is pumped to it from the absorber 6600, using pump 6650, to temperatures high enough that all, or nearly all, of the ammonia can be separated, as high temperature ammonia vapor, from the high concentration aquaammonia solution. Heat required for the desorption process, as accomplished in the desorber 6300, can be provided by a separate heater or by using waste heat recovered from the superheater 6200 exhaust by-products. Once the ammonia vapor is reconstituted in the desorber 6300, by separating it from the high concentration aqua-ammonia solution supplied to the desorber 6300, the ammonia vapor is combined with the ammonia vapor produced in the regenerator 6700/6800 and then supplied to the superheater 6200 for reheating and reuse. The desorber 6800 can be a shell and tube heat exchanger of a design commonly used in the industry.

FIG. 21 is a schematic showing the configuration and components for an eighth preferred embodiment of a Supertropic Power System 7000 that utilizes ammonia refrigerant as the working fluid and has an additional "absorber heat exchanger", which is positioned within the absorber 6600. This additional absorber heat exchanger can provide additional cooling of the chemosorption process, which is accomplished in the absorber, and can provide the capability for recovering heat energy directly from the chemosorption process which occurs in the absorber. The heat energy recovered by this absorber heat exchanger can be used as an additional heating source for heating of the ammonia liquid received from the receiver 6200 prior to delivery of the ammonia liquid to the regenerator. In this configuration the liquid ammonia collected in the receiver 6900 is transferred to the absorber heat exchanger, via transfer pump 6950, before being delivered to the evaporator 6800 located in the regenerator 6700/6800. Other than the addition of the additional absorber heat exchanger to the absorber 6600, as described above, the overall configuration, functions and components shown in FIG. 21 are otherwise identical to the system shown in FIG. 20.

FIG. 21 is also annotated to reflect typical operating pressures (shown in Bar), temperatures (shown in Degrees C) and energy values (shown in KJ) for selected locations in the typical operating flow. The values shown would be typical for an application where higher superheat delivery of temperatures (of approximately 300° C.) and modest delivery pressures (of 5 Bar or 75 PSIA) are used. These values also reflect a 60% to 40% split of ammonia liquid verses ammonia vapor at the expander outlet condition. Actual operating pressures, temperatures, and energy values will change (from those values shown in FIG. 21) as superheater delivery temperatures and pressures are adjusted up or down, over the range of available operational working pressures and temperatures, and any adjustments made to the corresponding energy input. Actual operating pressures, temperatures, and energy values will also change based on any shift (increases or decreases) from assumed 60% M liquid to 40% M vapor split used as the basis for the values shown on FIG. 21.

FIG. 21 also reflects typical aqua-ammonia concentrations for selected points in the aqua-ammonia circuit. These values are representative of the concentrations that would be applicable for the high temperature ammonia refrigerant working fluid operating conditions discussed in the previous paragraph. Actual aqua-ammonia concentrations can change as superheater temperatures and pressures are adjusted (to higher or lower values) or as the sizing and design configuration of the desorber, or regenerator are changed (to reflect specific application needs and associated size/cost considerations), or as pre-heaters, cold recovery devices or heat recovery exchangers are added (to provide the capability to preheat the ammonia refrigerant working fluid or to recover cooling or heating from the refrigerant working fluid).

FIG. 24 shows several of the possible locations where heat recovery and cold recovery exchangers can be added to the Supertropic Power System 6000 shown in FIG. 20.

A vapor preheater 6910 can be used to add heat energy to the ammonia refrigerant working fluid prior to its delivery to the superheater 6200. This refrigerant vapor pre-heater 6910 would be used to transfer heat energy recovered by a heat recovery system from an exhaust gas stream, a combustion engine exhaust manifold heat recovery coil for example; or from an alternative energy source, a solar collector system or a geothermal (or earth heat) heat recovery device for example, to heat (or pre-heat) the ammonia refrigerant working fluid.

If sufficient energy is produced to fully meet the needs of the system, by the heat recovery system or alternative energy source, the heat recovery system or the alternative energy source may be used as the primary method for heating the ammonia refrigerant working fluid to its working temperature. In this case the Heat Supply 6100 and the Superheater 6200 would be used as a backup (or supplemental) heating source and used only when the energy available from the heat recovery system or alternative energy source is not sufficient to fully satisfy total energy needs of the system.

Cold recovery devices (heat exchangers), can be used to extract cooling from the close loop ammonia refrigerant working fluid. These cold recovery devices can be located in the receiver 6900 liquid discharge line, see receiver liquid cold recovery exchanger 6930; the receiver 6900 vapor discharge line, see receiver vapor cold recovery exchanger 6920; or the expander 6400 exhaust duct, see expander exhaust cold recovery Exchanger 6940.

These cold recovery devices would provide the capability to extract cooling from the closed loop refrigerant working fluid which could then be used for residential, commercial, or industrial space conditioning (space cooling); or for other process cooling or refrigeration applications.

Heat recovery can be accomplished by the addition of heat exchangers, or heat recovery devices, which could be located in the desorber vapor exhaust duct 6350, the superheater exhaust duct 6250, or in the high temperature reduced concentration aqua-ammonia circuit leaving the desorber 6300. The desorber exhaust duct heat recovery exchanger 6950 would recover waste heat from the hot exhaust stream exiting the desorber 6300. The superheater exhaust duct heat recovery exchanger 6970 would recover waste heat from the exhaust stream exiting the superheater. The desorber liquid stream heat recovery exchanger 6980 is located in the hot, reduced concentration aqua-ammonia circuit, downstream of the desorber, and would be used to extract heat energy from the high temperature reduced concentration aqua-ammonia solution leaving the desorber. These heat exchangers would recover heat energy which could be used for residential, commercial, or industrial space conditioning (space heating), water heating; or for other low to moderate temperature process heating applications.

FIG. 25 is a schematic showing the configuration and components for a ninth preferred embodiment for a Supertropic Power System 8000 that utilizes an ammonia refrigerant as the working fluid and uses a compressor 6610 and vaporizer 6310 combination to replace the absorber 6600 and desorber 6300 combination used in the Supertropic Power System 6000 shown in FIG. 20. The compressor 6610 is used to condense the ammonia refrigerant vapor part working fluid, which is drawn from the receiver 6900 and generate the reduced pressure environment (or sink) at the exit of the expander 6400. A vaporizer 6310 is used to heat the condensed liquid ammonia stream received from the compressor 6610 and provide a resulting pressurized ammonia vapor working fluid to the inlet of the superheater 6200 for reuse. The vaporizer 6310 includes both a heater 6330 and an evaporator 6320 coils. The heater 6330 receives hot exhaust gases from the superheater, provided via the superheater exhaust duct 6250 and uses heat energy extracted from the superheater exhaust gases to heat and vaporize the cold condensed liquid ammonia refrigerant working fluid contained in the evaporator 6320 coils. Once heated and vaporized in the evaporator 6320 the resulting ammonia refrigerant vapor working fluid is provided to the inlet of the superheater 6200 for reuse. A pump 6650 is used to move the condensed liquid ammonia refrigerant working fluid produced by the compressor to the vaporizer. In this embodiment the heat energy required for vaporization of the liquid ammonia working fluid drawn from the receiver 6900, which is accomplished in the regenerator 6700/6800, is drawn from the superheater exhaust gases which are provided to the regenerator via the superheater exhaust duct 6250. Other than the substitution of the compressor 6610 and vaporizer 6310 for the absorber 6600 and desorber 6300 combination used in the Supertropic Power System 6000 (and elimination of the associated chemosorption process used in the absorber and desorber combination), and the implementation of the functional changes described above the remaining system configurations, functions, and components of the Supertropic Power System 8000 are identical to those described previously in the Supertropic Power System 6000 description and shown in FIG. 20.

FIG. 26 is a schematic showing the configuration and components for a tenth preferred embodiment for a Supertropic Power System 9000 that utilizes an ammonia refrigerant as the working fluid and uses a compressor 6611 to replace the absorber 6600 and desorber 6300 combination used in the Supertropic Power System 6000. The compressor 6611 is used to condense the ammonia refrigerant vapor part working fluid, which is drawn from the receiver 6900 and generate the reduced pressure environment (or sink) at the exit of the expander 6400. In this embodiment the desorber 6300 as used in Supertropic Power System 6000, is eliminated entirely. A pump 6650 is used to return the condensed liquid ammonia refrigerant working fluid produced by the compressor 6610 to the receiver 6900 for reuse. In this embodiment the heat energy required for vaporization of the liquid ammonia working fluid, which is accomplished in the regenerator 6700/6800 is drawn from the superheater exhaust gases which are provided to the regenerator via the superheater exhaust duct 6250. Other than the replacement of the absorber 6600 and desorber 6300 combination (and elimination of the associated chemosorption process) with the compressor 6610, and implementation of the functional changes described above, the remaining system configurations, functions, and components of the Supertropic Power System 9000 are identical to those described previously in the Supertropic Power System 6000 description and shown in FIG. 20.

FIG. 27 is a schematic showing the configuration and components for a eleventh preferred embodiment for a Supertropic Power System 10000 that utilizes an ammonia refrigerant as the working fluid and uses a condenser 6612 and vaporizer 6310 combination to replace the absorber 6600 and desorber 6300 combination used in the Supertropic Power System 6000 shown in FIG. 20. The condenser 6612 is used to condense the ammonia refrigerant vapor part working fluid, which is drawn from the receiver 6900, and generate the reduced pressure environment (or sink) at the exit of the expander 6400. A vaporizer 6310 is used to heat the condensed liquid ammonia stream received from the condenser 6612 and provide a resulting pressurized ammonia vapor working fluid to the inlet of the superheater 6200 for reuse. The vaporizer 6310 includes both a heater 6330 and an evaporator 6320 coils. The heater 6330 receives hot exhaust gases from the superheater, provided via the superheater exhaust duct 6250 and uses heat energy extracted from the superheater exhaust gases to heat and vaporize the cold condensed liquid ammonia refrigerant working fluid contained in the evaporator 6320 coils. Once heated and vaporized in the evaporator 6320 the resulting ammonia refrigerant vapor working fluid is provided to the inlet of the superheater 6200 for reuse. A pump 6650 is used to move the condensed liquid ammonia refrigerant working fluid produced by the condenser to the vaporizer. In this embodiment the heat energy required for vaporization of the liquid ammonia working fluid drawn from the receiver 6900, which is accomplished in the regenerator 6700/6800, is drawn from the superheater exhaust gases which are provided to the regenerator via the superheater exhaust duct 6250. Other than the substitution of the condenser 6612 and vaporizer 6310 for the absorber 6600 and desorber 6300 combination used in the Supertropic Power System 6000 (and elimination of the associated chemosorption process used in the absorber and desorber combination), and the implementation of the functional changes described above, the remaining system configurations, functions, and components of the Supertropic Power System 10000 are identical to those described previously in the Supertropic Power System 6000 description and shown in FIG. 20.

FIG. 28 is a schematic showing the configuration and components for a twelfth preferred embodiment for a Supertropic Power System 11000 that utilizes an ammonia refrigerant as the working fluid and uses a condenser 6313 to replace the absorber 6600 and eliminates the need for the desorber 6300 as used in the Supertropic Power System 6000 and shown in FIG. 20. The condenser 6313 is used to condense the ammonia refrigerant vapor part working fluid, which is drawn from the receiver 6900; and generate the reduced pressure environment (or sink) at the exit of the expander 6400. In this embodiment, the desorber 6300 as used in the Supertropic Power System 600, is eliminated entirely. A pump 6650 is used to return the condensed liquid ammonia refrigerant working fluid produced by the condenser 6313 to the receiver 6900 for reuse. In this embodiment the heat energy required for vaporization of the liquid ammonia working fluid, in the regenerator 6700/6800 is drawn from the superheater exhaust gases which are provided to the regenerator via the superheater exhaust duct 6250. Other than the replacement of the absorber 6600 with the condenser 6613 and the elimination of the desorber 6300, as originally used in Supertropic Power System 6000 (and elimination of the associated chemosorption process), and implementation of the functional changes described above, the remaining system configurations, functions, and components of the Supertropic Power System 11000 are identical to those described previously in the Supertropic Power System 6000 description and shown in FIG. 20.

FIG. 29 is a schematic showing the configuration and components for a thirteenth preferred embodiment for a Supertropic Power System 12000 that utilizes an ammonia refrigerant as the working fluid and uses a vacuum pump 6614 and vaporizer 6310 combination to replace the absorber 6600 and desorber 6300 combination used in the Supertropic Power System 6000 shown in FIG. 20. The vacuum pump 6614 is used to condense the ammonia refrigerant vapor part working fluid, which is drawn from the receiver 6900; and generate the reduced pressure environment (or sink) at the exit of the expander 6400. A vaporizer 6310 is used to heat the condensed liquid ammonia stream received from the vacuum pump 6614 and provide a resulting pressurized ammonia vapor working fluid to the inlet of the superheater 6200 for reuse. The vaporizer 6310 includes both a heater 6330 and an evaporator 6320 coils. The heater 6330 receives hot exhaust gases from the superheater, provided via the superheater exhaust duct 6290, and uses heat energy extracted from the superheater exhaust gases to heat and vaporize the cold condensed liquid ammonia refrigerant working fluid contained in the evaporator 6320 coils. Once heated and vaporized in the evaporator 6320 the resulting ammonia refrigerant vapor working fluid is provided to the inlet of the superheater 6200 for reuse. A pump 6650 is used to move the condensed liquid ammonia refrigerant working fluid produced by the vacuum pump to the vaporizer. In this embodiment the heat energy required for vaporization of the liquid ammonia working fluid drawn from the receiver 6900, which is accomplished in the regenerator 6700/6800, is drawn from the superheater exhaust gases which are provided to the regenerator via the superheater exhaust duct 6250. Other than the substitution of the vacuum pump 6614 and vaporizer 6310 for the absorber 6600 and desorber 6300 combination used in the Supertropic Power System 6000 (and elimination of the associated chemosorption process used in the absorber and desorber combination), and the implementation of the functional changes described above, the remaining system configurations, functions, and components of the Supertropic Power System 12000 are identical to those described previously in the Supertropic Power System 6000 description and shown in FIG. 20.

FIG. 30 is a schematic showing the configuration and components for a fourteenth preferred embodiment for a Supertropic Power System 13000 that utilizes an ammonia refrigerant as the working fluid and uses a vacuum pump 6615 to replace the absorber 6600 and desorber 6300 combination used in the Supertropic Power System 6000 shown in FIG. 20. The vacuum pump 6615 is used to condense the ammonia refrigerant vapor part working fluid, which is drawn from the receiver 6900 and to generate the reduced pressure environment (or sink) at the exit of the expander 6400. In this embodiment the desorber 6300, as used in the Supertropic Power System 6000, is eliminated entirely. A pump 6650 is used to return the condensed liquid ammonia refrigerant working fluid produced by the vacuum pump 6615 to the receiver 6900 for reuse. In this embodiment the heat energy required for vaporization of the liquid ammonia working fluid, which is accomplished in the regenerator 6700/6800, is drawn from the superheater exhaust gases which are provided to the regenerator via the superheater exhaust duct 6290. Other than the replacement of the absorber 6600 with the vacuum pump 6615 and the elimination of the desorber 6300 as originally used in Supertropic Power System 6000 (and elimination of the associated chemosorption process), and implementation of the functional changes described above, the remaining system configurations, functions, and components of the Supertropic Power System 13000 are identical to those described previously in the Supertropic Power System 6000 description and shown in FIG. 20.

A fifteenth preferred embodiment for a Supertropic Power System 14000 uses a combination of compression and condensing devices to replace the compressor 6610 used in the Supertropic Power System 8000 shown in FIG. 25. The combination of compression and condensing devices, which can include compressors, condensers, vacuum pumps and the like, are used to condense the ammonia refrigerant vapor part working fluid, which is drawn from the receiver 6900 and to generate the reduced pressure environment (or sink) at the exit of the expander 6400. This embodiment uses a vaporizer 631025 downstream of the combination of compression and condensing devices to heat the condensed liquid ammonia stream received from the combination of compression and condensing devices and provide a resulting pressurized ammonia vapor working fluid to the inlet of the superheater 6200 in the same manner as used, and previously described for Supertropic Power System 8000, as shown in FIG. 25. Other than the substitution of the combination of compressor and condensing devices for the compressor 6610 used in the Supertropic Power System 8000 the remaining system configurations, functions, and components of the Supertropic Power System 14000 are identical to those described previously in the Supertropic Power System 8000 description shown in FIG. 25.

A sixteenth preferred embodiment for a Supertropic Power System 15000 uses a combination of compression and condensing devices to replace the compressor 6610 used in the Supertropic Power System 9000, shown in FIG. 26. The combination of compression and condensing devices, which can include compressors, condensers, vacuum pumps and the like, is used to condense the ammonia refrigerant vapor part working fluid, which is drawn from the receiver 6900 and to generate the reduced pressure environment (or sink) at the exit of the expander 6400. Other than the replacement of the compressor with the combination of compression and condensing devices the remaining system configurations, functions, and components of the Supertropic Power System 15000 are identical to those described previously in the Supertropic Power System 9000 description and shown in FIG. 26.

A seventeenth preferred embodiment would use the novel Supertropic Power Systems as described in embodiments seven through sixteen (systems 6000 through 15000) as shown and as described in the prior sections of the invention for: powering a mechanical driven air conditioner compressor (as described in the third preferred embodiment).

An eighteenth preferred embodiment would use the novel Supertropic Power Systems as described in embodiments seven through sixteen (systems 6000 through 15000) for: driving an electric generator, or alternator, supplying electricity to any electrical power device or a stand alone end use electrical system or component (as described in the fourth preferred embodiment).

A nineteenth preferred embodiment would use the novel Supertropic Power Systems as described in embodiments seven through sixteen (systems 6000 through 15000) for: supplying electrical power to a battery, or batteries, or directly to an electrical drive motor used to power an electric driven vehicle (as described in the fifth embodiment).

A twentieth preferred embodiment would use the novel Supertropic Power Systems as described in embodiments seven through sixteen (systems 6000 through 15000) for: powering a driveshaft driven vehicle (as described in the sixth preferred embodiment).

It should be noted that the term "vehicle", as used in the preceding sections refers to conventional prime movers and includes, but is not limited to, automobiles, trucks, trains, boats, ships, airplanes and the like. Also, the term "conveyance" as used in the preceding sections refers to those movers used to move materials, goods, or products. These other means of conveyance can include, but are not limited to, cranes, conveyors, elevators, moving sidewalks and the like.

It should also be noted that the embodiments described in the preceding and prior sections are readily scalable to produce larger or smaller systems to meet the requirements of a wide range of users and applications. Specifically, larger systems with power levels in the 20 to 30 kw range or larger, and smaller systems, with power levels as small as a horsepower or less can be built using the novel Supertropic Power System of the invention, as described in embodiments seven through twenty (systems 6000 and 20000).

The novel Supertropic Power Systems as described in embodiments seven through twenty (systems 6000 through 20000) reflect the use of an ammonia-refrigerant working fluid in the closed loop circulation system. Other types of refrigerants, or combinations of other selected refrigerants, could be substituted for the ammonia refrigerant based on the performance characteristics, costs, or availability of these other types of refrigerants; and the need to tailor, or adjust, the properties of the refrigerant working fluid to match the needs of a specific application. These refrigerant alternatives could include, but are not limited to, traditional hydrochlorofluorocarbon based refrigerants (such as R12, R22, or R-134A), traditional perfluorocarbon based refrigerants, chlorine based refrigerants, and carbon dioxide based refrigerants.

The invention can also use other heat recovery techniques and methods to maximize overall energy efficiency. For example, Thermo Photo Voltaic (TPV) devices can also be used with the invention to enhance energy efficiency. The TPV's generate electrical power from heat. TPV's can be installed on the exterior surface of an appropriate temperature surface of devices such as the thermal generator, system pumps, blowers (fans), and the like, and the electrical power generated (approximately 0.5 watts per square centimeter output) will help satisfy parasitic electrical losses in the invention, further increasing efficiency.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A method for generating energy at high efficiencies from an energy source, comprising the steps of:
    using a thermal generator for heating a pressurized working fluid;
    using a positive displacement expander, having a fixed expansion ratio, for receiving and expanding the heated and pressurized working fluid, as received from the thermal generator, against a reduced pressure sink in order to produce mechanical work;
    using a receiver for receiving and separating a liquid part and a vapor part of the working fluid discharge which exits from the positive displacement expander;
    using an absorber, and a chemosorption process, to absorb the vapor working fluid received from the receiver and to generate a reduced pressure sink at the exit of the expander;
    using a desorber for heating and reconstituting the vapor working fluid from the absorbent liquid produced in the absorber, and provide a resultant vapor working fluid to the thermal generator for reuse;
    using a pump for pressurizing and moving the absorbent liquid produced in the absorber, as the result of chemosorption, to the desorber;
    using a regenerator to recover heat energy contained in a liquid stream received from the desorber, to heat and vaporize the liquid part of the working fluid received from the receiver and provide a resultant vapor working fluid to the thermal generator for reuse; and
    using a pump to transfer the liquid working fluid from the receiver to the regenerator.

2. A method for generating mechanical energy at high efficiencies from an energy source, comprising the steps of:
    using a thermal generator for heating a pressurized working fluid; using a positive displacement expander, having a fixed expansion ratio, for receiving and expanding the heated and pressurized working fluid received from the thermal generator, against a reduced pressure sink in order to produce mechanical work;
    using a receiver for receiving and separating a liquid part and a vapor part of the working fluid discharge which exits from the positive displacement expander;
    using an absorber, and a chemosorption process, to absorb the vapor working fluid received from the receiver and to generate a reduced pressure sink at the exit of the expander;
    using a desorber for heating and reconstituting the vapor working fluid from the absorbent liquid produced in the absorber, and provide a resultant vapor working fluid to the thermal generator for reuse;
    using a pump for pressurizing and moving absorbent liquid produced in the absorber, as the result of the chemosorption process, to the desorber;
    using a regenerator to recover heat energy contained in a liquid stream received from the desorber, to heat and vaporize the liquid part of the working fluid received from the receiver and provide a resultant vapor working fluid to the thermal generator for reuse; and
    using a pump to pressurize and transfer the liquid working fluid from the receiver to the regenerator.

3. An apparatus for generating energy at high efficiencies from an energy source, comprising in combination:
    a thermal generator for heating a pressurized working fluid;
    a positive displacement expander, having a fixed expansion ratio, for receiving and expanding the heated and pressurized working fluid, as received from the thermal generator, against a reduced pressure sink in order to produce mechanical work;
    a receiver for receiving and separating a liquid part and a vapor part of the working fluid discharge which exits from the positive displacement expander;
    an absorber, and a chemosorption process, to absorb the vapor working fluid received from the receiver and to generate a reduced pressure sink at the exit of the expander;

a desorber for heating and reconstituting the vapor working fluid from the absorbent liquid produced in the absorber, and provide a resultant vapor working fluid to the thermal generator for reuse;

a pump for pressurizing and moving the absorbent liquid produced in the absorber, as the result of chemosorption, to the desorber; a regenerator to recover heat energy contained in a liquid stream received from the desorber, to heat and vaporize the liquid part of the working fluid received from the receiver and provide a resultant vapor working fluid to the thermal generator for reuse; and a pump to transfer the liquid working fluid from the receiver to the regenerator.

4. An apparatus for generating mechanical energy at high efficiencies from an energy source, comprising in combination:

a thermal generator for heating a pressurized working fluid; a positive displacement expander, having a fixed expansion ratio, for receiving and expanding the heated and pressurized working fluid received from the thermal generator, against a reduced pressure sink in order to produce mechanical work;

a receiver for receiving and separating a liquid part and a vapor part of the working fluid discharge which exits from the positive displacement expander;

an absorber, and a chemosorption process, to absorb the vapor working fluid received from the receiver and to generate a reduced pressure sink at the exit of the expander;

a desorber for heating and reconstituting the vapor working fluid from the absorbent liquid produced in the absorber, and provide a resultant vapor working fluid to the thermal generator for reuse;

a pump for pressurizing and moving absorbent liquid produced in the absorber, as the result of the chemosorption process, to the desorber;

a regenerator to recover heat energy contained in a liquid stream received from the desorber, to heat and vaporize the liquid part of the working fluid received from the receiver and provide a resultant vapor working fluid to the thermal generator for reuse; and a pump to pressurize and transfer the liquid working fluid from the receiver to the regenerator.

5. The method or apparatus as set forth in claims 1, 2, 3 or 4, further comprising using a heat exchanger, which is positioned within the absorber, for cooling the chemosorption process in the absorber and recovering the heat produced as a result of the chemosorption process for heating the liquid working fluid received from the receiver prior to delivery to the regenerator.

6. The method or apparatus as set forth in claims 1, 2, 3 or 4, wherein said energy source comprises hydrogen.

7. The method or apparatus as set forth in claims 1, 2, 3 or 4, wherein said energy comprises fossil fuels.

8. The method or apparatus as set forth in claims 1, 2, 3 or 4, wherein said energy comprises bio-fuels.

9. The method or apparatus as set forth in claims 1, 2, 3 or 4, wherein said energy source comprises solar energy.

10. The method or apparatus as set forth in claims 1, 2, 3 or 4, wherein said energy source comprises a renewable energy source.

11. The method or apparatus as set forth in claims 1, 2, 3 or 4, wherein said energy source comprises a non-renewable energy source.

12. The method or apparatus as set forth in claims 1, 2, 3 or 4, wherein said energy source comprises heat energy recovered from an exhaust gas stream.

13. The method or apparatus as set forth in claims 1, 2, 3 or 4, wherein said energy source comprises a geothermal heat source.

14. The method or apparatus as set forth in claims 1, 2, 3 or 4, wherein a thermal generator is used to produce a heated and pressurized working fluid.

15. The method or apparatus as set forth in claims 1, 2, 3 or 4, wherein a heat source and superheater are used to produce a heated and pressurized working fluid.

16. The method or apparatus as set forth in claims 1, 2, 3 or 4, wherein a solar collector is used to produce a heated and pressurized working fluid.

17. The method or apparatus as set forth in claims 1, 2, 3 or 4, wherein a heat exchanger/heat recovery device is used to produce a heated and pressurized working fluid.

18. The method or apparatus as set forth in claims 1, 2, 3 or 4, further comprising using a heat exchanger/heat recovery device to recover heat from an available heat source including at least one of a process exhaust gas stream, a vehicle engine exhaust, and a geothermal heat source and use the recovered heat energy to heat, or preheat, the working fluid prior to its delivery to the inlet of the thermal generator.

19. The method or apparatus as set forth in claims 1, 2, 3 or 4, further comprising using a heat exchanger/heat recovery device to recover heat from an available heat source including at least one of a process exhaust gas stream, a vehicle engine exhaust and a geothermal heat source and use the recovered heat energy to heat, or preheat, the working fluid prior to its delivery to the inlet of the expander.

20. The method or apparatus as set forth in claims 1, 2, 3 or 4, further comprising using a solar collector to heat, or preheat, the working fluid prior to delivery of the pressurized gas working fluid to the inlet of the thermal generator.

21. The method or apparatus as set forth in claims 1, 2, 3 or 4, further comprising using a solar collector to heat, or preheat, the working fluid prior to delivery of the pressurized gas working fluid to the inlet of the expander.

22. The method or apparatus as set forth in claims 1, 2, 3 or 4, further comprising providing a scroll expander having a fixed expansion ratio as the positive displacement expander.

23. The method or apparatus as set forth in claims 1, 2, 3 or 4, further comprising providing a rotary vane expander having a fixed expansion ratio as the positive displacement expander.

24. The method or apparatus as set forth in claims 1, 2, 3 or 4, further comprising providing a Wankel-type expander having a fixed expansion ratio as the positive displacement expander.

25. The method or apparatus as set forth in claims 1, 2, 3 or 4, further comprising providing a piston type expander having a fixed expansion ratio as the positive displacement expander.

26. The method or apparatus as set forth in claims 1, 2, 3 or 4, further comprising providing a free-piston type expander having a fixed expansion ratio as the positive displacement expander.

27. The method or apparatus as set forth in claims 1, 2, 3 or 4, wherein ammonia or ammonia refrigerant is used as the working fluid.

28. The method or apparatus as set forth in claims 1, 2, 3 or 4, wherein steam is used as the working fluid.

29. The method or apparatus as set forth in claims 1, 2, 3 or 4, wherein a hydrochlorofluorocarbon based refrigerant is used as the working fluid.

30. The method or apparatus as set forth in claims 1, 2, 3 or 4, wherein a combination of hydrochlorofluorocarbon based refrigerants are used as the working fluid.

31. The method or apparatus as set forth in claims 1, 2, 3 or 4, a non-hydrochlorofluorocarbons is used as the working fluid.

32. The method or apparatus as set forth in claims 1, 2, 3 or 4, wherein a combination of non hydrochlorofluorocarbon refrigerants are used as the working fluid.

33. The method or apparatus as set forth in claims 1, 2, 3 or 4, wherein the produced mechanical work energy is used to rotate a shaft of an electrical generator to produce electrical power.

34. The method or apparatus as set forth in claims 1, 2, 3 or 4, wherein the mechanical work energy is used to rotate a shaft of an alternator to produce electrical power.

35. The method or apparatus as set forth in claims 1, 2, 3 or 4, wherein the mechanical work energy is used to drive a mechanical device.

36. The method or apparatus as set forth in claims 1, 2, 3 or 4, wherein the mechanical work energy is used to drive a machine.

37. The method or apparatus as set forth in claims 1, 2, 3 or 4, wherein the mechanical energy is used to drive an air conditioning compressor.

38. The method or apparatus as set forth in claims 1, 2, 3 or 4, wherein the mechanical work energy is used to drive a mechanically driven pump.

39. The method or apparatus as set forth in claims 1, 2, 3 or 4, wherein the mechanical work energy is used to drive a vehicle.

40. The method or apparatus as set forth in claims 1, 2, 3 or 4, wherein the mechanical work energy is used to drive a conveyance.

41. The method or apparatus as set forth in claims 1, 2, 5 or 6, 1 or 2, further comprising using an absorber to provide the reduced pressure, low pressure, or sub atmospheric sink.

42. The method or apparatus as set forth in claims 1, 2, 3 or 4, wherein the reduced pressure sink is at subatmospheric pressures.

43. The method or apparatus as set forth in claims 1, 2, 3 or 4, wherein the reduced pressure sink is at atmospheric pressure.

44. The method or apparatus as set forth in claims 1, 2, 3 or 4, wherein the reduced pressure sink is near atmospheric pressure.

45. The method or apparatus as set forth in claims 1, 2, 3 or 4, wherein the reduced pressure sink is below the condensing pressure of the working fluid.

46. The method or apparatus as set forth in claims 1, 2, 3 or 4, wherein the reduced pressure sink is at the condensing pressure of the working fluid.

47. The method or apparatus as set forth in claims 1, 2, 3 or 4, wherein the reduced pressure sink is above the condensing pressure of the working fluid.

48. The method or apparatus as set forth in claims 1 or 2, wherein the desorber is used to reconstitute the absorbed working fluid.

49. The method or apparatus as set forth in claims 1, 2, 3 or 4, wherein the regenerator recovers heat energy from the liquid received from the desorber to heat and vaporize the liquid pumped to the regenerator from the receiver.

50. The method or apparatus as set forth in claims 1, 2, 3 or 4, wherein a heat exchanger/heat recovery device is used to recover heat energy from the working fluid for space heating.

51. The method or apparatus as set forth in claims 1, 2, 3 or 4, wherein a heat exchanger/heat recovery device is used to recover heat energy from the working fluid for process heating.

52. The method or apparatus as set forth in claims 1, 2, 3 or 4, wherein a heat exchanger/heat recovery device is used to extract cooling from the working fluid for space cooling.

53. The method or apparatus as set forth in claims 1, 2, 3 or 4, wherein a heat exchanger/heat recovery device is used to extract cooling from the working fluid for process cooling.

54. The method or apparatus as set forth in claims 1, 2, 3 or 4, wherein a heat exchanger/heat recovery device is used to recover heat energy from the absorbent liquid for space heating.

55. The method or apparatus as set forth in claims 1 or 2, wherein a heat exchanger/heat recovery device is used to recover heat energy from the absorbent liquid for process heating.

* * * * *